Jan. 31, 1928.
T. A. BANNING, JR
1,657,603
VEHICLE TRANSMISSION AND CONTROL DEVICE AND THE LIKE
Filed July 11, 1923
17 Sheets-Sheet 1

Inventor:
Thomas A. Banning, Jr.
by
Attys.

Jan. 31, 1928.
T. A. BANNING, JR
1,657,603
VEHICLE TRANSMISSION AND CONTROL DEVICE AND THE LIKE
Filed July 11, 1923     17 Sheets-Sheet 2
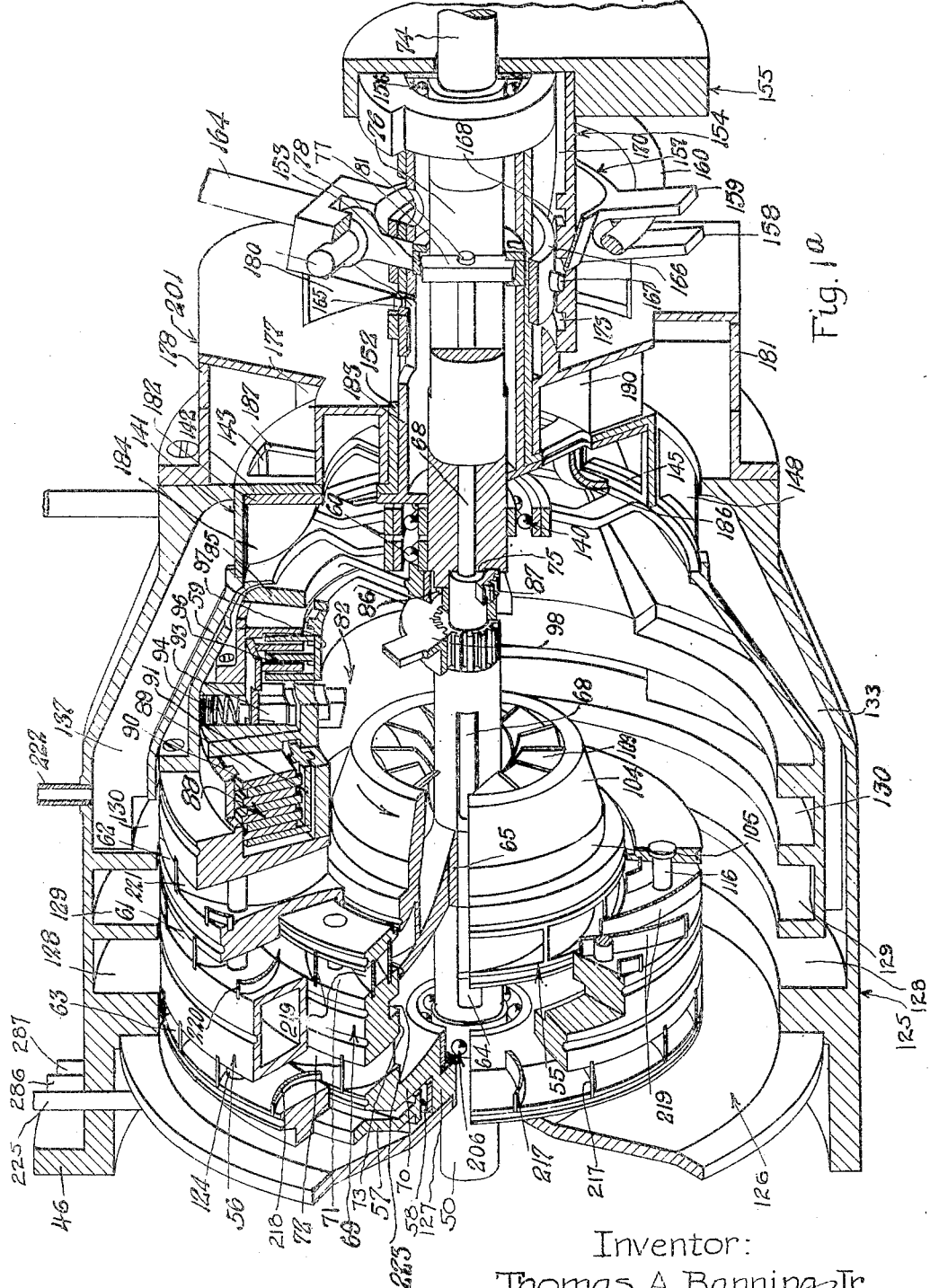
Fig. 1a
Inventor:
Thomas A. Banning Jr.
by 
Atty's.

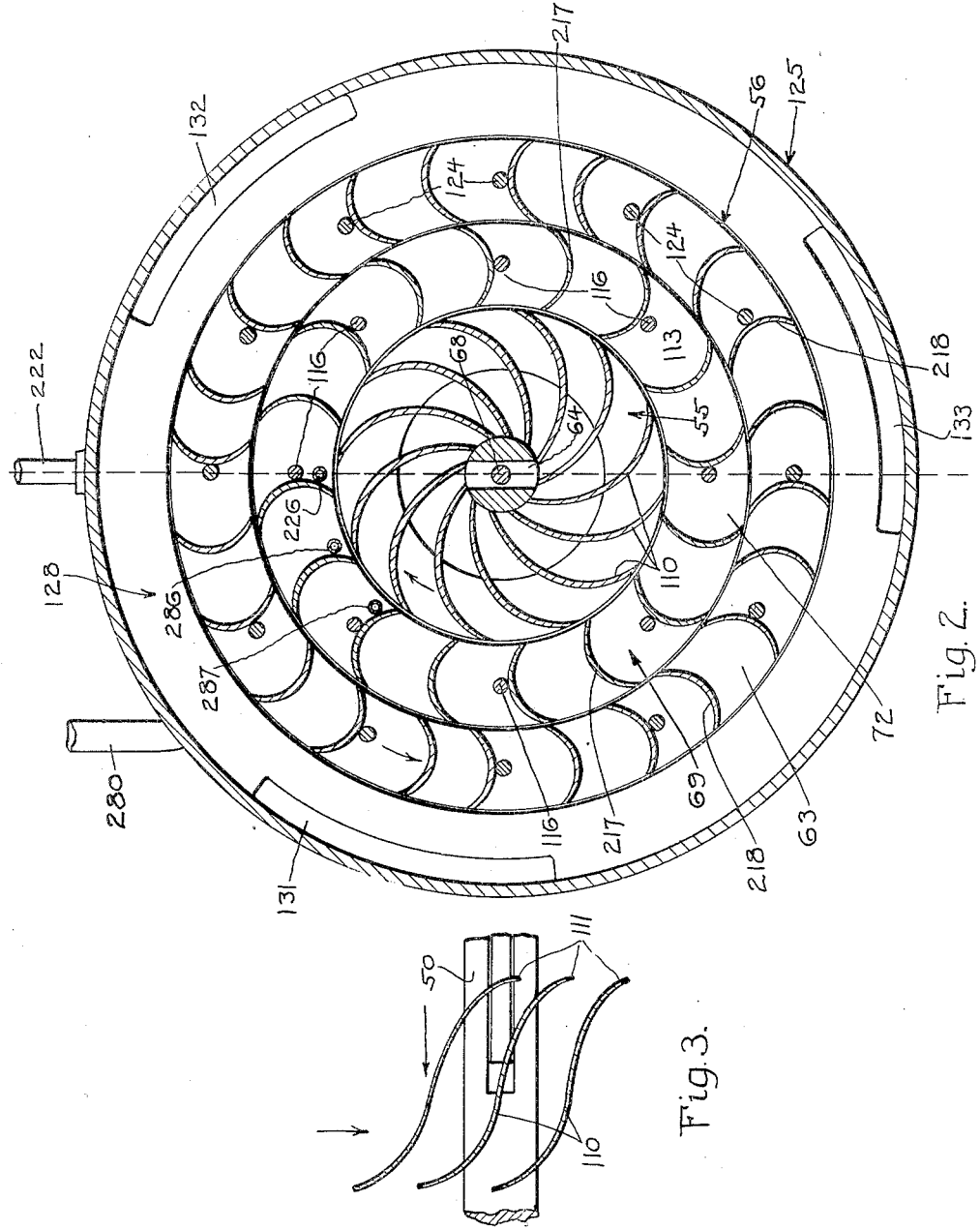

Jan. 31, 1928.

T. A. BANNING, JR 1,657,603

VEHICLE TRANSMISSION AND CONTROL DEVICE AND THE LIKE

Filed July 11, 1923     17 Sheets-Sheet 4

Inventor:
Thomas A. Banning, Jr.
by
Atty's.

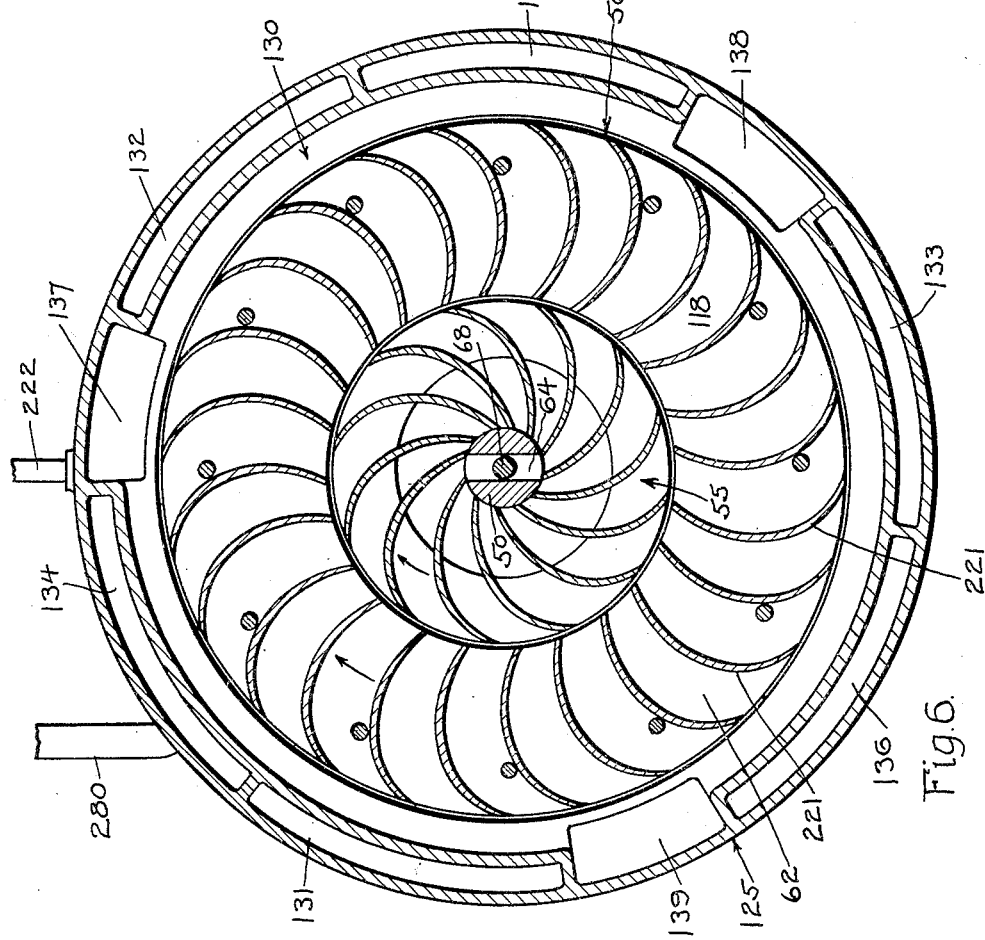
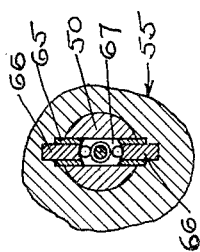

Jan. 31, 1928.  
T. A. BANNING, JR  
1,657,603  
VEHICLE TRANSMISSION AND CONTROL DEVICE AND THE LIKE  
Filed July 11, 1923  17 Sheets-Sheet 6

Inventor:
Thomas A. Banning, Jr.
by
Att'ys.

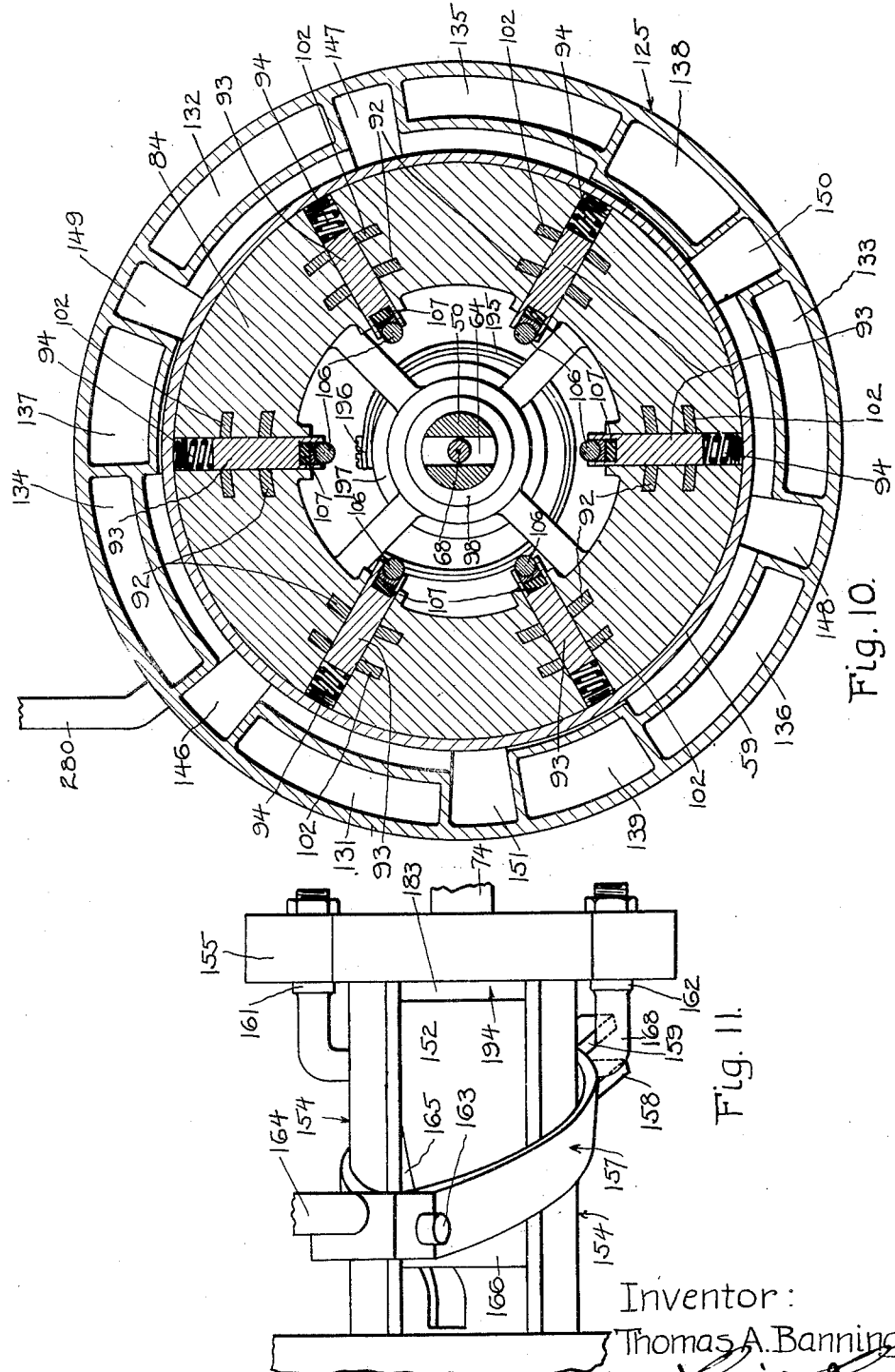

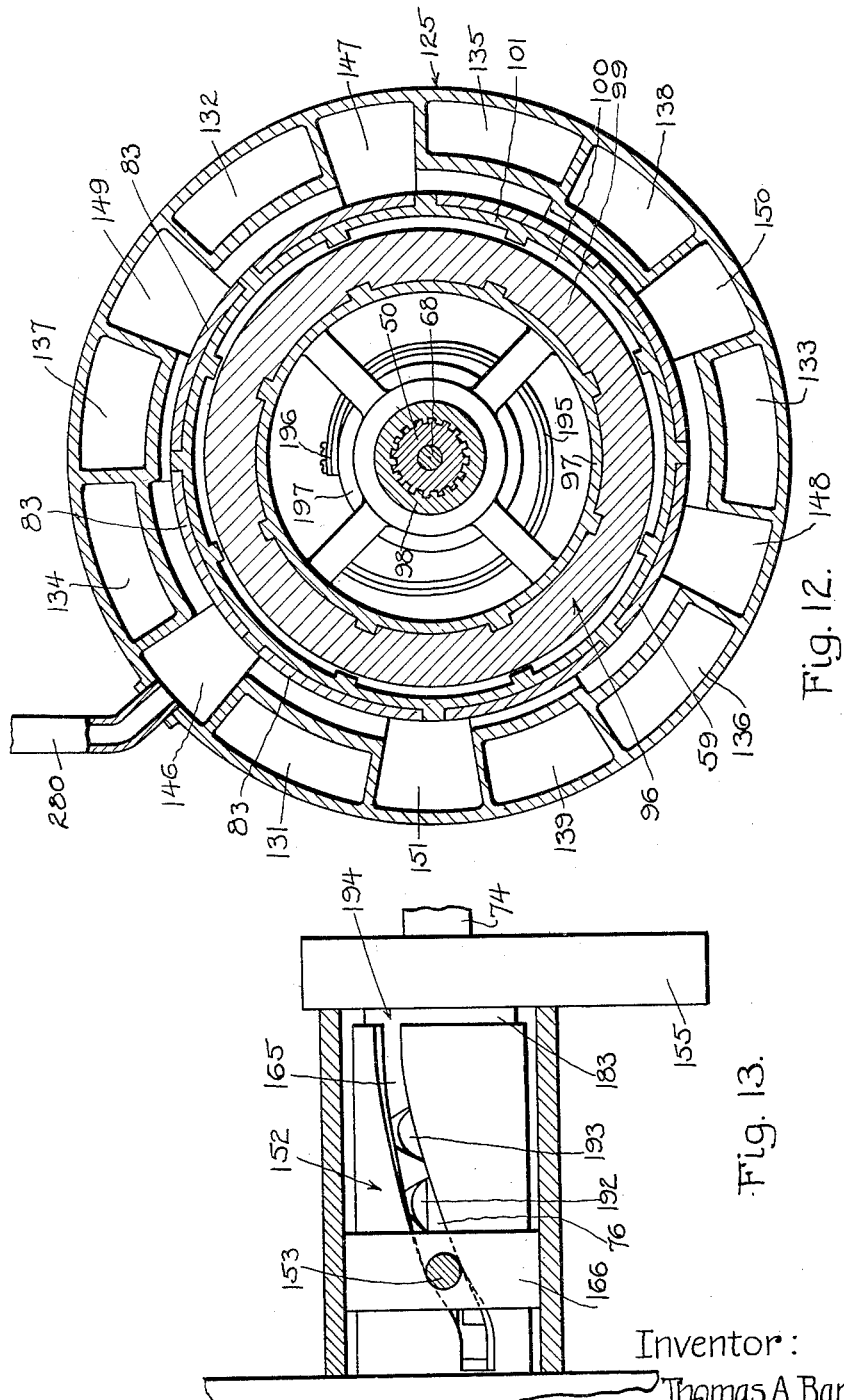

Jan. 31, 1928.
T. A. BANNING, JR
1,657,603
VEHICLE TRANSMISSION AND CONTROL DEVICE AND THE LIKE
Filed July 11, 1923
17 Sheets-Sheet 9
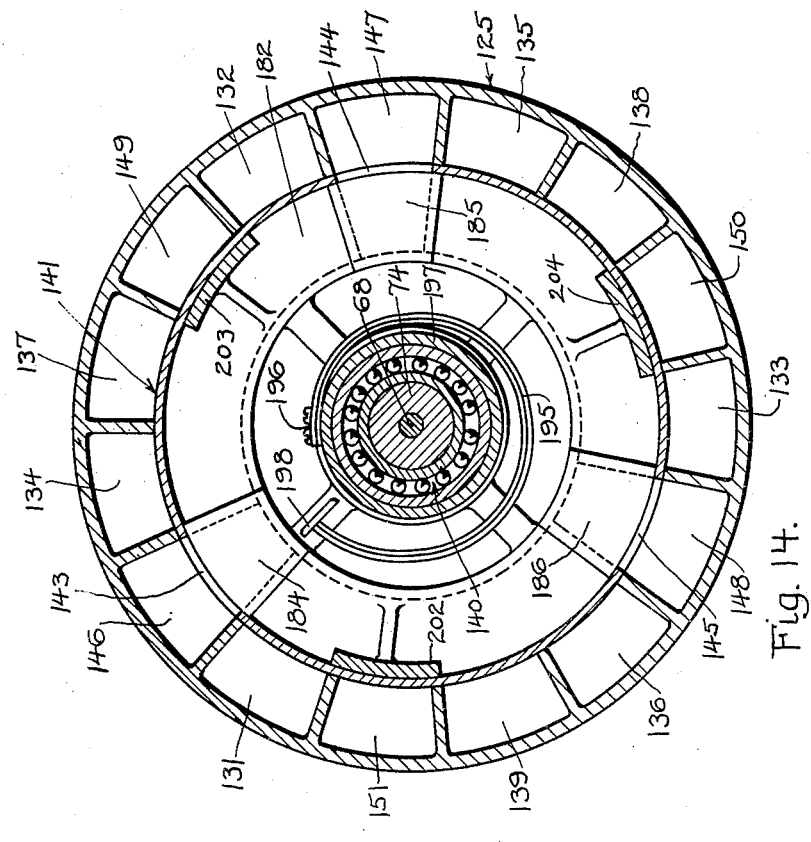
Fig. 14.
Fig. 15.
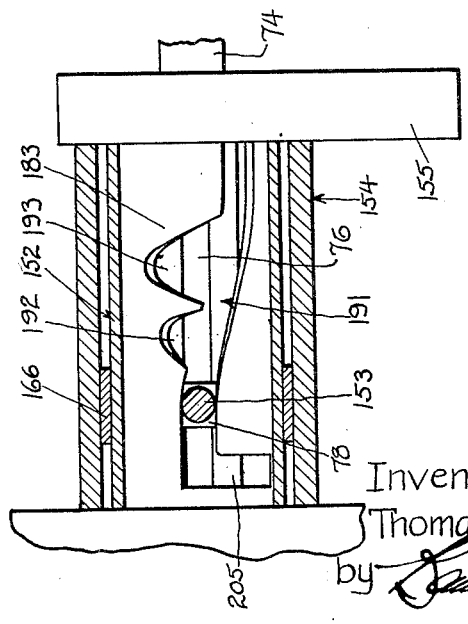
Inventor:
Thomas A. Banning, Jr.
by
Atty's.

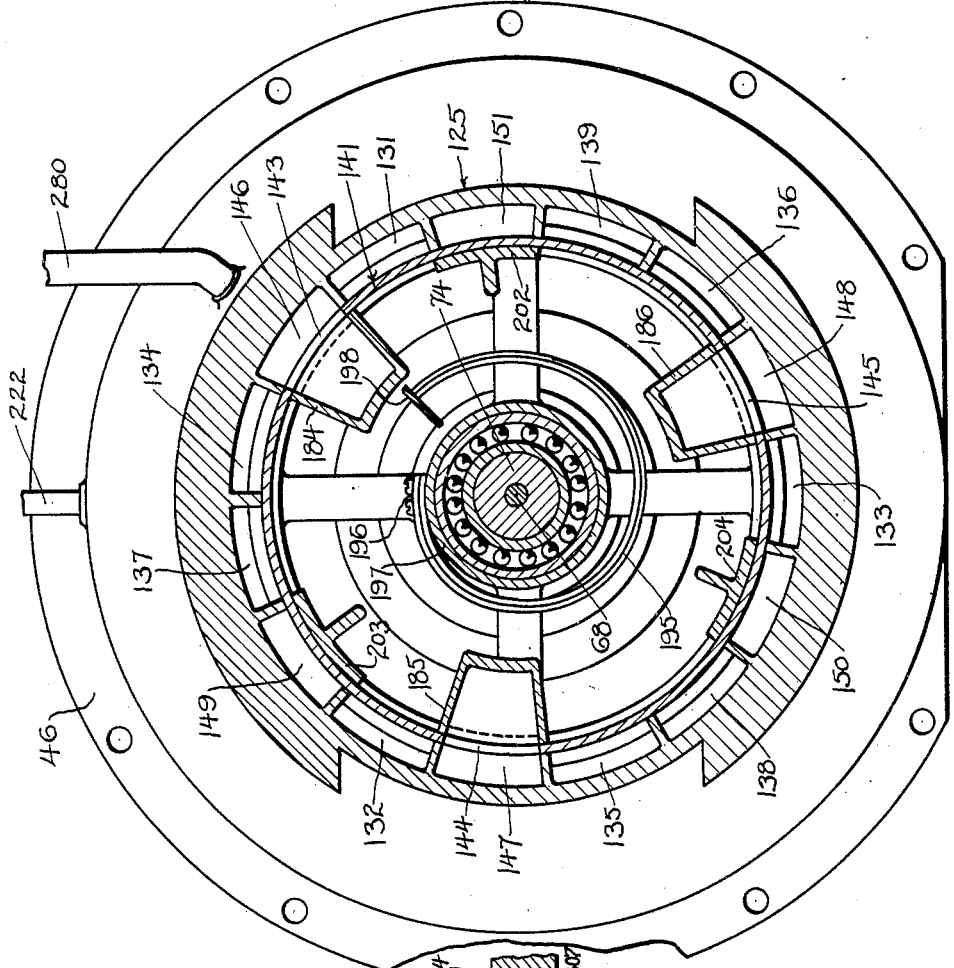
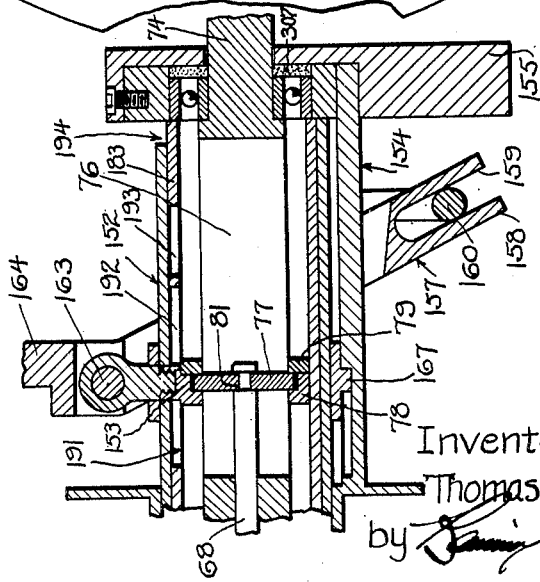
Fig. 16.
Fig. 21.
Inventor:
Thomas A. Banning, Jr.
by
Atty's

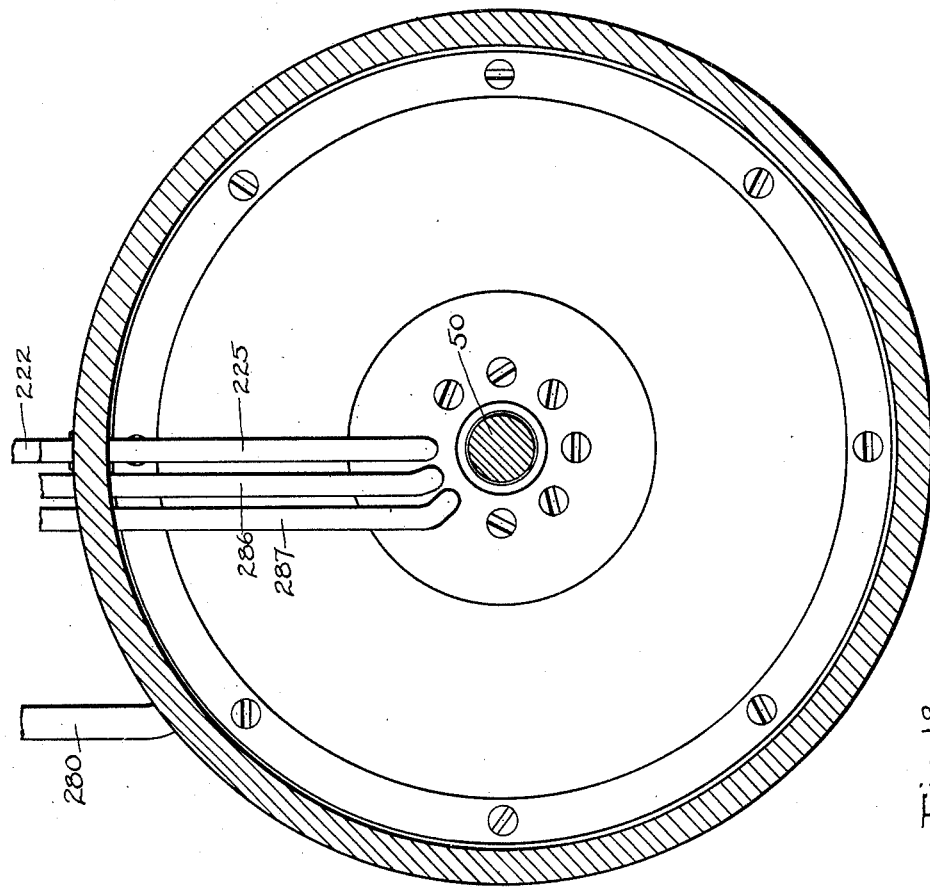
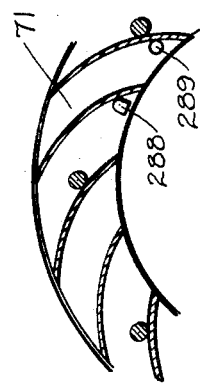
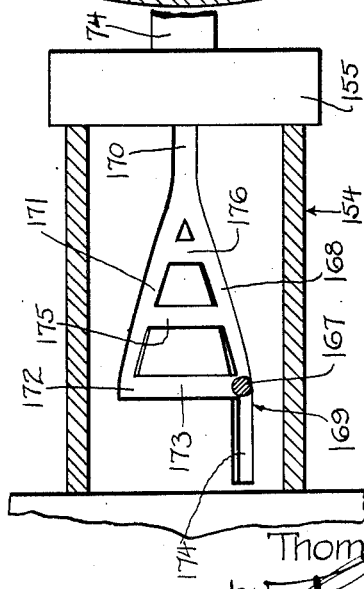

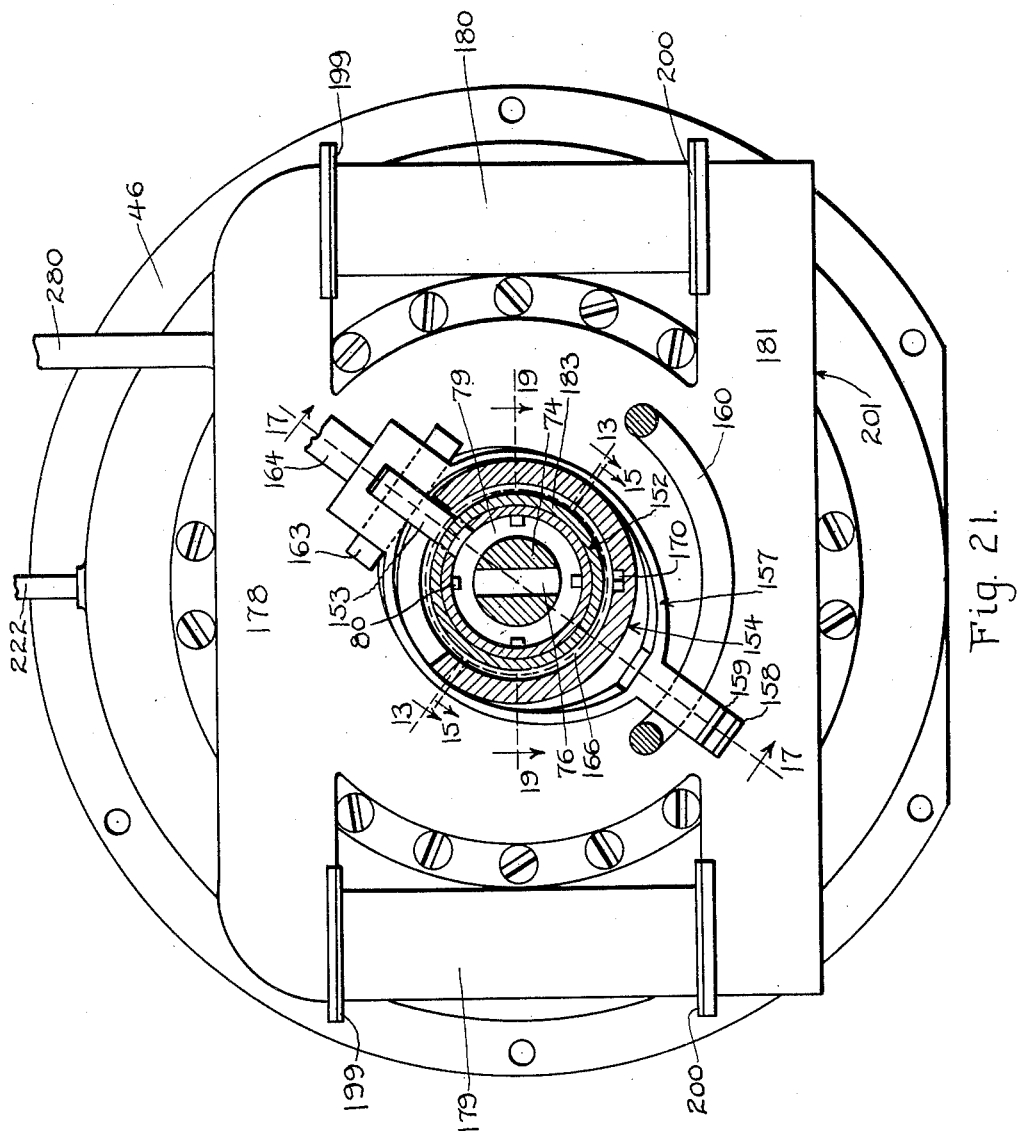

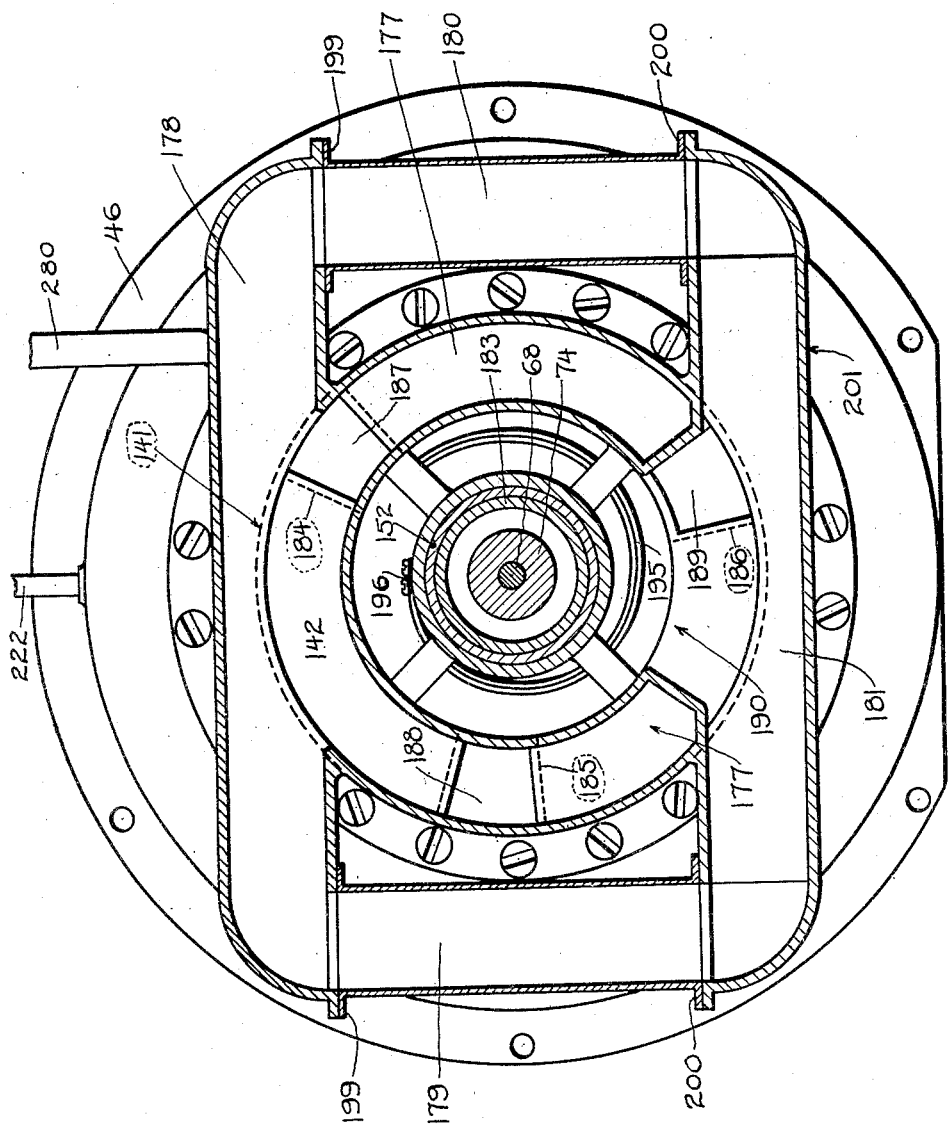

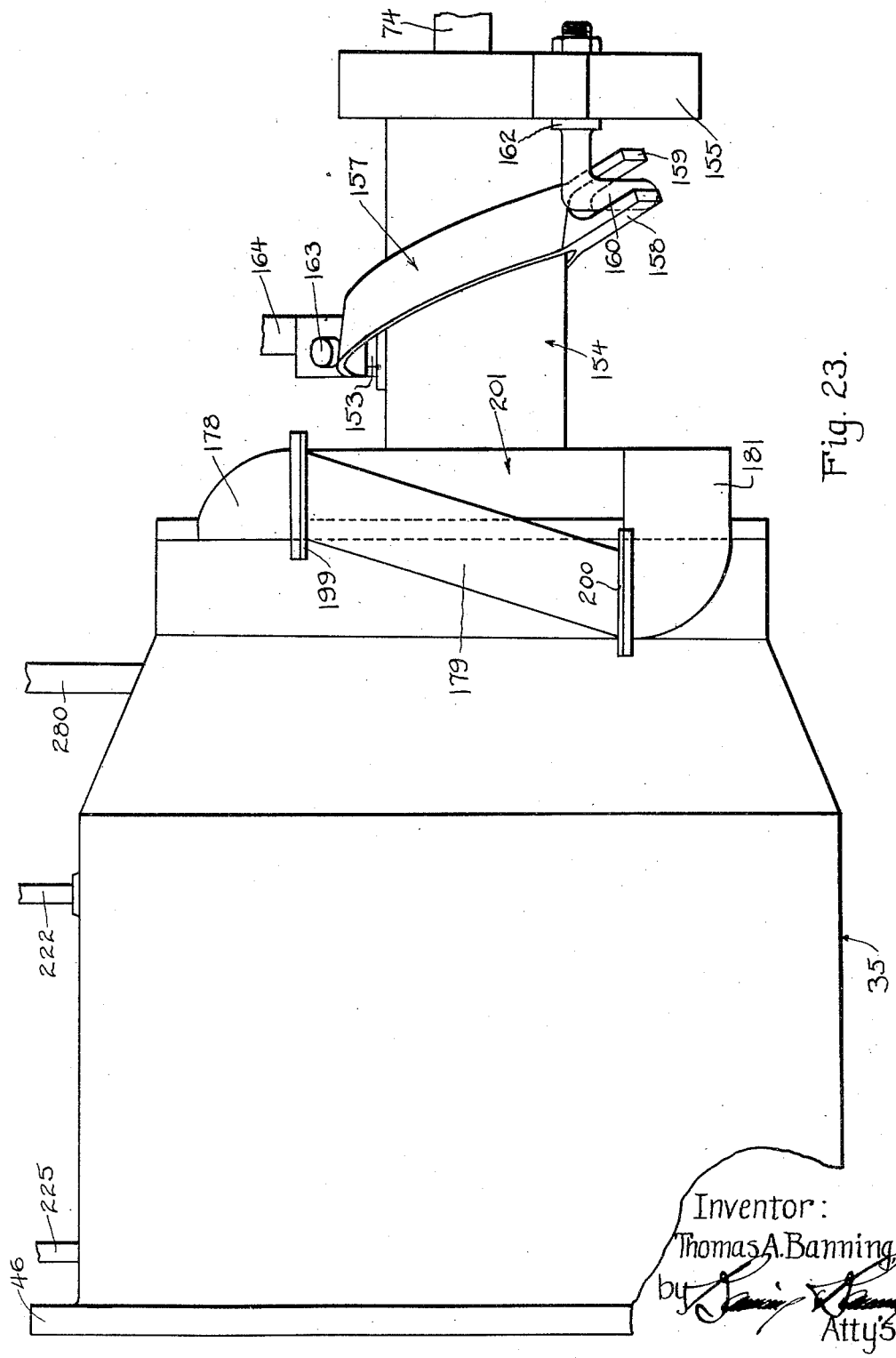

Jan. 31, 1928. 1,657,603
T. A. BANNING, JR
VEHICLE TRANSMISSION AND CONTROL DEVICE AND THE LIKE
Filed July 11, 1923 17 Sheets-Sheet 15
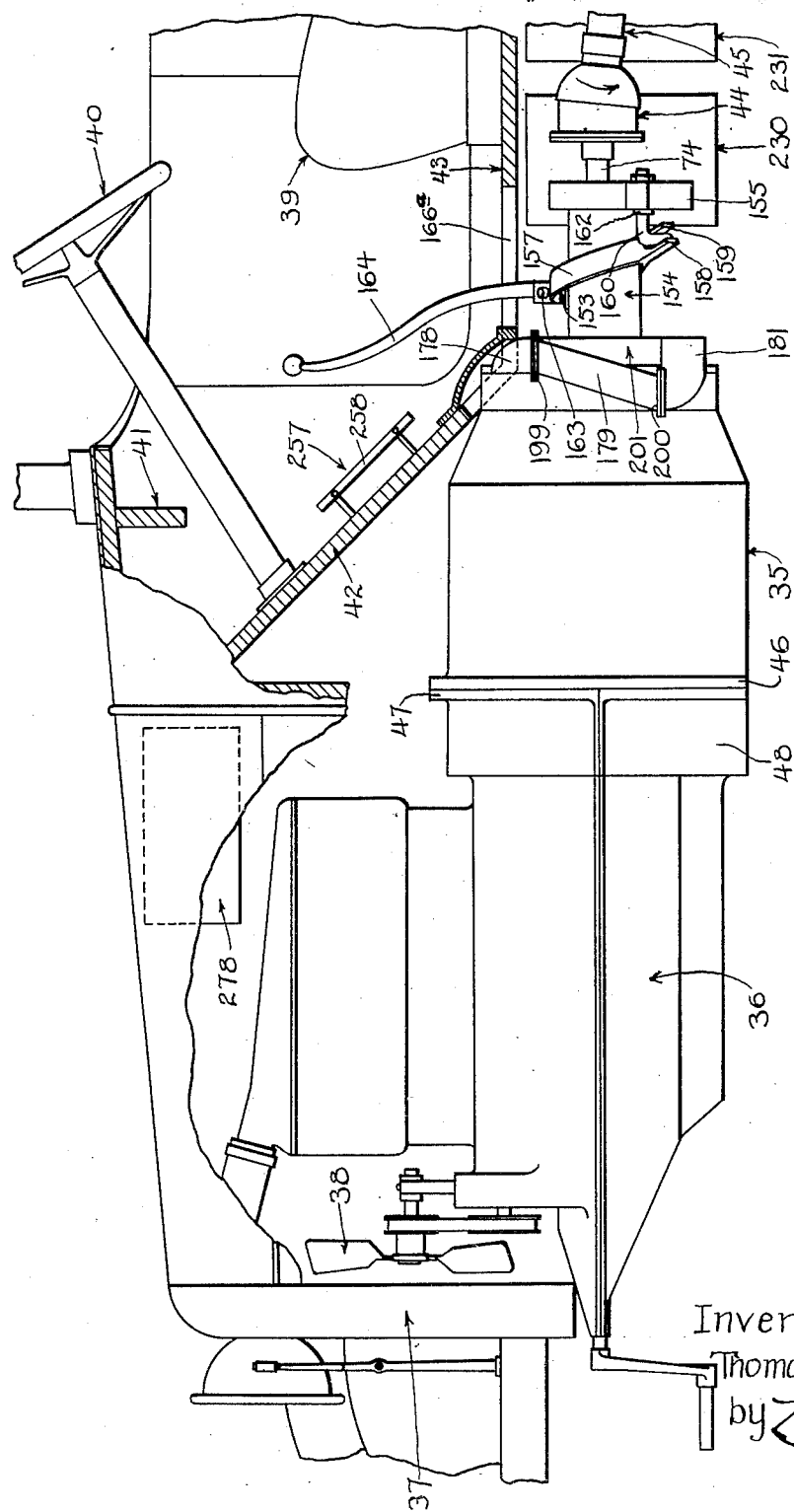
Fig. 24.
Inventor:
Thomas A. Banning Jr.
by 
Attys.

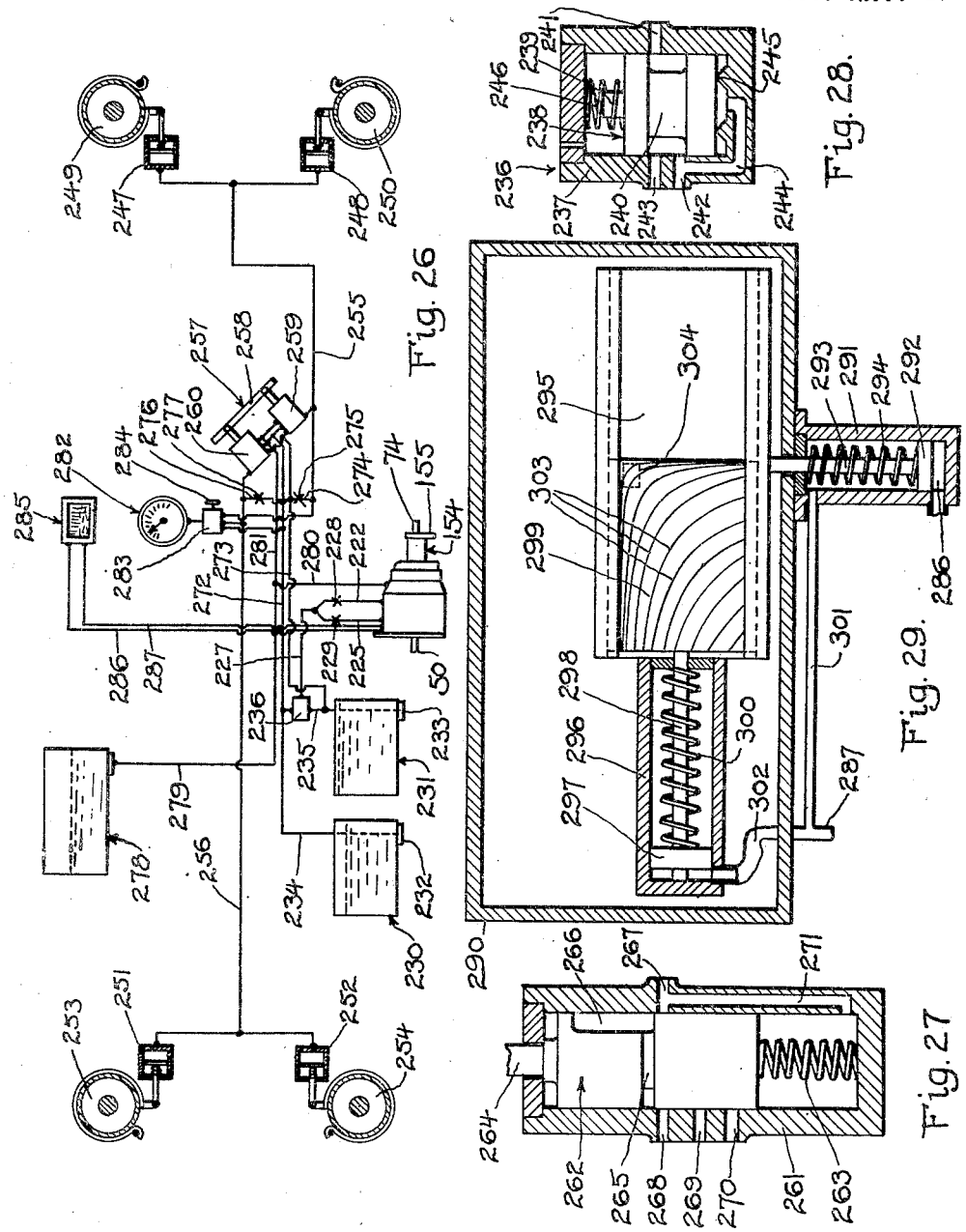

Patented Jan. 31, 1928.

1,657,603

UNITED STATES PATENT OFFICE.

THOMAS A. BANNING, JR., OF WILMETTE, ILLINOIS.

VEHICLE TRANSMISSION AND CONTROL DEVICE AND THE LIKE.

Application filed July 11, 1923. Serial No. 650,773.

This invention has to do with certain improvements in devices and systems for controlling vehicles. More particularly it has to do with mechanisms which are used for controlling the starting and running and stopping operations of the vehicles. The features of the invention are herein illustrated and will be described as particularly embodied in a mechanism for controlling automobiles, motor trucks, motor cars, gasoline engine cars, tractors, etc., but manifestly the features of the invention may be incorporated in the control of other forms of vehicle, and, therefore, I do not intend to limit myself to their use in the particular vehicles above mentioned, except as I may do so in the claims.

Still more particularly the mechanisms herein disclosed embody the use of oil or other suitable fluid in connection with the transfer of power from one element to another.

In the control of vehicles there are to be considered the accelerations and the retardations of speed which take place in the starting and stopping operations. In the one case the energy from the engine is being converted into increased speed of movement, and in the other case the energy of the vehicle, due to its speed and mass, is to be taken up. Ordinarily, this latter energy is dissipated in the form of heat at the brakes.

In the starting or accelerating action the power of the running engine is to be converted into an increasing speed of movement in the vehicle up to the time when the engine may be directly connected to the drive wheels or drive shaft in what is known as direct drive.

One of the objects of the present invention is to provide a change speed device in which the power of the engine running at one speed may be converted into an increased torque delivered to the wheels or drive shaft, so that the efficiency of the converting action may be increased by multiplying the torque in a ratio to compensate for the reduced speed of the vehicle as compared to the engine. In this connection, another object is to make provision for changing the ratio of torque multiplication as the vehicle is accelerated, so that as the vehicle is brought under way and its speed increased, the ratio between the torques of the engine and the drive shafts will become more nearly equal to unity.

Another object is to make provision for establishing a direct connection between the engine and the drive shaft after the vehicle has been brought under way so as to make use of the so called direct drive when the vehicle is in motion.

Another object of the invention is to make provision for reversal of the direction of rotation of the vehicle drive shaft as compared to the direction of engine rotation, so that the vehicle may be reversed.

Still more particularly another object is to provide an arrangement in which the driver may pass in natural and regular sequence from a neutral position to and through one or more intermediate accelerating positions to the direct drive position, or may pass directly from the neutral position to the reversing position, and in which a movement from either of the forward drive positions to the reversing position is accomplished only by passing the neutral position.

Still more particularly an object is to provide a fluid change speed device incorporating the foregoing features, and a device in which the transfer of power is effected by the use of oil or other suitable fluid; and still more particularly in this connection, an object is to make use of suitable pumping means driven by the engine in conjunction with turbine mechanism for absorbing the power delivered from the pump and converting it into the useful operations for the transmission and control of the vehicle.

In connection with all of the forgoing, it will be understood that in the ordinary operation of a fluid control device in which power is transmitted through the medium of a fluid, a certain amount of energy will be lost in the use of the fluid owing to the fluid friction and owing to the changes in speed of the fluid at different portions of its circuit, as well as owing to the creation of eddy currents and pockets in the fluid during its travel. This energy will represent a certain percentage of loss of power. One of the objects of the invention is to so arrange the parts in their relative movements in the ordinary operation of the device for transmission that the percentage of its loss of power will be relatively small, and in fact smaller than would be otherwise possible except for the relative directions of movements of the pumping and turbine elements.

In connection with this relatively small loss of power, it will also be understood that as long as the fluid is not being circulated the existence of these losses ceases. Therefore, another feature of the invention relates to the provision of an arrangement in which the circulation of the oil and the operation of the turbine elements may be entirely discontinued during the direct drive operation of the machine. Inasmuch as in the ordinary operation of motor vehicles they are operated a very great portion of the time in direct drive, it follows that this feature of the invention will very largely reduce the total loss of energy during the ordinary use and operation of the control device, so that the overall efficiency will be increased proportionally.

In those cases in which the control device is to be used for increasing torque for extended periods of time, as distinguished from direct drive, as for example a long grade is being ascended, it will be necessary to use the fluid for a considerable period of time in the transfer of power. This will result in a corresponding heating action notwithstanding the relatively high efficiency of the machine. Another object of the invention is, therefore, to make provision for cooling the fluid at such times so that an excessive temperature will not be generated. In this connection, a further object is to so arrange the parts that in the ordinary operation of the control mechanism this cooling device is not used, but the fluid is returned directly to the pump, thus correspondingly increasing the facility of movement of the fluid and correspondingly reducing the ordinary loss of energy. In connection with this feature, a still further object is to make provision for automatically bringing the cooling circuit into operation when the temperature of the fluid reaches a selected point, so that the cooling action will then be brought into operation without the necessity of further thought or attention on the part of the operator.

A still further object in connection with the cooling of the fluid is to locate the cooling element at such a point that it will be subjected directly to the influence of the current of air flowing rearwardly and downwardly past the motor and under the floor boards of the vehicle; thereby taking advantage of the presence of the current of air which is ordinarily created past the engine by reason of the operation of the radiator cooling fan of the vehicle.

A still further object in connection with the cooler is to provide the cooler, when used as a unit portion of the change speed device, so that the fluid in its circulation through the cooler will traverse the shortest and most direct path possible and thus be subjected to a minimum amount of resistance in its flow. In this connection, a still further object is to so design and control the cooling unit that it may be readily attached to or detached from the body portion of the change speed device without materially changing the form or construction of the change speed device itself, thus making it possible to considerably standardize the construction of parts and making it possible to supply the finished equipment either with or without the cooling unit as desired.

A further object of the invention is to provide an arrangement such that the fluid transmission device itself can be used for the creation of a braking or retarding action for absorbing the energy of the vehicle in reducing its speed. In this connection, I avail myself of the presence of the turbine elements, which owing to the momentum of the vehicle may be driven as pumps, so as to generate a fluid pressure tending to cause a circulation of the fluid. I then make provision for normally preventing the circulation of this fluid under pressure, so that no retarding action will take place, but I also provide therefor means under the control of the operator for permitting the fluid to circulate as may be desired in order to absorb the energy of momentum of the vehicle in order to produce a retarding action under control.

In connection with the foregoing, I avail myself also of the fact that the turbine member operates as a centrifugal pump whose pumping action increases as the square of the speed of its rotation, so that the retarding action will be greatly multiplied when the vehicle is traveling at high speed as compared to the braking action when traveling at relatively low speed. In this way, it becomes possible to secure a rapid reduction in speed of travel down to a relatively low speed at which the use of other braking means may be readily availed of for bringing the vehicle to a complete stop.

In connection with the use of the change speed mechanism for the braking action, the energy of momentum of the vehicle is converted into heat in the fluid, which heat should be dissipated in order to prevent overheating. I have, therefore, made provision for causing the fluid to circulate through the cooling device when the mechanism is being used for the braking or retarding function; and this diversion of the fluid through the cooling device is performed automatically whenever the mechanism is used for the purpose of braking or retarding the vehicle in its normal operation. This diversion is also performed automatically and entirely without thought or attention on the part of the operator. The changes of temperature of the fluid cause corresponding changes in its volume owing to its coefficient of temperature expansion. In the case of oils suitable for use in the present machine, these changes of volume may be quite substantial. Furthermore, in order to insure a most satisfactory operation of the machine at all times, both from the standpoint of the pumping action and from the standpoint of the turbine or motor action, the transmission device itself should at all times be kept completely filled with the fluid. This will prevent aeration and consequent lowering of the power transmitting ability.

Therefore, a further object of the invention is to provide in connection with the transmission device, a suitable auxiliary chamber, or at any rate an expansion chamber into and from which the fluid may flow in order to take up for changes in its volume due to change of temperature, as well as for other purposes.

Still further in connection with the foregoing, it is another object to provide an arrangement whereby the fluid within the transmission device itself may be kept at all times under a certain amount of hydrostatic pressure so as to still further eliminate any tendency towards aeration. In those cases in which an expansion tank is used, this result may be accomplished by placing the same at a higher level than the transmission device itself, or by the creation of a hydrostatic pressure within the expansion tank in any other manner.

Another object of the invention is to make provision for storing up energy from the momentum of the vehicle in the form of fluid or air under pressure, so that the energy thus stored up may be made available for present or future use for any selected purpose. For example, this energy so stored up may be used for the operation of other brake devices such as the brake bands on the wheels of the vehicle. In this connection, an object is to make provision for storing up a sufficient volume of fluid under air pressure within one or more storage tanks, the energy necessary to bring about this conservation being ordinarily derived directly from the turbine in the retarding action of the vehicle, this action constituting a regeneration of power.

A further object in this connection is, however, to make provision for placing the fluid under air pressure by the use of the pumping mechanism driven by the engine, so that, if desired, the operator may store up a certain amount of energy for use for operating the brakes or other purposes independently of the momentum of the vehicle. This will make it possible, for example, to place the fluid under pressure in the tanks before the vehicle is taken out on the road and before it has been possible to absorb any momentum energy.

Another object in connection with the above is to make provision for creating the braking action on either or any of the wheels or on all of the wheels of the vehicle, as desired. For example, the rear wheels may be treated as a group and the front wheels may be treated as another group, and means be provided for exerting the braking action on either of said groups independently or on both groups together. In this connection, a further object is to provide a foot pedal arrangement convenient to the driver and of such form that pressure at one end thereof, for example by the heel, will cause the braking action on the rear wheels, while pressure at the other end by the toe, will cause the braking action to perform on the front wheels, and pressure on both ends of the pedal will cause braking action on all four wheels.

A further object in connection with all of the foregoing is to provide a control device such that the amount of the braking action will depend upon the amount of pressure exerted by the operator, so that he can produce either a light or a heavy braking action, as desired, the amount of fluid pressure admitted to the brakes depending upon the amount of pressure exerted on the control valve.

In connection with the above features, another object is to make provision, if desired, for storing up fluid in two or more independent tanks at different pressures, for example at low pressure and at high pressure, so that either or both kinds of pressure may be used for the different functions. In this connection, an object is to make provision in the brake control for normally using the low pressure fluid for service stops, but to also make provision for admitting high pressure fluid in case an emergency stop be desired. All of these results may be secured in the control device operable by the foot of the operator.

In connection with the storage of fluid under pressure, a further object is to so arrange the parts that this pressure may be conveniently accessible for use in the operation of auxiliary devices, such as lifting jacks or other devices convenient for use in and about the vehicle.

In connection with the feature of storing up fluid under pressure in tanks, this will result in a demand on the transmission device itself for a certain amount of fluid and the fluid released from the tanks under pressure during an application of the brakes, for example, must ultimately be returned to the system. Therefore, a further object is to associate all of these mechanisms with the aforesaid expansion tank, and to make the expansion tank itself of proper capacity with regard to the needs of the system, so that at all times the various transfers of fluid from one point to another may take place within the system without, however, at any time depleting the transmission device itself of the necessary amount of fluid to keep it completely filled.

A further object of the invention is to provide a form and construction of change speed device embodying all or various of the foregoing features, which shall in itself be very conveniently usable in connection with the general form and arrangement of power plant as well known and used at this time in connection with automotive vehicles. In this connection, an object is to provide a transmission device which may be readily connected to the rear portion of the engine, and will lend itself admirably to the general arrangement of floor boards and position of propeller or drive shaft and universal joint as is more or less standard equipment today.

A further object in connection with the foregoing is to provide a very convenient and simple arrangement of control handle for controlling all of the various functions of the transmission device, including the shifting from one transmission ratio to another or to direct drive or to reverse, and including the ability to use the transmission device for the braking function. In connection with the foregoing, it is a further object to so arrange this control handle that it will occupy a position convenient to the driver and without interference to the convenience of another passenger sitting in the front seat, while at the same time enabling the driver to perform the various functions and evolutions already explained as well as others.

In connection with the flow of fluid through the transmission device itself when the same is being used for the driving of the vehicle by the use of the fluid, it is desirable to keep the efficiency of the energy transfer as high as possible. For this purpose it is desirable to avoid the use of excessive linear velocity for the fluid, and also to avoid abrupt changes of velocity at different points where it is not desired to convert power. Therefore, a further object of the present invention is to provide a form and construction of transmission device which will lend itself admirably to the provision of passages of relatively large cross sectional area throughout their length, thus reducing the linear velocity of the fluid, and which arrangement will also lend itself admirably to the avoidance of sudden changes in cross sectional area of the passages and thus largely eliminate the production of eddy currents and other natural obstructions to the usual flow of the fluid.

Other objects and uses of the invention will appear from a detailed description of the same, which consists in the features of construction and combinations of parts hereinafter described and claimed.

In the drawings:

Figure 1 shows a longitudinal section through a transmission device embodying the features of the present invention;

Fig. 1ª shows a perspective view taken on different section lines with the parts standing at the first forward drive position and the deflector plate turned to throw the oil through the cooler;

Fig. 2 shows a cross section taken on the line 2—2 of Fig. 1, looking in the direction of the arrows, but with the impeller at the reverse position;

Fig. 3 shows a fragmentary section taken through some of the vanes of the impeller of the machine, in more or less diagrammatic form taken on line 3—3 of Fig. 1 looking in the direction of the arrows;

Fig. 6 shows a cross section taken on the line 6—6 of Fig. 1, looking in the direction of the arrows, but with the impeller at the second forward drive position;

Fig. 7 shows a fragmentary section taken on the line 7—7 of Fig. 1, looking in the direction of the arrows, showing the manner in which the impeller is keyed to the engine shaft connection;

Fig. 10 shows a cross section taken on the line 10—10 of Fig. 1, looking in the direction of the arrows;

Fig. 11 shows a fragmentary horizontal section taken on the line 11—11 of Fig. 1, looking in the direction of the arrows, the control lever standing in the neutral position;

Fig. 12 shows a cross section taken on the line 12—12 of Fig. 1, looking in the direction of the arrows;

Fig. 13 shows a fragmentary longitudinal section taken on the line 13—13 of Fig. 21, looking in the direction of the arrows; showing the form of the slot in the valve sleeve, the parts being in the neutral position;

Fig. 14 shows a cross section taken on the line 14—14 of Fig. 1, looking in the direction of the arrows, the valve and deflector plate standing in the neutral position;

Fig. 15 shows a fragmentary longitudinal section taken on the line 15—15 of Fig. 21, looking in the direction of the arrows, and shows the form of the slot in the deflector plate sleeve, the parts being in the neutral position;

Fig. 16 shows a cross section taken on the line 16—16 of Fig. 1, looking in the direction of the arrows, the valve and deflector plate standing in the neutral position;

Fig. 17 shows a fragmentary longitudinal section taken on the line 17—17 of Fig. 21, looking in the direction of the arrows, the parts standing in the neutral position;

Fig. 18 shows a cross section taken on the line 18—18 of Fig. 1, looking in the direction of the arrows;

Fig. 19 shows a fragmentary longitudinal section taken on the line 19—19 of Fig. 21, looking in the direction of the arrows, and it shows the form of the slot in the stationary neck;

Fig. 20 shows a fragmentary cross section taken on the line 20—20 of Fig. 1, looking in the direction of the arrows;

Fig. 21 shows a cross section taken on the line 21—21 of Fig. 1, looking in the direction of the arrows, the parts standing in the neutral position;

Fig. 22 shows a cross section taken on the line 22—22 of Fig. 1, looking in the direction of the arrows, the parts standing in the neutral position;

Fig. 23 shows a side elevation of the assembled transmission device, the control lever in the neutral position;

Fig. 24 shows a fragmentary longitudinal section through the chassis and front portion of an automobile equipped with a transmission embodying the features of the present invention, showing the manner in which the same may be related to the other parts of the vehicle, the control lever standing in the neutral position;

Fig. 26 shows diagrammatically a layout of piping and mechanisms for making it possible to store up fluid under pressure and applying the same to various useful purposes;

Fig. 27 shows in more or less diagrammatic form a simple arrangement of brake valve for use in connection with the system shown in Fig. 26;

Fig. 28 shows in more or less diagrammatic form a simple arrangement of cut out valve for limiting the fluid pressure which will be created in the low pressure tank;

Fig. 29 shows in more or less diagrammatic form a simple indicating power meter for showing the amount of fluid power being delivered to the turbine of the transmission during operation at the first forward drive position.

Figure 25:
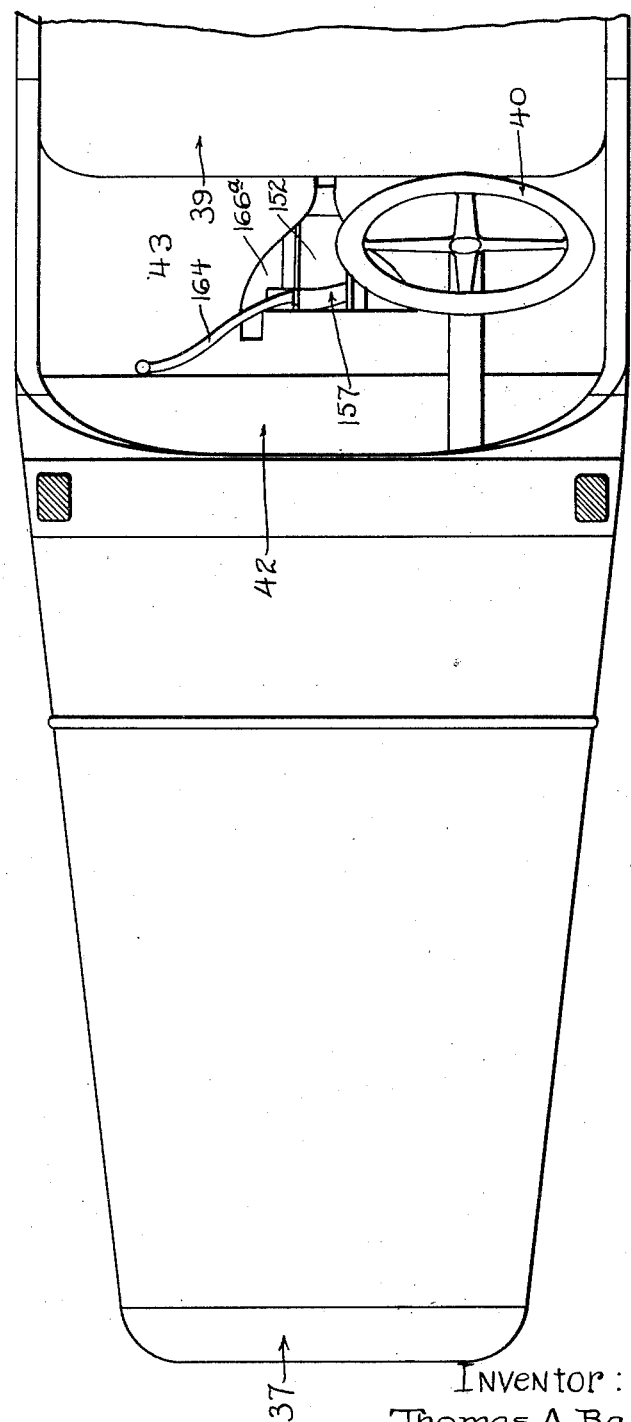
Fig. 25 shows a horizontal or plan view corresponding to Fig. 24.

Referring now to the various drawings, I have for purposes of convenience shown the transmission device, designated in its entirety by the numeral 35, as being directly associated with the rear end of the gasoline engine 36 of an automobile. This automobile is also shown as provided with the customary radiator 37, cooling fan 38, driver's seat 39, steering wheel 40, dash board 41, floor board 42 and floor 43, all of which are largely according to present practice. The transmission device is shown as being interposed between the engine 36 and the universal joint 44 which connects with the propeller or drive shaft 45 leading to the rear axle of the vehicle. This general arrangement and association of the transmission device is shown in Figs. 24 and 25 largely as a matter of convenience and to show one example of a very useful arrangement embodying the present invention, but in so illustrating an application of the arrangement I do not intend to limit myself thereto, except as I may do so in the claims.

Figure 1:
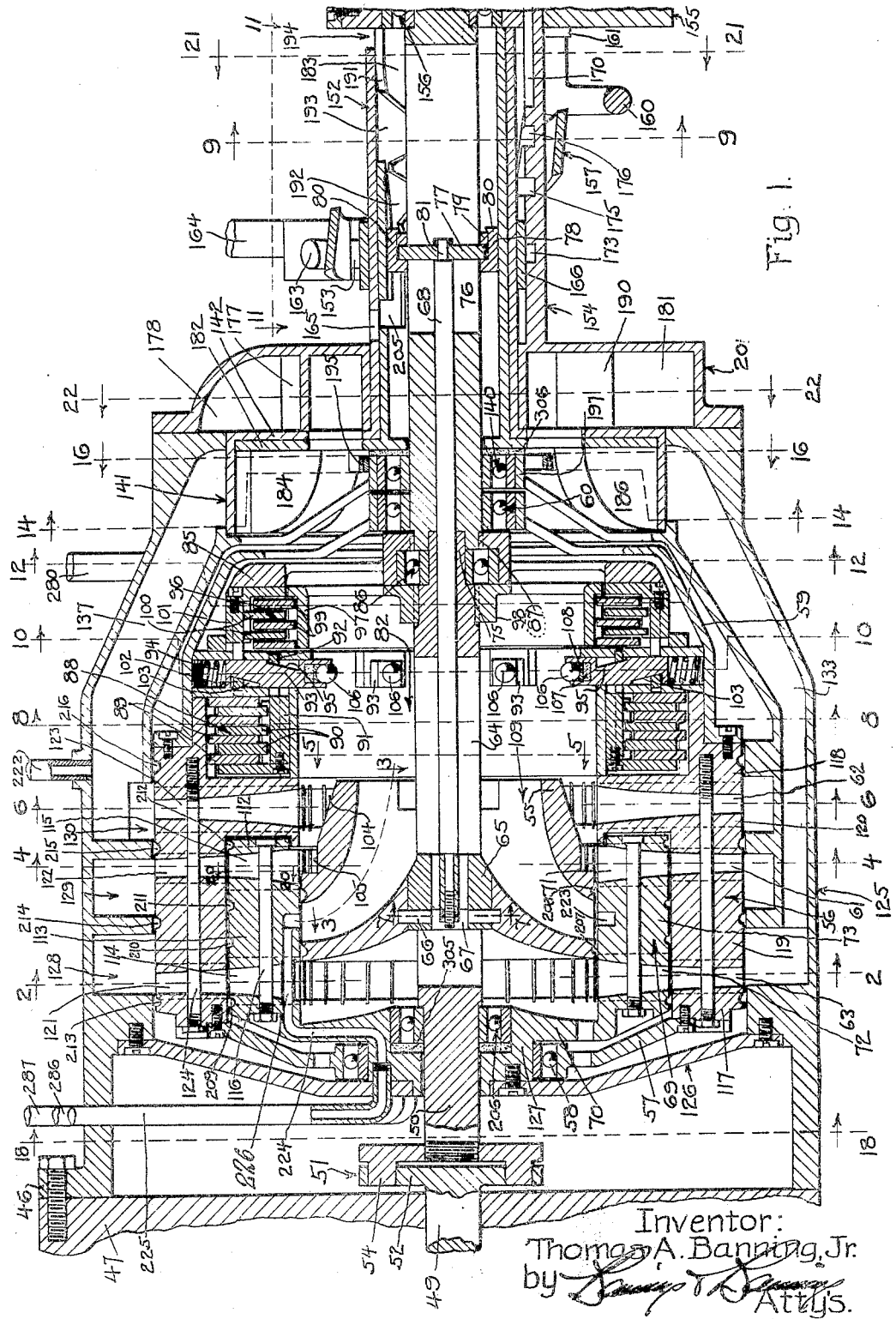

Furthermore, the transmission device 35 is shown as being provided on its front end with a flange 46 which may be directly connected to the flange 47 at the rear end of the engine unit, the fly wheel of the engine being located within the rear section 48 of the engine. Also the engine shaft is designated by the numeral 49 as shown in Fig. 1 in particular.

The transmission device itself includes a drive shaft 50 which is driven by the engine shaft 49. In order to secure this driving connection and also to make it convenient to set the transmission device into proper position at the back end of the engine and simultaneously effect the driving coupling connection between the parts 49 and 50, I have shown a coupling 51 joining these parts together. This coupling includes a flange 52 on the engine shaft, a flange 53 on the drive shaft 50, and two or more connecting pins 54 on the flange 53 which will engage the flange 52 when the transmission is set into place.

The transmission itself includes in general a centrifugal impeller or other pumping element 55 drivingly mounted on the shaft 50 and in proper association with respect to an encircling turbine element 56. This turbine element is carried at its front end by a flange 57 mounted on a ball bearing 58 and is carried at its rear end by a flange 59 mounted on a ball bearing 60.

Ordinarily, the pumping element 55 will take the form of a centrifugal pump, since this is the most convenient form of pump applicable to the present combination and of which I am at this time aware.

The turbine member 56 is provided with one or more forward driving turbine sections 61 and 62, and also under ordinary circumstances is provided with a reversing turbine section 63. The construction of these will be explained more in detail presently.

The pumping element 55 can be moved back and forth lengthwise of the shaft 50 while still maintaining its proper driving connection to said shaft in all positions. These results are made possible by the presence of a longitudinal slot or key-way 64 in the drive shaft 50 together with a cross block 65 which works in said slot and projects beyond the surface of the shaft 50 a sufficient distance to drivingly engage the pump member as shown more particularly in the detail of Fig. 7. A pair of pins 66 reach outwardly from the key block 65 into the body of the pump so as to establish a longitudinal connection between the parts, so that as the key block is drawn back and forth in the slot 64 the pump is compelled to follow. The pins 66 may be set into place by reason of the presence of a relatively large opening 67 in the rear end of the key block 65 through which the pins 66 may be inserted.

A rod 68 extends centrally through the drive shaft 50 and has its front end connected to the cross block 65 as clearly shown in Fig. 1, so that by drawing said rod back and forth the pump element 55 is also drawn back and forth.

Intermediate between the turbine member 56 or a portion thereof and the pumping element 55 is located, what I shall call, a guide vane ring or stationary control section 69. This control section is fixedly carried by means of a stationary flange 70 in a rigid manner and which flange is connected to the casing of the transmission and in effect becomes a rigid portion thereof.

This control section includes a set of vanes 71 in substantial alignment with the turbine section 61 and another set of vanes 72 in substantial alignment with the turbine section 63. The inner ends of the vanes 71 and 72 commence immediately adjacent to the position of the discharge portion of the pumping unit 55, so that the oil delivered therefrom will be taken immediately into the vanes of the control section. The discharge ends of the control vanes deliver immediately into the intake ends of the turbine vanes, so that the oil discharged from the control vanes immediately flows into the turbine vanes.

Ordinarily, the turbine section 62 will be carried inwardly a distance sufficient to reach into immediate proximity to the discharge openings of the pumping element when in alignment therewith without the intervention of any control section at this point. In some cases, however, it may become desirable to have the control section also extended into alignment with the turbine section 62.

Intermediate between the positions of the control sections 71 and 72, and therefore also intermediate between the turbine sections 61 and 63 there is a neutral position 73 in the control section. This neutral section 73 is of cylindrical form and proper size, so that when the pumping unit 55 is located therewithin the discharge openings of the pumping unit are substantially sealed against any outflow of oil.

The position of the pumping unit opposite to the control section 73 is the neutral position from which the pumping unit may be moved forward to the reversing position where are located the control section 72 and reversing turbine 63. On the contrary, the pumping unit may be drawn rearward to discharge through the first forward control section 71 and first forward turbine 61, and, thereafter, to the position where the pumping unit will discharge directly to the second forward turbine unit 62.

In alignment with the drive shaft 50 is the propeller shaft 74 which delivers the power to the rear wheels of the vehicle, or to any other desired point of delivery. The shafts 50 and 74 are brought together at the point 75 with a certain amount of overlap so as to retain them in proper alignment. The propeller shaft 74 is provided with a longitudinal slot or keyway 76 within which there is located a transverse block 77 whose ends reach beyond the outside surface of the shaft 74 a sufficient distance to be engaged by a collar 78 which is slidably mounted on the propeller shaft. Said collar includes two parts, one of which is a ring 79 which may be secured to the other part by means of two or more lugs 80, as shown in Fig. 1 in particular. This two piece construction is illustrated for the purpose of making it possible to place the collar 78 on the shaft 74 at the same time properly engaging the projecting ends of the block 77.

The control rod 68 reaches centrally through the shaft 74 into the slot 76 and is pivotally connected to the block 77 as shown at 81, so that the rod 68 and block 77 may rotate at different speeds. Nevertheless, the back and forth movements of the collar 78 are at all times communicated to the pumping unit 55 through the medium of the rod 68.

The turbine unit 56 is drivingly connected to the shaft 74 whenever the pumping unit stands at either the neutral position illustrated in Fig. 2 or at any of the turbine drive positions. In those cases in which the driving connection between the turbine unit and the shaft 74 is permanently established, the turbine will also rotate with the shaft 74 even when the direct drive position, presently to be described, is reached, so that in such cases the turbine would be driven at high speed during a large portion of the time the device is in use. In the particular construction illustrated, however, I have made provision for disengaging the turbine element from the shaft 74 whenever the pumping unit stands in direct drive position, so that the turbine will not be unnecessarily driven, thereby reducing the wear and tear on the parts, and, therefore, immediately lessening the tendency towards unnecessary leakage and consequent waste of energy.

Behind the turbine drive positions there is located a cylindrical chamber 82 into which the pumping unit 55 may be drawn during the direct drive operation. This chamber 82 is of proper size and length to accommodate the pumping unit and seal its discharge openings, so that as long as the pumping unit stands within said chamber, it will be effectively sealed against any outward discharge of oil with consequent wastage of power. This chamber 82 is connected with a flange 83 by means of a radial section 84 (see Fig. 10 in particular), which flange 83 is in turn supported by a spider 85, which spider is carried by a ball bearing 86; the hub portion of the spider 85 is provided with a keyed flange 87 which engages the key-ways on the forward end of the shaft 74. Consequently, the spider 85 is at all times in driving connection with the shaft 74, and furthermore, the flange 83, section 84, and cylindrical chamber 82 are all in driving connection with the shaft 74 and rotate in exact harmony therewith. For this reason whenever the pumping unit is drawn into the chamber 82 and the direct drive established, so that both of the shafts 50 and 74 are rotating at the same speeds, the pumping unit 55 and chamber 82 will rotate at the same speed and thus eliminate any wear due to relative movement during direct drive.

Surrounding the chamber 82 is a multiple disk clutch 88 which normally establishes a driving connection between the turbine unit 56 and the chamber 82. This multiple disk clutch includes plates 89 which are drivingly connected to the turbine unit, and other plates 90 which are drivingly connected to a sleeve 91 immediately surrounding and connected to the outside of the chamber 82. Consequently when the plates 89 and 90 are brought together a driving connection is established between the turbine unit and the chamber unit 82. This drawing together is performed by the presence of a number of lugs 92 which reach across the radial section 84 and are provided with openings accommodating the radially extending bars 93. Each of these radially extending bars is located in a socket within the radial section 84, and is normally pressed inwards by means of a spring 94 within said socket. Each of the bars 93 is also provided with a cam shaped face 95 which engages the lug 92, so that when the bars are pressed radially inwards by the springs 94, the sleeve 91 is drawn rearwardly to thereby place the plates under compression.

It thus appears that a driving connection is normally established by the clutch 88, but that upon forcing the bars 93 radially outwards the clutching action will be disengaged and the turbine unit thus disconnected from the shaft 74.

Another multiple disk clutch 96 is provided inside of the flange section 83. This clutch 96 is for the purpose of establishing a direct drive from the shaft 50 to the shaft 74 in the following manner: A circular flange 97 is located to the inside of the clutch 96, said flange 97 being carried by a hub portion 98 which is connected to the rear end of the drive shaft 50 and rotates at all times therewith. The clutch 96 includes a series of plates 99 which are connected to the flange 97 and another series of intermediate plates 100 which are connected to the flange 83. The flange 83 carries a sleeve 101 which may be drawn forwardly to place the plates 99 and 100 under compression, said sleeve 101 being keyed to the flange 83, as clearly shown in Fig. 12. To draw the sleeve 101 forwardly it is provided with a series of lugs 102 which have holes through which extend the radial bars 93. These radial bars are also provided with cam surfaces 103, so that when the radial bars are forced outwardly at the time that the clutch 88 is disengaged, the sleeve 101 is drawn forwardly to thereby simultaneously engage the clutch 96 and establish the desired direct drive.

The rear portion of the pumping unit 55 is provided with a beveled or cone shaped surface 104 which will ride under the inner ends of the bars 93 as the pumping unit is drawn into the chamber 82 to thereby force the bars 93 radially outwards at the same time that the pumping unit is drawn into said chamber. Consequently, the reversal of clutch action to establish the direct drive and disengage the turbine unit takes place in harmony with the sealing of the pumping unit within the chamber 82.

When the pumping unit has been fully drawn into the direct drive position a dwell 105 adjacent to the surface 104 rides under the bars 93 so as to retain said bars in the radial outer position against the force of their springs 94 without the necessity of holding the pumping unit in the direct drive position by some outside force. That is to say, that when the direct drive relationship has been established, it will be maintained without the continued application of a special force for that purpose.

In order to establish at all times a proper amount of pressure between the plates of the direct drive clutch 96 when the pumping unit is in the direct drive position, and in order to make the parts operate with greater facility, I have provided the following construction: The inner end of each of the bars 93 carries a ball 106 which is cushioned by a block of rubber or other yieldable material 107. If desired, a hemispherical block 108 may be set between each of the balls 106 and the rubber block 107 so as to permit the ball to rotate easily while at the same time presenting the advantage of a slightly yieldable element in the form of a rubber block. The parts should be so proportioned that when the pumping unit is drawn into direct drive position the rubber block is slightly compressed so as to ensure a solid pressure between the plates of the direct drive clutch.

The pumping unit 55 herein illustrated comprises a centrifugal pump having a single central intake opening 109 discharging to the peripheral discharge opening under pressure. This centrifugal pump includes a series of vanes 110 whose discharge edges draw rearwardly with respect to the direction of rotation, as is clearly evident from Figs. 2, 4, and 6. The inner ends of these vanes are carried in a somewhat axial direction so as to face the incoming oil, as is clearly apparent from Fig. 1.

When the impeller is discharging oil at its periphery there is created an axial reaction tending to shift the impeller forwardly in Fig. 1 and away from the oncoming oil. The amount of this reaction is represented roughly by the amount of work being momentarily delivered into the oil being discharged. This reaction should be balanced, so that it will not be necessary to hold the impeller at a given point on the shaft, but that on the contrary, the impeller will stand at any given position where it may be set; in other words, be at all times in a condition of balance. For this purpose, I have curved the intake ends of the vanes in a forward direction with respect to the direction of rotation, as shown at 111 in Fig. 3, Fig. 3 being a somewhat diagrammatic, developed section taken on the line 3—3 of Fig. 1, looking in the direction of the arrows. From this it appears that the intake ends 111 of the vanes constitute in effect a propeller tending to draw the impeller of the pump towards the incoming oil, and the shapes of the vanes may be so determined that this tendency will at all times be substantially equal and counter balance the reaction previously referred to, so that the impeller will remain in any given position without the continuous application of a restraining force.

Examination of Fig. 1 shows that the axial length of the discharge portion of the impeller, and also that the widths of the various impeller and other passages are such that the impeller is fully sealed when in the neutral position, but may pass by a gradual transition to the reversing position, or to the first forward drive position. Also that the width of the dead space between the first and second forward drive positions is less than the width of the discharge portion of the impeller, so that in passing between the first and second forward drive positions there is no complete interruption of the delivery of oil to the one or the other turbine section. It is also evident that the parts are so proportioned that in passing from the turbine drive to the direct drive position, the direct drive clutch 96 begins to come into action before the delivery of oil to the turbine section 62 has ceased, so that there is no interruption in the driving action during this procedure. It is thus possible to pass by a smooth and gradual process of transition from stage to stage and without any discontinuance of the delivery of power to the shaft 74, as well as without any jerk or jar whatsoever such as would be occasioned by a sudden positive engagement.

The pumping unit, as well as the control section and turbine unit may be built up in any convenient manner, largely according to the manufacturing processes which it is desired to employ. In the particular construction illustrated in the drawings I have shown a completely built up construction for the control and turbine sections. For this purpose the control section includes the end plate or flange 70 which has already been referred to, as well as another end plate 112, an intermediate ring or block 113, and reversing vanes 114 and first position forward drive vanes 115. The faces of the end and intermediate blocks are suitably slotted to receive the vanes, which vanes are then set into place and all of the blocks are drawn snugly together by through bolts 116, all of which construction will be readily apparent from a comparison particularly of Figs. 1, 2 and 4.

In like manner the turbine unit is built up from the end blocks 117 and 118, together with the intermediate blocks 119 and 120, and the reversing turbine plates 121, first forward drive turbine plates 122 and second forward drive turbine plates 123. All of the blocks 117, 118, 119 and 120 have their faces properly slotted to receive the turbine vanes, which vanes are then set into place and all of the parts drawn solidly together by the through bolts 124, as clearly evident from a comparison of Figs. 1, 2, 4 and 6.

The oil discharged from any of the given turbine units when in operation should be carried away in the proper manner, or should be returned to the intake side of the pumping unit. Furthermore, when any given section of the turbine unit is not being used in the driving function it should be sealed against the discharge of oil such as would be occasioned by the generation of pressure due to its rotation. I have for the foregoing and other reasons provided the arrangement of passages and valve mechanisms which I will now describe more in detail:

There is provided a circular casing 125 which surrounds the turbine unit and reaches rearwardly far enough to substantially enclose the various clutch elements and similar parts which have already been described. This casing is of generally cylindrical form, its front face being closed by a plate 126. This plate 126 is shown as being rigidly connected to the hub portion 127 of the bracket 70 which carries the control section 69, and it is in this way that the control section is held rigid with respect to the casing.

The ball bearing 58 which carries the flange 57 supporting the front end of the turbine is preferably located on a shoulder of the hub portion 127, so that said ball bearing may be made of relatively small size.

The front portion of the casing is enclosed in the manner which I will describe more in detail presently.

Within the casing there are located three annular passages 128, 129 and 130 in alignment with the positions of the turbine sections 63, 61 and 62 respectively. These annular passages are for direct reception of oil delivered from their respective turbine sections. The casing encloses the outer periphery of the turbine sufficiently close to substantially prevent such an amount of cross transfer of oil between the turbine sections as would seriously interfere with the operation of the machine or seriously impair its efficiency.

Extending rearwardly of the casing from the annular passage 128 are the passages 131, 132 and 133, each of which is of less radial dimension than the radial dimension of the adjacent annular passages 129 and 130, so that these passages 131, 132 and 133 may be carried past the annular passages 129 and 130 without intercommunication. These passages 131, 132 and 133 are used for conducting away the oil discharged from the reversing turbine section when in service.

Leading rearwardly from the annular passage 129 is another series of three passages 134, 135 and 136 which are also of less radial dimension than the radial dimension of the annular passage 130, so that these passages 134, 135 and 136 extend past the passage 130 without intercommunication. These passages 134, 135 and 136 are used for carrying oil away from the first forward turbine section when in service.

Extending rearwardly from the annular passage 130 is another series of passages 137, 138 and 139 each of which may be of substantially the full radial dimension of the passage 130, since these passages 137, 138 and 139 do not have to extend past any other annular passages. Comparison of the various passages, as shown in Fig. 6 in particular, shows that although the passages 131, 132, 133, 134, 135, and 136 are of only substantially one-half the radial dimension of the passages 137, 138 and 139 they are each of substantially twice the angular dimension of the passages 137, 138 and 139, so that the cross sectional area of all of the passages is substantially the same. I have, therefore, provided an arrangement in which the cross sectional area of all of these passages is substantially the same notwithstanding the fact that certain of the passages must reach past other annular passages without intercommunication.

Examination of Fig. 1 shows that the size of the casing tapers in a rearward direction, so that the extreme rear ends of the passage lie somewhat closer to the shafts than their forward ends. Furthermore, their rear ends are turned inwardly in a somewhat radial manner, so that they face more or less directly towards the axis of rotation.

The rear end of the casing is supported on the shaft 74 by means of a ball bearing 140, as clearly shown in Fig. 1.

In the rear end of the casing and in proper relationship to the inwardly facing ends of the various passages is a cylindrical shaped valve 141 which is carried by a radially placed plate 142. Said cylindrical valve 141 underlies the inner ends of each of the passages and is provided with three equally spaced ports 143, 144 and 145, as clearly shown in Fig. 14.

Examination of Fig. 14 shows that at the point at which it is taken in sectionalizing Fig. 1, all of the passages 131, 132, 133, 134, 135, 136, 137, 138 and 139 are of equal radial dimension and also of equal angular dimensions, the angular dimension at the section of Fig. 14 being equal to the angular dimension of the ports 137, 138 and 139 as originally established at their commencements at the section of Fig. 6. The passages 131, 132, 133, 134, 135 and 136 have been deepened radially but contracted angularly in compensating fashion, so that the cross sectional areas have been retained practically unchanged. In doing this the side walls of the passages 137, 138 and 139 have remained practically unchanged, but passages 134, 135 and 136 have been drawn towards the corresponding passages 137, 138 and 139 so as to leave certain blank spaces 146, 147, and 148 respectively, and also one of the walls of each passage 131, 132 and 133 has been drawn towards the other wall of such passage so as to leave other blank spaces 149, 150 and 151.

The passages 131, 132 and 133 are reversing passages, the passages 134, 135 and 136 are first forward drive passages, and the passages 137, 138 and 139 are second forward drive passages, and the blank spaces 146, 147 and 148 are what I will term neutral spaces, the spaces 149, 150 and 151 are what I shall term direct drive spaces.

The ports 143, 144, and 145 of the valve 141 are of substantially the same angular dimension as the angular dimension of the various passages and blank spaces, so that by turning the valve 141 said ports may be brought simultaneously into register with any of the groups of passages or blank spaces as selected. Consequently, by turning the valve 141 in the direction of the arrow of Fig. 14, the ports will be brought successively and simultaneously into register with the passages for the first forward drive position, and then for the second forward drive position, and finally to the blank spaces corresponding to the direct drive position; whereas by turning the valve backwardly from the neutral position the ports will be brought simultaneously into register with the passages for the reversing position. The total amount of angular movement in passing from the neutral position to the direct drive position is equal to 72° in the particular arrangement shown in the drawings, and the amount of movement necessary to travel from the neutral position to the reversing position is 24° in the arrangement shown in the drawings.

In connection with the foregoing it is observed that there are only provided three sets of passages and blank spaces in the particular construction illustrated. By increasing the number of sets of these passages the amount of angular movement necessary to pass from neutral to direct drive or from neutral to reverse will be reduced, and in some cases it may be desirable to use as many as six or even more sets of passages. Therefore, I do not intend to limit myself to the number illustrated in the drawings, except as I may do so in the claims.

Figure 8:
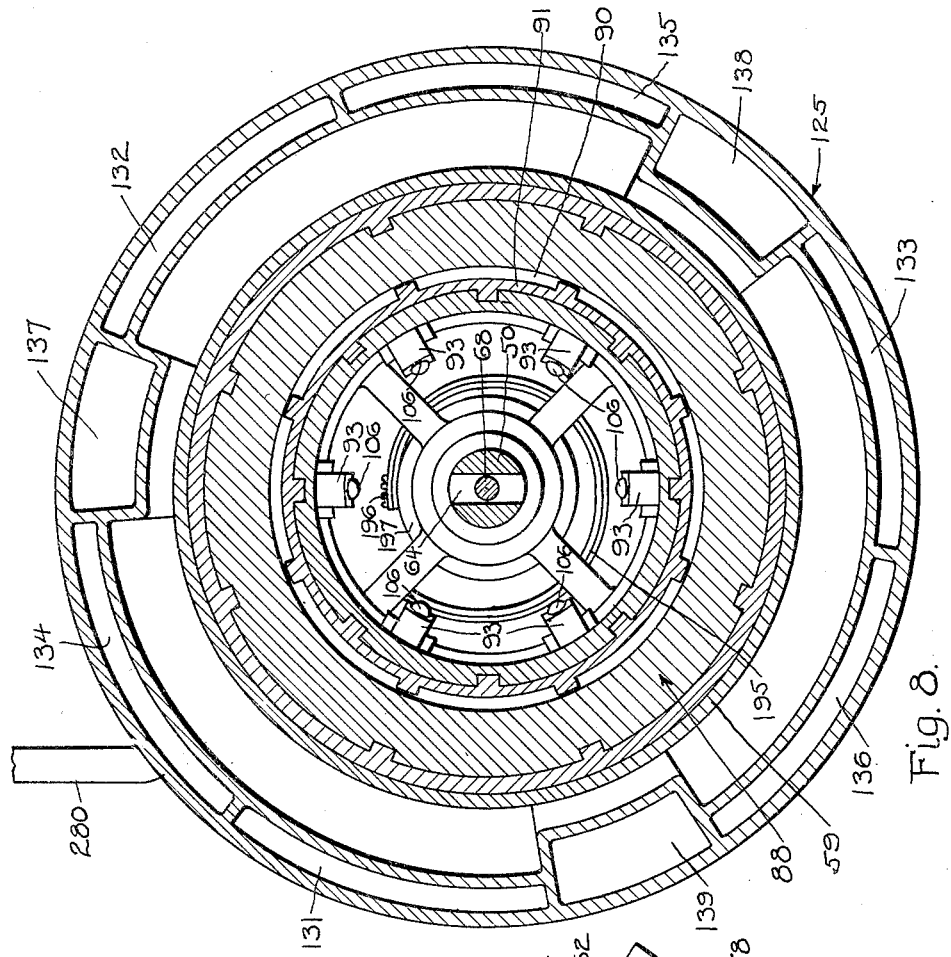
Fig. 8 shows a cross section taken on the line 8—8 of Fig. 1, looking in the direction of the arrows.
Figure 9:
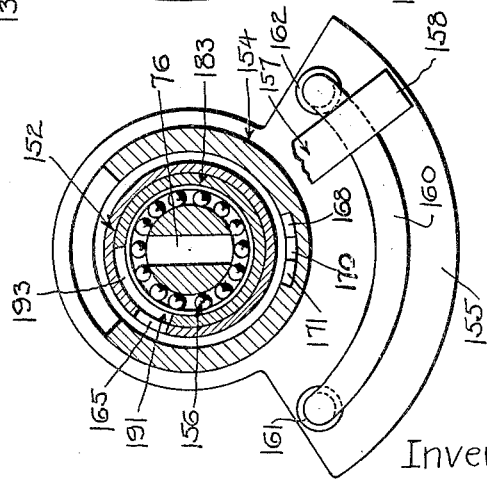
Fig. 9 shows a cross section taken on the line 9—9 of Fig. 1, looking in the direction of the arrows.

Referring to Figs. 8, 10 and 12 which are cross sections taken at points intermediate between the positions of the sections of Figs. 6 and 14, the manner in which the form of the various passages is converted into the final form shown in Fig. 14 will be readily apparent. For example, in Fig. 10 the passages for the reversing and first forward drive positions have been increased in radial dimension and reduced in angular dimension as compared to Figs. 6 and 8; and in Fig. 12 this transition has been carried a further step. Furthermore, in Fig. 10 the blank spaces are shown as of small size, whereas in Fig. 12 the size of these blank spaces has increased very materially.

It will be observed from comparison of Figs. 10, 12 and 14 that the blank spaces over the valve 141 are in direct communication with the interior of the casing and consequently with the intake side of the pumping unit. Furthermore, any oil which may possibly leak past the valve from either the reversing or the first or second forward drive passages will find its way directly to the interior of the casing, so that there will be no possibility of building up oil under pressure behind blank walls of large size where undesirable thrusts might be created.

I wish also to here point out that inasmuch as the valve 141 is of cylindrical form the pressures exerted against it from the different passages are always exactly balanced and no end thrusts are created on the valve itself. Consequently, it is not necessary to make special provision for resisting end thrusts nor for resisting heavy side pressure due to hydrostatic pressures. This is a very important feature for the reason that the various passages are of comparatively large size at the places where they communicate with the valve, and therefore, very substantial pressures are created against the surface of the valve, which, however, are balanced as above pointed out.

When the valve 141 stands in the position of Fig. 14 all of the passages are closed and the communication of the ports 143, 144 and 145 with blank spaces does not allow any flow of oil. It is desired to provide an arrangement whereby the valve may be turned in proper fashion so as to allow the flow of oil in proper harmony with the operation of the pumping unit or for other purposes. The oil flowing through the ports 143, 144 and 145 will ordinarily return directly into the central portion of the machine, although as will presently be explained, means have been provided for diverting the oil through a cooler in certain conditions or as desired.

The flange 142 on which the valve is mounted has a rearwardly extending sleeve 152 which reaches through what I will call the control section. By turning this sleeve the valve is turned.

It is already apparent that means should be provided for shifting the collar 78 back and forth so as to control the position of the pumping unit. These various controlling means I will now explain in detail.

The collar 78 is provided with a radially extending pin 153, which pin is made of two parts as shown in Fig. 17 as a matter of convenience in construction and assembly. By pulling this pin back and forth the position of the pumping unit will be shifted since the collar is thereby also shifted.

Reaching rearwardly from the casing or from the rear head thereof is a stationary neck 154 whose diameter is relatively reduced as compared to the body portion of the casing. This neck preferably carries at its rear end a block 155 which is also stationary. The shaft 74 is supported by a ball bearing 156 at the point where it passes through the block 155.

Surrounding the neck 154 is a pear shaped collar 157, the width of whose central portion is such that it can turn freely on the neck 154 and also rock back and forth in the manner to be explained, while at the same time preventing any substantial amount of free sidewise movement. This collar 157 has at its lower end a bifurcated lug including the fingers 158 and 159. A curved stationary bar 160 is rigidly supported from the rear end block 155 by having its ends 161 and 162 secured to said block 155, the curvature of the bar 160 being on the arc of a circle drawn about the shaft as a center. Consequently, the collar 157 may be rocked back and forth while its lower end pivots on the bar 160, and also the collar 157 may be turned angularly around the neck 154, the bifurcated portion of the collar sliding on the curved bar 160 for this purpose.

The pin 153 is connected to the upper portion of the collar 157 by a cross pin 163 as shown particularly in Fig. 17. A control handle 164 is conveniently connected to the upper portion of the collar 157. Consequently, by pulling said control handle back and forth the collar 157 is swung back and forth on the rod 160 and at the same time draws the pin 153 with it, but the bifurcated lug of the collar is compelled to slide up and down on the curved rod 160, since the pivotal point 163 is at a fixed distance above the shaft.

It is also observed that the rod 160 is located relatively close to the rear block 155 and substantially beneath the direct drive position of the pin 153. At this point the distance between the rod 160 and the pin 163 is reduced to a minimum, so that the leverage which will be exerted tending to pull the pin 153 to the rear is at a maximum, said leverage being relatively smaller when the pin 153 is at either the reverse, neutral, first or second forward drive positions. The purpose of this arrangement will be explained presently.

The pin 153 reaches upwardly through a slot 165 of the valve collar 152. This slot 165 is of proper width to allow the pin to slide back and forth without unnecessary play. Consequently, the valve collar will be turned so as to rotate the valve depending upon the relative movements of the pin 153 as compared to the form of the slot 165. By properly forming said slot as compared to the back and forth movements of the pin, it will be possible to harmonize the valve movements with respect to the changing positions of the impeller, or to bring about other operations as desired.

The handle 164 reaches upwardly through an opening 166ᵃ in the floor board 43 and in convenient access to the driver of the car. It will presently appear that said handle is usually to be subjected to sidewise movements as well as back and forth movements. The direct drive position is that in which the handle stands close to the seat 39, and in order to provide the most convenient arrangement the handle should stand in line with the center of the car so as to not interfere with the convenience of the occupants of either of the front seats. At the same time owing to the desired angular or sidewise movements, the neutral position of the handle should be at one side of the center line of the car so as to equalize the swing of the handle to both sides of the car.

The curvature of the slot 165, shown in the drawings, has been established on the assumption that the handle is to stand to the right of the center line of the car when in the neutral position, the handle pulling rearwardly to the center line of the car to the direct drive position. Consequently, the angularity of the slot 165 plus the angular movement of the handle during this evolution is correct for turning the valve 141 from the neutral position to the dead spaces corresponding to the direct drive position.

The forward end of the slot 165 is formed on such curvature that in pushing the handle forwardly from the neutral position to the reversing position, or away from the driver, the proper turning of the valve will be performed with a straight push of the handle.

It is now evident that as the handle is pulled rearwardly through the first and second forward drive positions to the direct drive position, the valve is turned in proper harmony with the changing position of the impeller so as to allow for the proper return of oil from the turbine sections, and so as to keep those sections sealed through which oil is not being delivered by the impeller. Furthermore, when the handle stands in the direct drive position all of the passages are closed by the valve, so that no circulation of oil can take place from any of the turbine sections if the turbine should perchance be rotated. It is understood, however, that when the handle is in the direct drive position the turbine element is ordinarily disconnected from the rotating parts and is standing idle.

As soon as the handle is pushed forward away from the driver, the turbine is again clutched onto the propeller shaft 74 and immediately the turbine commences to rotate. This will result in the generation of oil pressures at the outer periphery of the turbine, and the amount of these pressures will depend upon the square of the speed of travel of the car. If the valve 141 be turned to allow return communication from any of the turbine passages there will be a tendency for oil to flow around a local circuit under pressure generated by the turbine rotation, and this flow of oil will cause a drag on the movement of the vehicle since it will represent a transfer of power from the shaft 74 into the oil, which power will be delivered by the oil to the pumping unit and thence to the engine tending to rotate the engine from the pumping unit, the same being in alignment with turbine section through which the oil is then circulated. On the other hand, if the pumping unit be not in alignment with such turbine section the circulation of the oil will cause a heating action, so that the energy of the vehicle will be converted into heat. This would take place, for example, if the pumping unit were at the neutral position when the valve was opened.

It is thus evident that the mechanisms so far disclosed may be used to bring about a drag or braking action by proper control of the valve, and also that this drag or braking action may be produced either by delivery of energy to the engine shaft connection 50 or by wastage of energy in heat. I have provided an arrangement whereby it is possible to move the pumping unit back to the neutral position where it is sealed, without opening the valve, it being understood that the valve is in the closed position when the handle is at the direct drive position. This result I accomplish by bringing the handle forwardly or away from the driver along a path of movement such that the pin 153 travels along the slot 165 of the valve sleeve without rotating the valve itself. In other words, during the return of the pumping unit to the neutral position the handle is given an angular swing in harmony with the curvature of the slot 165, so that the pin 153 does not turn the valve away from the closed position at which it stood when the handle was at direct drive. Having accomplished this evolution the handle stands at a forward position such as to hold the pumping unit at neutral, and the valve is also closed. The valve has not been opened at any time during this evolution and therefore no drag has been brought onto the vehicle, and the vehicle may coast along entirely free or disengaged from the engine and without any braking effect.

Having thus placed the pumping unit back into the neutral position the valve may be turned so as to allow return communication from either of the forward drive turbine sections, whereupon oil will be circulated through such section by the forward momentum of the vehicle. This turning of the valve may be accomplished by swinging the handle across the vehicle without moving it either forwardly or backwardly, whereupon the engagement of the pin 153 with the neutral point of the slot 165 will turn the valve sleeve and therefore the valve, there being no back and forth movement of the handle, and the pumping unit will remain at the neutral position. It thus becomes possible to bring about the braking action by the aforesaid swing of the handle. In doing this, the valve will first allow flow of oil from the second forward turbine section, and afterwards from the first forward drive turbine section, and finally when the handle has been completely restored to its initial or neutral position, the valve will be again closed with the pumping unit also standing at neutral. The amount of drag produced is entirely under the control of the operator, since he can open the valve a greater or less extent depending upon the amount of retardation which is desired. It will be understood, however, that as the vehicle slows down the braking action will rapidly fall, since the oil pressure generated to cause circulation depends upon the square of the rotative speed.

It is now seen that the control handle 164 may be moved through a triangle travel; the first leg of the triangle carries the handle from neutral through the accelerating positions to the direct drive position; the second leg of the triangle carries the handle from the direct drive position to the coasting position without any braking action; and the third leg of the triangle carries the handle from the coasting position through the braking positions to the initial or neutral position. The reversing action is produced by a movement of the handle from the neutral position away from the triangle a sufficient distance to carry the pumping unit to the reversing position with the corresponding proper rotation of the valve.

These various handle evolutions may be performed by the operator without guiding means, relying entirely upon his skill and knowledge of the apparatus, or special guiding means may be provided such as I will now explain in detail. For this purpose, I have provided a sleeve 166 which surrounds the valve sleeve 152 and has a hole through which extends the pin 153. Said sleeve 166 has a lug 167 which extends into a slot on the inner surface of the neck 154, so that the sleeve is compelled to turn and thus cause the pin 153 to turn in accordance with the form of said slot, so as to give the proper harmony of turning and back and forth movements. This slot is shown in detail in Fig. 20, which is a section looking at the inside surface of the neck 154. The slot includes the accelerating leg 168 which reaches from the neutral position 169 to the direct drive position 170; a coasting leg 171 which reaches from the direct drive position 170 to the coasting position 172; and a braking leg 173 which reaches from the coasting position 172 back to the neutral position 169.

The slot also includes a leg 174 reaching forwardly from the coasting position 169 a sufficient distance to allow the pumping unit to be carried to the reversing position.

The curvature of the leg 168 compels the handle to perform the proper swing in passing from neutral to direct drive, which amount of swing together with the curvature of the slot 165 turns the valve; the curvature of the leg 171 is such that when the handle is moved from direct drive to coasting the pin 153 will slide along the slot 165 without turning the valve; and the leg 173 is such that it compels an angular movement of the handle without allowing the pumping unit to be moved away from neutral.

It will be observed that the control slots just described in detail are easily lubricated, since they are formed in the lower portion of the neck 154 within which oil may be easily trapped.

If it should be desired to move the handle back and forth between the leg 168 and the leg 171 at the position of either first or second forward drive, this may be done by the cross slots 175 and 176, shown in Fig. 20. Manifestly, however, these cross slots may be used or not as desired. In many cases they will not be called upon for service.

The amount of angular swing to be performed by the handle in the braking portion of its movement is dictated by the angular movement which must be performed by the valve to pass from the closed direct drive position to the closed neutral position. By increasing the number of sets of passages this angular movement may be reduced. In some cases it may be desirable to use six or more sets of passages, in which case the angular movement will be substantially smaller than that herein illustrated. This will in some cases result in increased convenience of construction and use, since the evolutions of the handle will be readily understood from examination of Fig. 25 in which the general form of the floor board opening 166ª will be seen.

It was previously explained that one feature of the invention relates to the provision of means for cooling the oil, and that this cooling means has been worked out in such manner that in the ordinary operation of the apparatus, the oil is not circulated through the cooler, but is returned direct to the pumping unit, whereas whenever the apparatus is being used for the braking function the oil will be diverted through the cooler, or will be diverted through the cooler in case the oil exceeds a certain temperature. I will now explain these constructions more in detail.

Adjacent to the valve 141 there is a passage 177 which communicates with the manifold 178 extending across the rear upper portion of the body of the machine. Oil delivered into the manifold 178 will travel therefrom downwards through the cooling pipes 179 and 180 at the sides of the machine, which pipes are located in the natural line of flow of the current of air which flows past the engine and down under the foot boards and the floorboards of the vehicle, all of which will be readily understood from examination of Fig. 24.

The oil from the cooling pipes 179 and 180 is collected into a lower manifold 181. From this lower manifold it may be returned directly to the central portion of the machine and to the pumping unit.

Adjacent to the valve 141 is located a radial deflector plate 182. This deflector plate is connected to a deflector sleeve 183 which reaches along just inside of the valve sleeve 152. By turning the deflector sleeve the deflector plate will be turned. The deflector plate is provided with deflectors 184, 185 and 186 corresponding to the valve ports 143, 144 and 145. These deflectors curve towards the rear and terminate against the valve flange 142. Said valve flange has the openings 187, 188 and 189, as shown in Fig. 22, through which may pass oil from the deflectors when the proper registry is established. Manifestly, if the deflectors be in register with the valve openings 143, 144 and 145 while oil is coming through them, said oil will be caught by the deflectors and thrown towards the rear. If the ports 187, 188 and 189 be in registry with the deflectors and with the passage 177 while the oil is coming through them, said oil will be delivered into said passage, and thereafter to the cooler. The oil then passing through the cooler will be returned from the manifold 181 and upwardly through a passage 190 into the central portion of the machine and towards the pumping unit.

I have provided an arrangement such that in the ordinary turning of the valve 141 to carry its ports into proper position for allowing the flow of the oil during acceleration, the deflector plate is not turned but is retained at the initial or neutral position, so that the deflectors stand in the position shown in Fig. 14. Under these circumstances, the valve ports 143, 144 and 145 travel away from the deflectors and the oil is not thrown into the cooler, but on the contrary the cooler is sealed from the pumping unit by the deflector plate 182 and the oil is returned directly to the pumping unit.

I have also provided an arrangement such that when the control handle is shifted from the direct drive to the coasting position, the deflector plate 182 is turned by the sleeve 183 so as to carry the deflectors 184, 185 and 186 around into register with the respective valve ports 143, 144 and 145, which it will be recalled are standing at the direct drive closed position. Therefore, when the handle reaches the coasting position the deflectors have again been brought into register with their proper valve ports, and also at this time the openings 187, 188 and 189 of the valve plate are in communication with the passage 177 and with the deflectors. In this connection, the opening 189, shown in Fig. 22, happens to stand in communication with the passage 190, but it will be understood that no oil is flowing through the opening 189 when in the position of Fig. 22, since this is the neutral position.

Having brought the deflectors into registry with the proper valve ports and valve plate ports at the coasting position, I have provided means whereby the deflector plate will be turned in harmony with the valve 141 during the restoration of said valve towards the neutral position, so that as the valve ports successively open the passages for the second and then for the first forward drive turbine sections the oil will be taken through the deflectors and sent through the cooler.

This means takes the form of a slot 191 in the deflector plate sleeve 183, which slot 191 is of the general form such that the pin 153 which reaches through it will not cause any rotation of the deflector plate during the movement of the pin 153 from the neutral to the direct drive position. On the other hand, as the control handle is moved from the direct drive to the coasting position the pin 153 compels the deflector plate to rotate through the proper amount of angularity by reason of engagement with the slot 191. As the control handle is rocked from the coasting to the neutral position, the deflector plate sleeve is turned in harmony with the valve sleeve.

From the foregoing construction it appears that the deflector plate establishes the cooling action whenever the control handle is operated along the braking leg 173. If perchance it should be desired to cool the oil during an operation on either first or second forward drive positions, this can be done by reason of the following construction: I have provided recesses 192 and 193 in one side of the slot 191 of the deflector plate sleeve, which recesses are of proper size to permit the deflector plate sleeve to be turned far enough in either instance to bring the deflectors into registry with the valve ports. For example, when the control handle stands in the first forward drive position the pin 153 is opposite to the recess 192, so that in such position the deflector plate may be turned far enough to bring about the desired harmony between the deflector plate and the valve. A similar harmony may be established for the second forward drive position by reason of the notch 193.

The turning of the deflector plate under either of the foregoing conditions may be performed either by hand, as by a handle engaged with the deflector plate sleeve 183 through the medium of a slot 194 at the end of the valve sleeve 152, or by thermostatic means. I have provided a thermostatic device for turning the deflector plate when the temperature of the oil exceeds a certain upper limit, so that under these circumstances the oil will be thrown through the cooler even during the first and second forward drive positions as well as during the braking operation. This takes the form of a curved compound bar 195 whose inner end 196 is rigidly secured to a stationary part such as the flange 197 which is carried by the ball bearing 140. The other end of this compound bar may press against a lug 198 on the deflector plate or on one of the web arms thereof. The compound bar is made of two metals having different temperature co-efficients of expansion, so that as its temperature rises it tends to push the lug 198 over towards the right in Fig. 14. There is sufficient elasticity in this compound bar to allow the same to bend a slight amount, but its elasticity will carry it back to the position dictated by its temperature. It will be observed that this compound bar lies at a point where it will be readily heated by the oil coming from the valve 141 and flowing towards the pumping unit.

With the foregoing arrangement, it is possible for the operator to shift the deflector plate for the purpose of causing oil to flow through the cooler independently of the operation of the thermostatic device, since the first mentioned operation results in moving the lug 198 away from the end of the compound bar.

Examination of Fig. 15 shows that the notches 192 and 193 have their end portions formed on a slant. Consequently, if it should be desired to shift the operating handle while the deflector plate sleeve 183 is turned and the pin 153 engaged by one or the other of the notches 192 and 193, such movement of the operating handle can be easily effected, since the slanting faces of the notches will cause the sleeve 183 to rotate backwardly and deflect the compound bar momentarily during such movement.

The cooler illustrated includes the pipes 179 and 180. Examination of Figs. 23 and 24 in particular shows that these pipes slant forwardly a slight amount so that they lie mostly directly across the path of the air current flowing rearwardly and downwardly along the engine. Although, I have illustrated each side of the cooler as comprising only a single pipe, still it would be a simple matter to substitute a plurality of pipes or to use corrugated pipes or any other heat dissipating arrangement. It will also be observed that the pipes are provided with the flanges 199 and 200 at their upper and lower ends respectively, so that they can be easily connected to or disconnected from the upper and lower manifolds.

Examination particularly of Figs. 1, 22 and 23, shows that the passages 177 and 190 lie in substantially the same plane. This is possible because the passage 177 does not need to embrace an entire circular arc. It is only necessary for the passage 177 to embrace a sufficient circular arc to be able to gather in oil from the ports 187, 188 and 189 of the valve plate while oil is being delivered through said ports. It is only desired to send oil to the cooler from the passages of either the first or second forward drive positions, since it will seldom if ever be necessary to cool the oil while operating in the reverse position. Examination of Fig. 14 shows that the three lowermost spaces numbered respectively 133, 148 and 150 are for the reversing position, the neutral position and the direct drive position. No oil need be delivered from any of these spaces to the cooler. Consequently, it is not necessary for the arcuate passage to embrace these particular spaces, and therefore a sufficient amount of circular arc may be left unoccupied by the passage 177 to accommodate the return passage 190. It is thus possible to shorten up the length of the structure and bring it within more convenient form.

In connection with the foregoing, I wish to point out that the various passages in the casing have been especially devised so as to make it possible to secure the locating of the three dead spaces at the bottom of the structure instead of at the top. The natural circulation of oil is upwards from the heating source, thence through the cooler, and returning by a lower connection. Therefore, the arrangement above set forth lends itself very well to the natural circulation of the oil.

In connection with the cooler, I wish to point out that when the machine is being used for a retarding action, the heat will be generated in the oil chiefly at those points where the oil undergoes the most serious changes of direction or velocity. Ordinarily, these changes will occur in passing through the deflector and through the ports 187, 188 and 189. Consequently, the heat will be generated in the oil chiefly just before the oil passes to the cooler, and therefore, without the necessity of subjecting the operating mechanisms to any unnecessary heating action.

I wish also to point out that the various passages and manifolds which are used in connection with the cooling apparatus are contained within a head section 201 which is secured to and encloses the rear portion of the casing 125. Consequently, the cooling elements constitute a complete unit which can be readily attached to or detached from the remaining structure, and thus the remaining portions of the structure may be largely standardized and may be used either in conjunction with the cooling apparatus or independently thereof as desired. In those cases in which the cooling apparatus is eliminated, the deflector plate should also be eliminated and the structure correspondingly simplified.

With the structure as so far described the movement of the operating handle across the leg 173 from the coasting to the neutral position will allow circulation of oil due to rotation of the turbine unit. In some cases it may be desirable to restore the operating handle and the valve 141 to the neutral position without opening the passages which communicate with the turbine sections. I have provided means for this purpose. This takes the form of a series of lugs 202, 203 and 204 on the deflector plate 182, so that if the deflector plate is turned to bring these lugs into register with the valve ports 143, 144 and 145 and such registry is maintained while the valve is turned from the coasting to the neutral position, no circulation of oil can take place through the ports, since they will be kept in sealed condition.

It will be understood that these lugs 202, 203 and 204 should be so placed and of such a nature as not to interfere with the proper operation of the valve or of the deflectors in any of the functions already explained. Examination of Fig. 14, in which figure the valve and deflector plate stand at the neutral position, shows that the lugs in such figure stand opposite to the direct drive position. Consequently, as long as the deflector plate stands at the neutral position these lugs do not interfere with the free passage of oil through the valve ports during the movement of the valve to either the reversing or first or second forward drive positions. Assuming that the valve 141 has been turned to carry the ports around to the direct drive position, the position which they occupy when the operating handle is in the coasting position, the deflector plate is at such time normally turned to the position where the deflectors 184, 185 and 186 are also at the direct drive position. This means that under these conditions the lugs 202, 203 and 204 stand opposite to the passages 134, 135 and 136 respectively. Means should therefore be provided permitting the deflector plate to be turned independently of the operating handle so as to restore the lugs 202, 203 and 204 to positions opposite to the valve ports. Such means takes the form of a slot 205 in the deflector plate sleeve 183, which slot is of sufficient length to allow the deflector plate to be turned in the desired manner in order to carry the lugs into registry with the valve ports, all standing at the direct drive position. Then, by restoring the valve to the neutral position and turning the deflector plate with it, the restoration will be made with the valve ports sealed by the lugs, and thus prevent any braking action. Having then restored the valve to the neutral position the deflector plate may be again turned to the neutral position, so that thereafter operation will be conducted in a perfectly normal fashion.

It will be understood that the provision of the lugs on the deflector plate permitting restoration of the valve from the coasting to the neutral position without braking action is an extraordinary provision, and will not ordinarily be used, but the provision has been so made that it can be used when desired, and without in any manner interfering with the perfectly natural operation of the remaining portions of the device.

Examination of Fig. 1 in particular shows that the entire structure is lined up on a common axis of rotation. For this reason, no side thrusts are created on any of the main parts, and the transmission of power between the shafts takes place with a true torque action without any side thrusts on any of the bearings. A ball bearing 206 is provided for supporting the drive shaft 50 at the point where it passes through the hub 127. The propeller shaft 74 is supported by the ball bearings 140 and 156 and is therefore kept in rigid alignment. The rear end of the drive shaft 50 is lined up with the propeller shaft at the point 75; and the ball bearing 86 will also serve to keep the two shafts in rigid alignment. The turbine unit is supported by the ball bearings 58 and 60 which are spaced a considerable distance apart, so that this element is admirably well supported.

The operation of the pumping unit results in generating a hydrostatic pressure at its periphery. Its peripheral portion should, therefore, be sealed in fluid tight manner with respect to the control element 73, or the turbine unit or the cylindrical chamber 82 depending upon the momentary position of the pumping unit. I have, therefore, indicated the annular grooves 207 and 208 in the peripheral portion of the pumping unit. These grooves are of such form and size as compared to the clearance between the periphery of the pumping unit and the encircling member that they effectively serve to prevent any squirting of oil under pressure. For example, if the clearance between the pumping unit and the encircling member be one thousandth of an inch, and the size of the groove be relatively large as compared thereto and of proper form, the outflow of oil under pressure will be so interrupted as the oil passes the grooves that the grooves will effectively serve as sealing rings. There will ensue only a very slight seepage of oil and the percentage loss will be relatively insignificant and may be practically ignored.

This arrangement will greatly reduce the cost of manufacture, since it will be feasible to use clearances which can be readily established without difficulty in ordinary machine tool practice, thus making it possible to secure the necessary sealing action without undue expense in cost of manufacture. Furthermore, this arrangement will make it possible to use a sufficiently large clearance so as to take up the contractions and expansions which will take place with ordinary changes of temperature such as will occur in the operation of the machine, without binding or jamming of the parts.

For a similar reason, I have shown the sealing grooves 209, 210, 211 and 212 in the peripheral portion of the guide vane ring, and the grooves 213, 214, 215 and 216 in the peripheral portion of the turbine unit.

Figure 4:
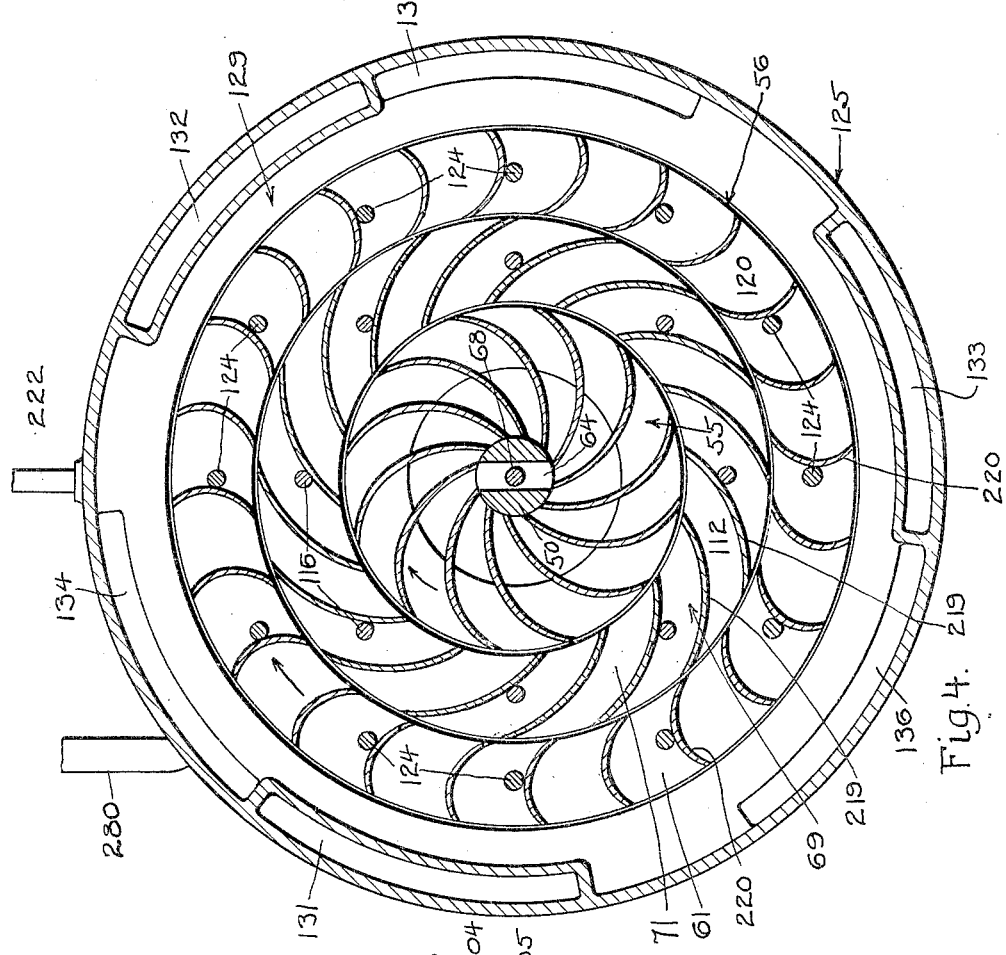
Fig. 4 shows a cross section taken on the line 4—4 of Fig. 1, looking in the direction of the arrows, but with the impeller at the first forward drive position.
Figure 5:
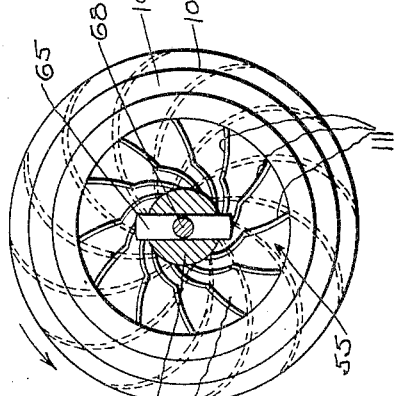
Fig. 5 shows a fragmentary section taken on the line 5—5 of Fig. 1, looking in the direction of the arrows, showing the intake end of the impeller.

Considering Figs. 2, 4 and 6 in particular, it is observed that the vanes 217 of the guide vane ring which stand opposite to the reversing turbine are curved rearwardly and outwardly with respect to the direction of rotation of the impeller, so that as the oil leaves these control vanes it is given a rearward flow. The vanes 218 of the reversing turbine section are so curved as to receive the oil delivered from the control vanes 217 and absorb the energy thereof. These reversing vanes 218 are preferably so grooved that as the oil leaves them at their outer peripheries it has been substantially deprived of any rotary or tangential component of motion, thus absorbing the highest possible percentage of energy from the oil.

The vanes 219 of the control section opposite to the first forward drive turbine are grooved outwardly and forwarded as compared to the direction of rotation of the impeller, so that the oil delivered from the impeller to these vanes is given an added forward component of travel. The vanes 220 of the first forward drive turbine section are then grooved in such a way as to receive the oil delivered from the control section and absorb the energy therefrom, delivering the oil at the periphery of the turbine section substantially without any rotary component of motion. This will ensure the highest possible efficiency of operation.

Considering Fig. 6, the vanes 221 of the second forward drive turbine section receive the oil from the impeller without the presence of any intermediate control section. These vanes 221 have their inner edges formed at such an angle as to receive the oil delivered by the impeller in a most advantageous manner, taking into account the fact that the oil leaving the impeller possesses a tangential or rotary component of motion. The outer edges of the turbine vanes 221 are directed rearwardly at such an angle as to discharge the oil from the turbine substantially without any tangential component of motion and with the highest efficiency.

Considering more particularly Figs. 4 and 6, it is observed that when operating in either of these forward drive positions, the turbine unit is turning in the same direction as the pumping unit, although at a different speed. Consequently, the energy of the oil delivered by the pumping unit which is represented by rotary motion passes at once to the turbine unit and is largely absorbed thereby. For this reason, the efficiency of operation of this arrangement will be very much higher than would ordinarily be expected.

When the pumping unit is delivering power to the turbine unit by delivering oil through one of the sections thereof, the pressure existing at the outer periphery of such turbine section is relatively small, being represented chiefly by the pressure necessary to cause the oil to circulate around the system back to the intake side of the impeller. Furthermore, the peripheral velocity of the outer face of the turbine unit is ordinarily relatively smaller, since the turbine unit is ordinarily used for power drive only during transmission. Therefore, during transmission there will ordinarily be only a relatively small pressure generated at the outer periphery of any of the turbine sections. As a result the problem of sealing the turbine section against oil leakage under pressure is reduced to a minimum during those instances when the turbine is being used for transmission.

After the direct drive position is established, the turbine is normally disconnected and comes to rest, so that there no longer exist any pressures to be contended with. This is ordinarily true during by far the major portion of the operating life of such a machine, since the vehicle is used the great portion of the time in direct drive. When, however, the operating handle is thrown away from the direct drive position towards the coasting position the turbine unit is again clutched onto the shaft 74 and will rotate at the speed of such shaft. In the case of a vehicle travelling at relatively high speed, this will cause a relatively high speed of turbine rotation and the generation of corresponding fluid pressures at its periphery. This condition will ordinarily exist, however, for only a relatively short period of time and during only a very small percentage of the life of the machine.

I wish to here point out that the arrangement so far described lends itself admirably well to the control of vehicles such as automobiles and the like, as well as trucks and their heavy loads. It is possible to set the pumping unit into any of the turbine positions while holding the vehicle stationary, provided the pumping unit be operating at slow speed, since in such case only an insignificant oil pressure will be generated. For a similar reason, the operating handle may be set to any of the turbine positions, and in fact to any position except direct drive while the vehicle is stationary, and without stalling the engine. Assuming that the operating handle is set at the first forward drive position while the vehicle stands stationary, the engine idling at low speed, an insufficient oil pressure will be generated to move the vehicle. As soon as it is desired to start, the operator has only to speed up the engine whereby the oil pressure will increase as the square of the speed and the turning effort delivered to the propeller shaft 74 will increase in very rapid ratio until the vehicle is brought under way. No particular skill is needed in starting up the vehicle, since it is not necessary to manipulate a clutch under the control of the operator, and since any confusion due to outside causes will not result in stalling the engine.

For similar reasons this arrangement will eliminate the terrific strain which is occasioned in a case of an ordinary gear shift and clutch, since the "grabbing" of the clutch is eliminated, and on the contrary there is substituted the use of a torque which is increased under the control of the operator by merely increasing the engine speed. This will make it possible to handle heavy loads such as trucks or motor cars without trouble, and will also make it possible to accelerate vehicles on heavy grades in the simplest possible manner.

It is also to be observed at this point that the transition from one position of the pumping unit to another is effected in a very smooth manner and without the necessity of particular thought on the part of the operator.

It is also possible to shift from a direct drive to the reversing position or vice versa without complications, since this will only result in the generation of a back pressure on the shaft 74. If the engine is idling at the time that such a shift is made, there will only be a small amount of back pressure generated, and no jar or serious inconvenience will attend the transition. Then, by increasing the engine speed and thus driving oil through the turbine in reverse direction, a drag will be created whose amount will increase rapidly with the increase of engine speed.

When using this apparatus for a retarding function by allowing oil to circulate under the pressure generated by the turbine rotation, the retarding action will increase somewhat according to the square of the speed of travel of the vehicle. Consequently, if the vehicle be travelling rapidly a very heavy braking action may be produced within the change speed device itself and independently of the usual braking appliances. Since provision has been made for cooling the oil during such operation it follows that the apparatus lends itself admirably to the dissipation of the energy of the vehicle. No wear is produced on the usual brake apparatus and no danger exists of overheating the parts. This is particularly desirable for use in connection with vehicles which have to be started and stopped frequently; and is especially desirable for use in vehicles used in the mountains or on heavy grades. When a grade is descended it is only necessary to shift the operating handle across the braking leg to a point where the valve 141 is opened until a sufficient drag is felt, and then the retarding action will be continued as long as this condition is maintained. The heavier the grade being descended, the heavier will be the retarding action, since a slight increase in speed will result in a very much larger relative increase in retarding action. In this connection, it is also noted that in shifting the operating handle from the coasting towards the neutral position the valve 141 is first opened to allow circulation through the second forward drive turbine section 62, and, inasmuch as the pumping unit is then standing at the neutral position, the oil is allowed a very free and unobstructed passage from the center of the machine into the intake ends of the passages of this particular turbine section.

The transmission device herein disclosed is very well adapted for use in those cases where it is desired to shift backwardly from direct drive to a "low gear" condition. It is possible to immediately and easily shift from either direct drive to second forward drive, or from second forward drive to first forward drive without any difficulty regardless of the speed of the shaft 74, or the vehicle speed, and regardless of the relative speeds of the two shafts 50 and 74, since it is unnecessary to synchronize the speeds of these shafts or of positively meshing gears. Therefore, this transmission lends itself admirably for use in the controlling of vehicles frequently ascending and descending grades.

In order to reduce the fly wheel action of the turbine unit as much as possible the same may be made of relatively light material such as aluminum or die casting material. When the turbine unit is built up in sectionalized form as illustrated particularly in Fig. 1 such very light material may be used for the blocks 117, 118, 119 and 120, and the intervening vanes may be made of steel, brass, bronze or other material as desired.

The second forward drive turbine section is best adapted for the foregoing functions. The hydrostatic pressure generated in the annular passage 130 may be communicated by a pipe 222 with the storage receptacle. In case it should be desired to place oil under pressure independently of the regeneration of power, the pumping unit itself may be used. For this purpose I have shown an annular passage 223 on the inner face of the neutral section 73 of the control member, so that said annular passage 223 will also be subjected to the pressure generated by the pumping unit when standing at neutral. A passage 224 leads from the annular passage 223 down through the web of the stationary control section and communicates with a pipe 225 leading to the outside of the structure, so that pressure may be delivered through said pipe depending upon the operation of the pumping unit when at neutral. A short pipe section 226 carries the passage 224 from the annular passage 223 across the reversing portion of the control section.

Ordinarily, the pressure generated on the pipe 225 due to operation of the pumping unit will be very small, since ordinarily the pumping unit will rotate at low speed when at neutral. The operator can, however, speed up the engine for the special purpose of generating whatever pressure is desired in the pipe 225. I have provided an arrangement whereby pressure from either of the pipes 222 or 225 may be automatically delivered to one or more storage tanks depending upon which of these pressures is momentarily the greater. This includes a common pipe 227 (shown diagrammatically in Fig. 26) into which both of the pipes 222 and 225 communicate, but said pipes are provided with the check valves 228 and 229 which prevent any back flow of oil through the pipes 222 and 225 respectively. Consequently, when the pressure in the pipe 222 exceeds that in the pipe 225 the tendency to create a back flow in the pipe 225 is prevented, and the reverse operation takes place when the balance of the pressure is reversed.

I have shown two storage pressure tanks 230 and 231, one of which, for example, 230, is intended to carry oil under relatively low pressure, such for example as twenty-five pounds per square inch, and the other of which, for example, 231, is intended to carry oil under relatively high pressure, such for example as seventy-five pounds per square inch. The pipe 227 conects with the sumps 232 and 233 of the two storage tanks through the medium of pipes 234 and 235, and under the control of a valve 236. The construction of this valve is shown in detail in Fig. 28. As shown in said figure, the valve includes a cylindrical casing 237 within which is located a plunger 238 which can move up and down between the position indicated in Fig. 28, and a higher position which is limited by a stop 239. This valve is provided with an encircling groove or passage 240. The pipe 227 connects with a port 241 leading into one side of the casing; and the pipes 234 and 235 connect into ports 242 and 243 leading into the other side of the casing. The annular passage 240 is wide enough so that the port 241 is never closed by the up and down movements of the plunger 238; but the port 242 which leads to the low pressure tank is so placed that when the plunger 238 is in the position of Fig. 28 it communicates with the passage 240, whereas when the plunger 238 is raised the port 242 is closed so as to cut off communication to the low pressure tank 230. The port 243 always remains in communication with the passage 240 and therefore the high pressure tank 231 is always subjected to whatever pressure is delivered from the pipe 227 whether higher than that of the tank 230 or of equal value.

The movements of the plunger 238 are brought about automatically. For this purpose, a passage 244 reaches downwardly through the casing 237 from the port 242 to a point beneath the lower end of the plunger. An annular contact ring 245 is formed within the casing and against which the plunger normally seats in a sealing fashion, so that the pressure coming through the passage 244 is exerted on an area of the plunger smaller than its full size. A spring 246 normally holds the plunger in the lowered position of Fig. 28. As soon as the pressure on such reduced area becomes sufficient to slightly overcome the spring pressure, the plunger will rise and immediately its entire lower area will be subjected to the pressure of the passage 244, so that the plunger will be immediately thrown clear up until limited by the stop 239. Thus the low pressure tank will be cut off from the pipe 227, but the pipe 227 will still remain in communication with the high pressure tank.

As soon as the pressure in the low pressure tank falls to a point where the pressure exerted by it on the full area of the plunger 238 is insufficient to retain the plunger in raised position, said plunger will fall and reestablish communication between the low pressure tank and both the pipes 227 and the high pressure tank. Thereupon the low pressure tank will have its pressure raised either by the high pressure tank or from the pipe 227. In this way a more or less constant supply of oil will be available in the low pressure tank at a pressure which will fluctuate within relatively small limits.

It will be understood that both of the tanks 230 and 231 are sealed, so that the pressures created within them are due to the compression of air entrapped in their upper portions. Furthermore, both of these tanks will be able to deliver oil under pressure to nearly their full capacity, since the pipes connect into the sumps 232 and 233 in their bottom portions.

It is now evident that I have provided an arrangement whereby oil may be stored up under pressure from the pumping unit itself or from the turbine unit; and that in the latter case the operation will again be a regeneration of power. The energy represented as thus stored up is available for any convenient purpose. For example, it may be used to operate auxiliaries about the vehicle such as lifting jacks or the like, or it may be used for operating the brakes or for any other convenient purpose. I have illustrated an arrangement whereby this stored power can be used for operating the brakes and moreover I have done this in such a way that power may be used on the brakes on either the front or rear wheels or both as desired. For this purpose, I have shown the brake cylinders 247 and 248 for operating the brake bands on the drums 249 and 250 for the rear wheels, and have also shown the cylinders 251 and 252 for operating the brake bands on the drums 253 and 254 for the front wheels. The cylinders 247 and 248 communicate by a common pipe 255 with the control mechanism, the cylinders 251 and 252 communicate by a common pipe 256 with the control mechanism.

The control mechanism illustrated is such that the operator can control the oil pressures existing in the pipes 255 and 256 independently or simultaneously, and may also adjust the pressure in either of said pipes according to his desires. This control device is shown diagrammatically at 257 in Fig. 26. It includes a foot pedal 258 in position for easy operation by the driver sitting on the seat 39, which foot pedal is connected with valves 259 and 260 for the rear and front wheels respectively. Pressure on the lower portion of the pedal 257 operates the valve 259 and pressure on the upper portion of the pedal operates the valve 260, so that by pressing with either his heel or his toe the operator can operate the brakes on the rear wheels or the front wheels as desired. Pressure on the pedal 257 in such manner as to operate both of the valves will operate the brakes on all of the vehicles simultaneously.

I have so arranged the valves 259 and 260 that the amount of pressure communicated to the brakes is under the control of the operator, so that he can exert the exact amount of braking action desired, instead of applying the full amount of pressure by the opening of the valve. Fig. 27 shows diagrammatically one of these valves and is typical of both valves. It includes a chamber 261 within which is a plunger 262 which is normally raised to the uppermost position by a spring 263 as shown in Fig. 27. This plunger connects with the pedal 257 by means of a stem 264. There is an annular passage 265 in the bottom portion of the plunger and a deep notch 266 is formed on one side of the plunger in communication with the groove 265. The pipe leading to the brake cylinders, whether front or rear, connects with a port 267 in that side of the chamber 261 at which is located the notch 266. On the opposite side of the chamber 261 is a discharge port 268, a port 269 for low pressure and a port 270 for high pressure oil. The parts are so arranged that when the plunger 262 is in the raised position of Fig. 27, the port 267 is shut off from the annular passage 265 and from the notch 266, so as to prevent any back flow of oil from the brake cylinders. As soon as the plunger 262 is forced down a slight amount of communication is first established between the discharge port 268 and the cylinder port 267. As the plunger is still further depressed the passage 265 seals the discharge port and establishes communication from the low pressure tank port 269 to the cylinder port 267, and as the plunger is still further depressed, the low pressure tank is cut off and communication is established from the high pressure tank port to the cylinder port 267.

A passage 271 leads from the cylinder port 267 down through the chamber 261 and communicates with the bottom side of the plunger 262. Consequently, said plunger is also subjected to a lifting force exactly proportional to the amount of oil pressure being momentarily exerted on the brake cylinders. The result is that as soon as the operator depresses the plunger 262 by pressure on the pedal 257 and commences building up a pressure on the brake cylinders a reaction is exerted on the plunger 262 tending to raise the same and thus making it necessary for the operator to press still harder on the pedal 257 in order to increase the braking action. Therefore, for the operator to increase the pressure on the brake bands it becomes necessary for him to purposely exert an increased pressure on the foot pedal. He is, therefore, able to control the operation of the brake shoes in a manner similar to that universally in use today in motor vehicles, since in operating the ordinary foot brake the braking action depends upon the amount of pressure exerted on the brake pedal. For this reason the above disclosed braking mechanism is admirably adapted for use by those who are already familiar with the operation of foot brakes on automotive vehicles.

The pressure delivered by the low pressure tank will ordinarily be sufficient for regular service stops. Since the high pressure port 270 does not come into operation until the plunger 264 has been purposely forced away down, it follows that the high pressure tank will not ordinarily be called upon for the delivery of pressure direct to the brake cylinders. If, however, it is desired to make an emergency stop, the operator can completely depress the plunger 262 and thus bring into action the high pressure oil.

The releasing movement of the plunger 262 will ultimately carry the passage 265 into communication with the discharge port 268 and thus permit the oil to be discharged from the brake cylinders, thus releasing the brakes. Afterwards when the plunger 262 reaches the uppermost position as shown in Fig. 27, the port 267 is again closed, so that as far as the brake 257 is concerned the cylinders are sealed.

Referring to Fig. 26, the low pressure tank communicates with the ports 269 of the two valves by a pipe 272, and the high pressure tank communicates with the ports 270 of the valves by a pipe 273.

I have provided means for placing the brake cylinders under oil pressure independently of the valve 257, so that if it is desired to lock the brakes in order to hold the car stationary, as for example when standing on a grade, this auxiliary valve mechanism may be used. Such auxiliary mechanism includes a cross connection 274 leading from the high-pressure pipe 273 to the pipe 255 for the rear wheels, together with a valve 275, and includes a pipe 276 leading from the high pressure pipe 273 to the pipe 256 for the front wheels, together with a valve 277 in the pipe 276. The oil discharged from the brake cylinders or from any other auxiliary apparatus should be again made available for use in the change speed device so as to avoid unnecessary loss; and furthermore, arrangements should be provided for compensating for expansion and contraction of the oil within the system and particularly within the change speed device, so that the change speed device itself will be at all times completely filled with oil and thus in proper operative condition. I have, therefore, illustrated an expansion tank 278 of sufficient capacity to take care of the needs of the system as indicated above. This expansion tank is conveniently located at an elevation somewhat above that of the transmission device itself, so that oil will naturally flow from it to the transmisson device. The expansion tank is connected with the interior of the transmission device by pipes 279 and 280, the pipe 280 leading into the transmission device at a point where it will communicate directly with the intake side of the impeller, so that the oil can always reach the interior of the transmission without having to pass through the valve 141, and regardless of whether said valve is open or closed. Therefore, I have shown the pipe 280 as connected into the blank space 146, as shown in Fig. 12.

The discharge ports 268 of the valves 259 and 260 communicates with the pipes 279 and 280 by a pipe 281, as shown in Fig. 26. Consequently, the oil discharged from the brake mechanism will find its way back into the expansion tank or the transmission as needed.

As a matter of convenience to the operator of the vehicle, I have indicated a pressure gauge 282 which may be located upon the dash board 41 of the vehicle, and by means of a valve 283 give indication of any of the pressures which it may be desired to ascertain. For example, by connecting the valve 283 to the lines 255, 256 and 272, the valve 283 may be turned so as to indicate either the pressure on the rear wheel brakes, the pressure on the front wheel brakes, or the pressure on the low pressure tank 230. The valve 283 may be of any convenient construction for placing the gauge in connection with one or the other of the different lines, and I have illustrated said valve as having a thumb piece 284 by means of which it may be conveniently manipulated to give the desired indication.

The volume of oil discharged from the pumping unit, multiplied by its static pressure, is a measure of the power being delivered through the medium of the oil. In some cases it will be desirable, or a matter of interest, to have an indication conveniently accessible to the operator of the vehicle, showing the amount of power which is being momentarily delivered through the use of the oil. I have, therefore, indicated a fluid power meter 285 which may also be placed on the dash board 41 so as to be readily visible to the operator. This power meter is provided with two pipes 286 and 287, one of which is intended to deliver oil pressure equal to the static pressure generated in the fluid which is being measured, and the other pipe is intended to deliver the sum of the static and dynamic pressures in the fluid being measured. The dynamic pressure is a measure of the rate of fluid flow, and the static pressure is a measure of the work per cubic foot of flow.

The pipes 286 and 287 reach down into the casing of the transmission device and are carried over through the stationary web 70 of the control element, past the reversing section thereof, across the neutral section thereof, and terminate between the vanes of the first forward control section 71. These pipes 286 and 287 are shown in Fig. 2 where they extend across the reversing control section and they also appear in Fig. 20 which is a fragmentary section through the first forward control section. The pipe 286 terminates in an inwardly facing end connection 288, which faces the outflowing oil and is, therefore, subjected to a pressure equal to the sum of the static and dynamic pressures. The pipe 287 terminates in a connection 289 which reaches straight into the control section, so that the pipe 287 is subjected only to the static pressure.

In Fig. 29, I have shown in somewhat diagrammatic form a simple fluid power meter for measuring the power represented by the foregoing pressures. It includes a casing 290 having in one side wall a cylinder 291 within which is a piston 292 having a piston rod 293, and a spring 294 tending to restore the piston to the lowermost position illustrated in Fig. 29. The piston rod 293 is connected to a rectangular frame 295, so that said frame rises and falls according to the resultant of pressures exerted on the piston 292. A cylinder 296 is carried by the frame 295, a piston 297 working in the cylinder 296. A piston rod 298 connects the piston 296 with a slide plate 299 working across the face of the frame 295, and a spring 300 tends to restore the piston 297 and the slide plate 299 to the initial position illustrated in Fig. 29.

The pipe 286 communicates with the lower face of the piston 292 working in the cylinder 291. The pipe 287 communicates with the upper face of the piston 292 by a connection 301 and also communicates with the space behind the piston 297 by a flexible connection 302. Therefore, the frame 295 is raised and lowered against the force of the spring 294 depending upon the differential between the two pressures (which differential is equal to the dynamic pressure) whereas the plate 299 is moved back and forth against the spring 300 by a force which is equal to the static pressure. A series of curved lines 303 are provided on the plate 299, each of said curved lines representing a particular amount of power, as for example one horse power, two horse power, three horse power, etc. By comparing the position of the lines 303 with a fixed object, such as an observation hole 304 the power is momentarily indicated. For example, an increase of the static pressure without change of dynamic pressure represents an increase of power, and an increase of dynamic pressure without increase of static pressure also indicates an increase of power. I wish to point out that in the operation of the transmission device the fluid pressures are generated almost entirely at the periphery of the structure, that is, those portions farthest from the shafts, and that ordinarily the only pressures existing along the shafts and at the bearings are the pressures created by the weight of the oil itself, taking account of the elevation of the expansion tank 278. This pressure is very small and consequently the tendency towards leakage of oil is also very small. Nevertheless, I have chosen to illustrate a packing gland 305 around the shaft 50 to the outside of the ball bearing 206, a packing gland 306 around the shaft 74 to the outside of the ball bearing 140, and a packing gland 307 around the shaft 74 to the outside of the ball bearing 156. These packing glands will effectively prevent any loss of oil due to the slight pressures exerted against them.

In connection with the brake valves 275 and 277, shown diagrammatically in Fig. 26, it is noted that as long as these valves stand open the wheel brakes are set. By providing key locks in connection with the valves 275 and 277 it is possible to lock the vehicle, so that it cannot be moved, thus making it possible to establish a vehicle lock.

I wish to call attention to the fact that when operating on turbine drive the torque delivered to the propeller shaft 74 is increased in amount above that on the shaft 50, since the change speed mechanism is adapted to give an increase of torque with reduction of speed. Consequently, when a clutch is used between the turbine unit and the propeller shaft 74, said clutch should be of sufficient strength to deliver the necessary amount of torque which may be greater in amount than the engine torque. For this reason, the clutch 88 should be of larger size and greater power than the clutch 96 which is used on direct drive. Examination particularly of Fig. 1 shows that the arrangement therein illustrated is very well adapted for the accommodation of a more powerful clutch for the turbine drive than is provided for direct drive. It will be seen that owing to the tapering size of the casing 125 the diameter available for the clutch 88 is larger than that available for the clutch 96. Furthermore, examination of Fig. 1 shows that I have illustrated a larger number of plates for the turbine clutch than for the direct drive clutch. Both of these facts are conducive towards the provision of an increased clutch power for use on turbine drive.

It was previously mentioned that by placing the pivot rod 160 at the point substantially beneath the direct drive position of the operating handle, the leverage exerted on the collar 78 increases as the direct drive position is approached, so that a maximum leverage is available for pulling the clutch into the direct drive position. This feature is of value when it is considered that in moving to the direct drive position the various radial bars 93 must be forced outwardly against their springs 94. By using this leverage arrangement it is perfectly feasible to provide a construction in which the impeller can be drawn into the direct drive position with proper operation of the clutches, and with the exertion of only a relatively small pull on the operating handle. This will make it entirely feasible for the operation of this mechanism without inconvenience or the exertion of abnormal forces by the driver.

Manifestly, any suitable liquid may be used in the operation of this mechanism, such as oil, water, mercury, or other liquids. In fact, the mechanism may in many cases be used with water and to great convenience, since the only parts in frictional engagement are the ball bearings, and it would be quite feasible to make provision for lubricating the same even when using water as the power medium.

Nevertheless, in ordinary cases it will be found preferable to use oil for the operating liquid. The oil when used should be of such characteristics that it will flow freely at the lowest temperatures which will ordinarily be encountered in the operation of the machine, and should also stand up without disintegration or substantial change of composition or characteristics at the highest temperatures which will ordinarily be encountered and also under the operating conditions. These operating conditions include the creation of centrifugal forces and pressures of moderate amount, for example, up to one hundred or two hundred pounds per square inch, but ordinarily pressures higher than these will not be encountered. The linear velocity of the oil through the passages will depend upon the design of the machine and conditions of operation, but ordinarily will not exceed probably twenty or twenty-five feet per second.

There are numerous oils which can be satisfactorily used in this transmission, both mineral and vegetable, but there is a series of oils obtained from the paraffine petroleums known as wax free oils, which lie intermediate between the kerosenes and gasolines on the one hand, and the lubricating oils on the other hand. These wax free oils include what are known as straw oil, mineral seal oil, and spindle oil, as well as others. They are obtained in the redistillation of paraffine oils after the removal of the gasolines and kerosenes and after pressing out the paraffine wax. Oils of this series will flow freely at temperatures as low as 20° below zero Fah., and do not boil or materially disintegrate at temperatures as high as 600° Fah.

I wish to point out that while I have herein disclosed and described and illustrated a complete system of control for vehicles and the like, its use is not limited to vehicles of any particular kind or character. Furthermore, while I have disclosed this complete system including the provision of means for accelerating under oil operation, means for effecting direct drive, means for using the machine for retardation, means for reversing by the use of oil, means for regenerating power, means for using a portion of the power so regenerated to operate other brake mechanism, means for cooling the liquid when desired, and various other features, still many of these features may be used to advantage individually, and many of them are new in themselves. For example, in some cases it may be desirable to use the turbine for braking purposes without any special provision for using it for acceleration, in which case there would be no need of providing a pumping unit. Furthermore, when using the turbine in this manner it might be used in conjunction with suitable valve mechanism for controlling the braking action, and might also be used with a suitable cooling device or not as desired. Therefore, while I have herein shown and described only a certain embodiment of the features of my present invention, still I do not limit myself to the same except as I may do so in the claims.

I wish to point out that although I have herein disclosed the use of multiple disk plate clutches for connecting the propeller shaft to either the turbine element or direct to the drive shaft, still it is evident that any other suitable form of clutch or clutches may be used at either of these locations, and for that matter, the clutch for the turbine element may be entirely dispensed with in those cases in which it is intended that the turbine element shall be at all times directly connected to the propeller shaft.

I claim:

1. A fluid transmission device comprising in combination aligned driving and driven shafts, an impeller slidably and drivingly mounted on the driving shaft and adapted to occupy either a reversing position or a forward running position or an intermediate neutral position, said impeller having a series of outwardly extending vanes, a turbine concentrically located with respect to the driving shaft and the impeller, said turbine having a set of outwardly extending forward running vanes and another set of outwardly extending reversing vanes, a stationary guide vane ring between the impeller and the reversing turbine section, the impeller being adapted to deliver liquid into either the forward running or the reversing vanes of the turbine, a driving connection between the turbine and the driven shaft, a suitable casing enclosing all of said parts, means for shifting the impeller longitudinally of the driving shaft into the different positions, and means under control of the operator for sealing the passages of the turbine when the impeller is in the neutral position, substantially as described.

2. A fluid transmission device comprising in combination an impeller having a series of outwardly extending vanes, a turbine concentrically located with respect to the impeller and having sets of outwardly extending vanes adapted to cause rotation of the turbine in opposite directions, a stationary guide vane ring between the impeller and the turbine, said turbine having a central bore of size to receive the impeller in liquid tight fashion, means for shifting the impeller axially with respect to the turbine to thereby establish communication between the impeller passages and a selected turbine section, means in conjunction with all of said parts permitting a return flow of liquid from the turbine section to the inlet side of the impeller, and means movable with respect to the impeller and under control of the operator for controlling said return flow of liquid selectively according to the relative positions of the turbine and the impeller, substantially as described.

3. A fluid transmission device comprising in combination an impeller having a series of outwardly extending vanes, a turbine concentrically located with respect to the impeller and having sets of outwardly extending vanes adapted to cause rotation of the turbine in opposite directions, a stationary guide vane ring between the impeller and the turbine, said turbine having a central bore of size to receive the impeller in liquid tight fashion, means for shifting the impeller axially with respect to the turbine to thereby establish communication between the impeller passages and a selected turbine section, and means distinct from said impeller and turbine and under control of the operator in conjunction with all of said parts permitting a return flow of liquid from the turbine section to the inlet side of the impeller, substantially as described.

4. A fluid transmission device comprising in combination a centrifugal pump having a series of peripheral liquid discharge openings and a central inlet opening, a concentrically located aligned turbine having an inlet opening in position to directly receive the liquid discharged from the pump openings and having a plurality of peripheral discharge openings, means permitting return flow of liquid from the discharge openings of the turbine, to the inlet opening of the pump, and angularly movable means under control of the operator to control such return flow, substantially as described.

5. A fluid transmission device comprising in combination a centrifugal pump having a series of peripheral liquid discharge openings, and a central inlet opening, a concentrically located turbine having an inlet opening at times in position to directly receive the liquid discharged from the pump openings and having a plurality of peripheral discharge openings, and means under control of the operator permitting return flow of liquid from the discharge openings of the turbine either to the inlet opening of the pump or directly to the inlet opening of the turbine, substantially as described.

6. A fluid transmission device comprising in combination a centrifugal pump having a series of peripheral liquid discharge openings and a central inlet opening, a turbine having an inlet opening at times in position to directly receive the liquid discharged from the pump openings, and having a plurality of peripheral discharge openings, and means under control of the operator permitting return flow of liquid from the discharge openings of the turbine either to the inlet opening of the pump or in variable quantity directly to the inlet opening of the turbine, substantially as described.

7. A fluid transmission device comprising in combination a centrifugal pump having a series of peripheral liquid discharge openings and a central inlet opening, a concentrically located turbine having an inlet opening adapted to at times directly receive liquid discharged from the pump openings and having a peripheral discharge opening, means for shifting the pump axially with respect to the turbine to bring the discharge openings of the pump and the inlet opening of the turbine either into direct registry or out of said registry, means for sealing the discharge openings of the pump when not so registered, a passage permitting return flow of liquid from the turbine to the pump and means under control of the operator for controlling flow of liquid through said passage, substantially as described.

8. A fluid transmission device comprising in combination a turbine, a centrifugal pump directly associated therewith and shiftable longitudinally with respect thereto, means for registering the pressure side of the pump directly with the inlet side of the turbine under control of the operator, means for causing a simultaneous return of liquid from the turbine to the inlet side of the pump, and means under control of the operator for controlling the volume of such return flow, substantially as described.

9. A fluid transmission device comprising in combination a driving shaft, a driven shaft, a turbine member in driving connection with the driven shaft and having a plurality of sets of vanes of different characteristics, pumping means in connection with the driving shaft, and shiftable with respect to the turbine member from a neutral position wherein the pumping means are sealed against discharge of fluid successively into communication with the sets of turbine vanes to a direct drive position in which the pumping means are again sealed against discharge of fluid and driving connection is established directly between the two shafts, a casing enclosing all of said parts, individual groups of passages therein in communication individually with the discharge sides of the several turbine sections, a rotary valve in conjunction with all of said passages and serving when in one position to seal all of said passages, and serving when turned to permit communication with the groups of passages in succession, communication from said valve being normally to the central portion of the casing for return of fluid direct to the pumping means, a fluid cooler in direct association with said casing, inlet passages therefor leading from a point adjacent to said valve, discharge passages from the cooler communicating directly with the central portion of the casing for return of fluid to the pumping means, a deflector between the valve and the inlet side of the cooler serving when in harmonious relation to the valve to transfer fluid from the valve direct to the inlet side of the cooler and serving when not in harmonious relation with respect to the valve to permit delivery of fluid from the valve direct to the pumping means and to seal the inlet side of the cooler, means under the control of the operator for turning the valve in harmony with the movements of the pumping means to permit return of fluid to the inlet side thereof synchronously, under one set of conditions, means under the control of the operator for restoring the pumping means to the neutral position while retaining the valve in closed position, means for rotating the valve while retaining the pumping means in the neutral position, under another set of conditions, means for retaining the deflector out of harmonious relation with respect to the valve under the first set of conditions, when the temperature of the fluid does not exceed a certain upper limit and for establishing harmony between the deflector and valve when the temperature exceeds such limit, and means for operating the deflector harmoniously with the valve under the second set of conditions, substantially as described.

10. A fluid transmission device comprising in combination a driving shaft, a driven shaft, a turbine member in driving connection with the driven shaft and having a plurality of sets of vanes of different characteristics, pumping means in connection with the driving shaft, and shiftable with respect to the turbine member from a neutral position wherein the pumping means are sealed against discharge of fluid successively into communication with the sets of turbine vanes to a direct drive position in which the pumping means are again sealed against discharge of fluid and driving connection is established directly between the two shafts, a casing enclosing all of said parts, individual groups of passages therein in communication individually with the discharge sides of the several turbine sections, a rotary valve in conjunction with all of said passages and serving when in one position to seal all of said passages, and serving when turned to permit communication with the groups of passages in succession, communication from said valve being normally to the central portion of the casing for return of fluid direct to the pumping means, a fluid cooler in direct association with said casing, inlet passages therefor leading from a point adjacent to said valve, discharge passages from the cooler communicating directly with the central portion of the casing for return of fluid to the pumping means, a deflector between the valve and the inlet side of the cooler serving when in harmonious relation to the valve to transfer fluid from the valve direct to the inlet side of the cooler and serving when not in harmonious relation with respect to the valve to permit delivery of fluid from the valve direct to the pumping means and to seal the inlet side of the cooler, means under the control of the operator for turning the valve in harmony with the movements of the pumping means to permit return of fluid to the inlet side thereof synchronously, under one set of conditions, means under the control of the operator for restoring the pumping means to the neutral position while retaining the valve in closed position, means for rotating the valve while retaining the pumping means in the neutral position, under another set of conditions, means for retaining the deflector out of harmonious relation with respect to the valve under the first set of conditions, and means for operating the deflector harmoniously with the valve under the second set of conditions, substantially as described.

11. A fluid transmission device comprising in combination a driving shaft, a driven shaft, a turbine member in driving connection with the driven shaft and having a plurality of sets of vanes of different characteristics, pumping means in connection with the driving shaft, and shiftable with respect to the turbine member from a neutral position wherein the pumping means are sealed against discharge of fluid successively into communication with the sets of turbine vanes to a direct drive position in which the pumping means are again sealed against discharge of fluid and driving connection is established directly between the two shafts, a casing enclosing all of said parts, individual groups of passages therein in communication with the discharge sides of the several turbine sections, a valve in conjunction with all of said passages and serving when in one position to seal all of said passages, and serving when moved to permit communication with the groups of passages in succession, communication from said valve being normally to the central portion of the casing for return of fluid direct to the pumping means, a fluid cooler in direct association with said casing, inlet passages therefor leading from a point adjacent to said valve, discharge passages from the cooler communicating directly with the central portion of the casing for return of fluid to the pumping means, a deflector between the valve and the inlet side of the cooler serving when in harmonious relation to the valve to transfer fluid from the valve direct to the inlet side of the cooler and serving when not in harmonious relation with respect to the valve to permit delivery of fluid from the valve direct to the pumping means and to seal the inlet side of the cooler, means under the control of the operator for moving the valve in harmony with the movements of the pumping means to permit return of fluid to the inlet side thereof synchronously, under one set of conditions, means under the control of the operator for restoring the pumping means to the neutral position while retaining the valve in closed position, means for moving the valve while retaining the pumping means in the neutral position, under another set of conditions, means for retaining the deflector out of harmonious relation with respect to the valve under the first set of conditions, and means for operating the deflector harmoniously with the valve under the second set of conditions, substantially as described.

12. A fluid transmission device comprising in combination a driving shaft, a driven shaft, a turbine member in driving connection with the driven shaft and having a plurality of sets of vanes of different characteristics, pumping means in connection with the driving shaft, and shiftable with respect to the turbine member from a neutral position wherein the pumping means are sealed against discharge of fluid successively into communication with the sets of turbine vanes to a direct drive position in which the pumping means are again sealed against discharge of fluid and driving connection is established directly between the two shafts, a casing enclosing all of said parts, individual groups of passages therein in communication with the discharge sides of the several turbine sections, a valve in conjunction with all of said passages and serving when in one position to seal all of said passages, and serving when moved to permit communication with the groups of passages in succession, communication from said valve being normally to the central portion of the casing for return of fluid direct to the pumping means, a fluid cooler in direct association with said casing, inlet passages therefor leading from a point adjacent to said valve, discharge passages from the cooler communicating directly with the central portion of the casing for return of fluid to the pumping means, a deflector between the valve and the inlet side of the cooler serving when in harmonious relation to the valve to transfer fluid from the valve direct to the inlet side of the cooler and serving when not in harmonious relation with respect to the valve to permit delivery of fluid from the valve direct to the pumping means and to seal the inlet side of the cooler, means under the control of the operator for moving the valve in harmony with the movements of the pumping means to permit return of fluid to the inlet side thereof synchronously or for moving the valve independently of the pumping means when the pumping means stands at the neutral position, and means for retaining the deflector out of harmonious relation with respect to the valve when the valve moves in harmony with the movements of the pumping means and the temperature of the fluid does not exceed a certain upper limited and for operating the deflector harmoniously with the valve when the temperature exceeds said upper limit or when the valve is moved by the operator while the pumping means stands at the neutral position, substantially as described.

13. A fluid transmission device comprising in combination a driving shaft, a driven shaft, a turbine member in driving connection with the driven shaft and having a plurality of sets of vanes of different characteristics, pumping means in connection with the driving shaft, and shiftable with respect to the turbine member from a neutral position wherein the pumping means are sealed against discharge of fluid successively into communication with the sets of turbine vanes to a direct drive position in which the pumping means are again sealed against discharge of fluid and driving connection is established directly between the two shafts, a casing enclosing all of said parts, individual groups of passages therein in communication with the discharge sides of the several sets of turbine vanes, a valve in conjunction with all of said passages and serving when in one position to seal all of said passages, and serving when moved to permit communication with the groups of passages in succession, communication from said valve being normally to the central portion of the casing for return of fluid direct to the pumping means, a fluid cooler in direct association with said casing, inlet passages therefor leading from a point adjacent to said valve, discharge passages from the cooler communicating directly with the central portions of the casing for return of fluid to the pumping means, a deflector between the valve and the inlet side of the cooler serving when in harmonious relation to the valve to transfer fluid from the valve direct to the inlet side of the cooler and serving when not in harmonious relation with respect to the vave to permit delivery of fluid from the valve direct to the pumping means, means under the control of the operator for moving the valve in harmony with the movements of the pumping means to permit return of fluid to the inlet side thereof synchronously or for moving the valve independently of the pumping means when the pumping means stands at the neutral position, and means for retaining the deflector out of harmonious relation with respect to the valve when the valve moves in harmony with the movements of the pumping means and for operating the deflector harmoniously with the valve when the valve is moved by the operator while the pumping means stands at the neutral position, substantially as described.

14. A fluid transmission device comprising in combination a driving shaft, a driven shaft, a turbine member in driving connection with the driven shaft and having a plurality of sets of vanes of different characteristics, pumping means in connection with the driving shaft, and shiftable with respect to the turbine member from a neutral position wherein the pumping means are sealed against discharge of fluid successively into communication with the sets of turbine vanes to a direct drive position in which the pumping means are again sealed against discharge of fluid and driving connection is established directly between the two shafts, a casing enclosing all of said parts, individual groups of passages therein in communication with the discharge sides of the several sets of turbine vanes, a valve in conjunction with all of said passages and serving when in one position to seal all of said passages, and serving when moved to permit communication with the groups of passages in succession, communication from said valve being normally to the central portion of the casing for return of fluid direct to the pumping means, a fluid cooler in direct association with said casing, inlet passages therefor leading from a point adjacent to said valve, discharge passages from the cooler communicating directly with the central portion of the casing for return of fluid to the pumping means, a deflector between the valve and the inlet side of the cooler serving when in harmonious relation to the valve to transfer fluid from the valve direct to the inlet side of the cooler and serving when not in harmonious relation with respect to the valve to permit delivery of fluid from the valve direct to the pumping means, means under the control of the operator for moving the valve in harmony with the movements of the pumping means to permit return of fluid to the inlet side thereof synchronously or for moving the valve independently of the pumping means, and means for retaining the deflector out of harmonious relation with respect to the valve when the valve moves in harmony with the movements of the pumping means and for operating the deflector harmoniously with the valve when the valve is moved by the operator, substantially as described.

15. A fluid transmission device comprising in combination a driving shaft, a driven shaft, a turbine member in driving connection with the driven shaft and having a plurality of sets of vanes of different characteristics, pumping means in connection with the driving shaft, and shiftable with respect to the turbine member from a neutral position wherein the pumping means are sealed against discharge of fluid successively into communication with the sets of turbine vanes to a direct drive position in which the pumping means are again sealed against discharge of fluid and driving connection is established directly between the two shafts, a casing enclosing all of said parts, individual groups of passages therein in communication with the discharge sides of the several sets of turbine vanes, a valve in conjunction with all of said passages and serving when in one position to seal all of said passages, and serving when moved to permit communication with the groups of passages in succession, communication from said valve being normally to the central portion of the casing for return of fluid direct to the pumping means, a fluid cooler in direct association with said casing, inlet passages therefor leading from a point adjacent to said valve, discharge passages from the cooler communicating with the central portion of the casing for return of fluid to the pumping means, a deflector between the valve and the inlet side of the cooler serving when in harmonious relation to the valve to transfer fluid from the valve direct to the inlet side of the cooler and serving when not in harmonious relation with respect to the valve to permit delivery of fluid from the valve direct to the pumping means, means under the control of the operator for moving the valve independently of the pumping means, and means for moving the deflector in harmony with the movements of the valve at such times, substantially as described.

16. A fluid transmission device comprising in combination a driving shaft, a driven shaft, a turbine member in driving connection with the driven shaft and having a plurality of vanes of different characteristics, pumping means in connection with the driving shaft, and shiftable with respect to the turbine member from a neutral position wherein the pumping means are sealed against discharge of fluid successively into communication with the sets of turbine vanes to a direct drive position in which the pumping means are again sealed against discharge of fluid and driving connection is established directly between the two shafts, a casing enclosing all of said parts, individual groups of passages therein in communication with the discharge sides of the several sets of turbine vanes, a valve in conjunction with all of said passages and serving when in one position to seal all of said passages, and serving when moved to permit communication with the groups of passages in succession, communication from said valve being normally to the central portion of the casing for return of fluid direct to the pumping means, a fluid cooler, inlet passages therefor leading from a point adjacent to said valve, discharge passages from the cooler communicating with the central portion of the casing for return of fluid to the pumping means, a deflector between the valve and the inlet side of the cooler serving when in harmonious relation to the valve to transfer fluid from the valve direct to the inlet side of the cooler and serving when not in harmonious relation with respect to the valve to permit delivery of fluid from the valve direct to the pumping means, means under the control of the operator for moving the valve independently of the pumping means, and means for moving the deflector in harmony with the movements of the valve at such times, substantially as described.

17. A fluid transmission device comprising in combination a driving shaft, a driven shaft, a turbine member in driving connection with the driven shaft and having a plurality of sets of vanes of different characteristics, pumping means in connection with the driving shaft, and shiftable with respect to the turbine member from a neutral position wherein the pumping means are sealed against discharge of fluid successively into communication with the sets of turbine vanes to a direct drive position in which the pumping means are again sealed against discharge of fluid and driving connection is established directly between the two shafts, a casing enclosing all of said parts, individual groups of passages therein in communication with the discharge sides of the several sets of turbine vanes, a valve in conjunction with all of said passages and serving when in one position to seal all of said passages, and serving when moved to permit communication with the groups of passages in succession, communication from said valve being normally to the central portion of the casing for return of fluid direct to the pumping means, a fluid cooler, inlet passages therefor leading from a point adjacent to said valve, discharge passages from the cooler communicating with the central portion of the casing for return of fluid to the pumping means, means under the control of the operator for moving the valve in harmony with the movements of the pumping means to permit return of fluid to the inlet side thereof synchronously, under one set of conditions, or for moving the valve independently of the pumping means when the pumping means stands at the neutral position, under another set of conditions, and means for diverting fluid from the valve to the inlet side of the cooler under the first mentioned set of conditions when the temperature exceeds a certain point, and for diverting fluid from the valve to the inlet side of the cooler under the second mentioned set of conditions, substantially as described.

18. A fluid transmission device comprising in combination a driving shaft, a driven shaft, a turbine member in driving connection with the driven shaft and having a plurality of sets of vanes of different characteristics, pumping means in connection with the driving shaft, and shiftable with respect to the turbine member from a neutral position wherein the pumping means are sealed against discharge of fluid successively into communication with the sets of turbine vanes to a direct drive position in which the pumping means are again sealed against discharge of fluid and driving connection is established directly between the two shafts, a casing enclosing all of said parts, individual groups of passages therein in communication with the discharge sides of the several sets of turbine vanes, a valve in conjunction with all of said passages and serving when in one position to seal all of said passages, and serving when moved to permit communication with the groups of passages in succession, communication from said valve being normally to the central portion of the casing for return of fluid direct to the pumping means, a fluid cooler, inlet passages therefor leading from a point adjacent to said valve, discharge passages from the cooler communicating with the central portion of the casing for return of fluid to the pumping means, means under the control of the operator for moving the valve in harmony with the movements of the pumping means to permit return of fluid to the inlet side thereof synchronously under one set of conditions or for moving the valve independently of the pumping means when the pumping means stands at the neutral position under another set of conditions, and means for diverting fluid from the valve to the inlet side of the cooler under the second mentioned set of conditions, substantially as described.

19. A fluid transmission device comprising in combination a driving shaft, a driven shaft, a turbine member in driving connection with the driven shaft and having a plurality of sets of vanes of different characteristics, pumping means in connection with the driving shaft, and shiftable with respect to the turbine member from a neutral position wherein the pumping means are sealed against discharge of fluid successively into communication with the sets of turbine vanes to a direct drive position in which the pumping means are again sealed against discharge of fluid and driving connection is established directly between the two shafts, a casing enclosing all of said parts, individual groups of passages therein in communication with the discharge sides of the several sets of turbine vanes, a valve in conjunction with all of said passages and serving when in one position to seal all of said passages, and serving when moved to permit communication with the groups of passages in succession, communication from said valve being normally to the central portion of the casing for return of fluid direct to the pumping means, a fluid cooler, inlet passages for the cooler leading from a point adjacent to said valve, discharge passages from the cooler communicating with the central portion of the casing for return of fluid to the pumping means, means under the control of the operator for moving the valve independently of the pumping means when the pumping means stands at the neutral position, and means for diverting fluid from the valve to the inlet side of the cooler under such conditions, substantially as described.

20. A fluid transmission device comprising in combination a driving shaft, a driven shaft, a turbine member in driving connection with the driven shaft and having a plurality of sets of vanes of different characteristics, pumping means in connection with the driving shaft, and shiftable with respect to the turbine member from a neutral position wherein the pumping means are sealed against discharge of fluid successively into communication with the sets of turbine vanes to a direct drive position in which the pumping means are again sealed against discharge of fluid and driving connection is established directly between the two shafts, a casing enclosing all of said parts, individual groups of passages therein in communication with the discharge sides of the several sets of turbine vanes, a valve in conjunction with all of said passages and serving when in one position to seal all of said passages, and serving when moved to permit communication with the groups of passages in succession, communication from said valve being normally to the central portion of the casing for return of fluid direct to the pumping means, a fluid cooler, inlet passages therefor leading from a point adjacent to said valve, discharge passages from the cooler communicating with the central portion of the casing for the return of fluid to the pumping means, means under the control of the operator for moving the valve to control the return of fluid independently of the operation of the pumping means, and means for diverting fluid from the valve to the inlet side of the cooler, substantially as described.

21. A fluid control device including a shaft, a turbine member drivingly connected thereto and having a set of vanes, pumping means, a casing for the turbine and pumping means having passages in communication with the discharge sides of the vanes, a valve in conjunction with said passages and serving to control the flow of fluid therethrough, communication from said valve being normally to the center of the casing for return of fluid to the turbine, a fluid cooler in direct association with said casing, inlet passages therefor leading from a point adjacent to said valve, discharge passages from the cooler communicating directly with the center of the casing for return of fluid to the pumping means, a deflector between the valve and the inlet side of the cooler serving when in harmonious relation to the valve to transfer fluid from the valve directly to the inlet side of the cooler and serving when not in harmonious relation with respect to the valve to permit delivery of fluid from the valve direct to the turbine, means under the control of the operator for moving the valve to control return of fluid to the inlet side of the turbine, and means for moving the deflector in harmonious relation with respect to the valve at such times, substantially as described.

22. A fluid control device including a shaft, a turbine member drivingly connected thereto and having a set of vanes, pumping means, a casing for the turbine and pumping means having passages in communication with the discharge sides of the vanes, a valve in conjunction with said passages and serving to control the flow of fluid through them, communication from said valve being normally to the center of the casing for return of fluid to the turbine, a fluid cooler, inlet passages therefor leading from a point adjacent to said valve, discharge passages from the cooler communicating directly with the center of the casing for return of fluid to the pumping means, a deflector between the valve and the inlet side of the cooler serving when in harmonious relation to the valve to transfer fluid from the valve directly to the inlet side of the cooler and serving when not in harmonious relation with respect to the valve to permit delivery of fluid from the valve direct to the turbine, means under the control of the operator for moving the valve to control return of fluid to the inlet side of the turbine, and means for moving the deflector in harmonious relation with respect to the valve at such times, substantially as described.

23. A fluid control device including a shaft, a turbine member drivingly connected thereto and having a set of vanes, a casing therefor, passages in said casing for the transfer of fluid from the discharge side of the turbine, a cooler, a connection from the cooler to the inlet side of the turbine, a valve under the control of the operator for controlling the flow of fluid through the passages from the turbine, and means for causing fluid from the valve to flow through the cooler when the temperature of the fluid exceeds a certain upper limit under one set of conditions, or for permitting the fluid to return directly to the inlet side of the turbine under another set of conditions, substantially as described.

24. A fluid control device including a shaft, a turbine drivingly connected thereto and having a set of vanes, a casing enclosing all of said parts, passages therein for transferring fluid delivered by the turbine, a cooler, a valve for controlling the flow of fluid from said passages, an inlet connection to the cooler from a point adjacent to said valve, a return connection from the cooler to the central portion of the casing, and means for causing fluid from the valve to return directly to the central portion of the casing under one set of conditions or to enter the inlet side of the cooler under another set of conditions, or when the temperature of the fluid exceeds a certain upper limit, substantially as described.

25. A fluid control device including a shaft, a turbine drivingly connected thereto and having a set of vanes, a casing enclosing all of said parts, passages therein for transferring fluid delivered by the turbine, a cooler, a valve for controlling the flow of fluid from said passages, an inlet connection to the cooler from a point adjacent to said valve, a return connection from the cooler to the central portion of the casing, and means for causing fluid from the valve to return directly to the central portion of the casing under one set of conditions or to enter the inlet side of the cooler under another set of conditions, substantially as described.

26. A fluid control device including a turbine, a casing therefor, passages therein for transferring fluid delivered by the turbine, a cooler, a valve for controlling the flow of fluid from said passages, an inlet connection to the cooler from a point adjacent to said valve, a return connection from the cooler to the central portion of the casing, and means for causing fluid from the valve to return directly to the central portion of the casing under one set of conditions, or to enter the inlet side of the cooler under another set of conditions, or when the temperature of the fluid exceeds a certain upper limit, substantially as described.

27. A fluid control device including a turbine, a casing therefor, passages therein for transferring fluid delivered by the turbine, a cooler, a valve for controlling the flow of fluid from said passages, an inlet connection to the cooler from a point adjacent to said valve, a return connection from the cooler to the central portion of the casing, and means for causing fluid from the valve to return directly to the central portion of the casing under one set of conditions, or to enter the inlet side of the cooler under another set of conditions, substantially as described.

28. A fluid control device including a turbine, a casing therefor, passages therein for transferring fluid delivered by the turbine, a cooler, a valve for controlling the flow of fluid from said passages, an inlet connection to the cooler from a point adjacent to said valve, a return connection from the cooler to the central portion of the casing, and means for causing fluid from the valve to flow to the inlet connection of the cooler under one set of conditions, or when the temperature of the fluid exceeds a certain upper limit, substantially as described.

29. A fluid control device including a turbine, a valve for controlling the flow of fluid therefrom, a cooler, an inlet connection to the cooler from a point adjacent to said valve, a return connection from the cooler to the turbine, and means for causing fluid from the valve to return directly to the turbine under one set of conditions or to flow to the inlet connection for the cooler under another set of conditions, or when the temperature of the fluid exceeds a certain upper limit, substantially as described.

30. A fluid control device including a turbine, a valve for controlling the flow of fluid therefrom, a cooler, an inlet connection to the cooler from a point adjacent to said valve, a return connection from the cooler to the turbine, and means for causing fluid from the valve to return directly to the turbine under one set of conditions or to flow to the inlet connection for the cooler under another set of conditions, substantially as described.

31. A fluid control device including a turbine, a cooler, a connection from the discharge side of the turbine to the cooler, a return connection from the cooler to the inlet side of the turbine, a valve for controlling the flow of fluid from the turbine, and means for determining the flow of fluid from said valve to the cooler or direct to the inlet side of the turbine, substantially as described.

32. A fluid control device including a turbine, a cooler, connections between the turbine and the cooler establishing a closed circuit for the flow of fluid through the turbine and cooler in succession, other connections for permitting a direct flow of fluid between the two sides of the turbine irrespective of the cooler, means under the control of the operator for controlling the quantity of fluid flowing through the turbine, and means for controlling the flow of the fluid either through the cooler or independently of the cooler, substantially as described.

33. A fluid control device including a turbine, a cooler, connections permitting the flow of fluid between the turbine and cooler in closed circuit, other connections permitting the flow of fluid between the two sides of the turbine independently of the cooler, means under the control of the operator for controlling the quantity of fluid flowing through the turbine, and temperature controlled means for controlling the flow of fluid either through the cooler or through the connections independently of the cooler, substantially as described.

34. A fluid control device including a turbine, a casing surrounding the same, a cooler unit constituting and sealing one end of said casing, passages in the casing leading from the discharge side of the turbine to a point adjacent to the inlet side of the cooler unit, a connection from the discharge side of the cooler unit to the central portion of the casing, and a valve interposed in said passages, substantially as described.

35. A fluid control device including a turbine, a casing surrounding the same, a cooler unit constituting and enclosing one end of said casing, passages in the casing leading from the discharge side of the turbine to a point adjacent to the inlet side of the cooler unit, and a connection from the discharge side of the cooler unit to the central portion of the casing, substantially as described.

36. A fluid control device including a turbine, a casing surrounding the same, a cooler unit at one end of said casing, an arcuate discharge passage in the cooler unit, an arcuate inlet passage in the cooler unit partially surrounding said arcuate discharge passage, passages in the casing leading from the discharge side of the turbine to a point adjacent to the aforesaid arcuate inlet cooler unit passage, a valve controlling the flow of fluid through said casing passages, and a connection from the arcuate cooler unit discharge passage to the central portion of the casing, substantially as described.

37. A fluid control device including a turbine, a casing surrounding the same, a cooler unit at one end of said casing, an arcuate discharge passage in the cooler unit, an arcuate inlet passage in the cooler unit partially surrounding said arcuate discharge passage, passages in the casing leading from the discharge side of the turbine to a point adjacent to the aforesaid arcuate inlet cooler unit passage, and a connection from the arcuate cooler unit discharge passage to the central portion of the casing, substantially as described.

38. A fluid control device including a turbine, a casing surrounding the same, a series of passages extending longitudinally of said casing from the discharge side of the turbine to one end of the casing, the end portions of said passages being turned inwardly towards the axis of the casing and terminating within a cylindrical surface, a cylindrical valve located adjacent to and co-operating with said inner ends, there being suitable ports within the valve permitting flow of fluid from the passages selectively as the valve is turned, a cooler unit adjacent to said end of the casing, an arcuate inlet passage in the cooler unit subtending an arc embracing all of those casing passages from which it is intended to deliver fluid to the cooler, a deflector plate interposed between said arcuate inlet passage and the central portion of the casing, deflectors on said plate in position to receive fluid delivered from the casing passages through the valve ports and deliver such fluid to the arcuate inlet cooler passage when the deflector plate and the valve are in registry, an arcuate discharge passage in the cooler partially embraced by the arcuate inlet passage, a cooler discharge connection reaching between the ends of the arcuate cooler inlet connection from the arcuate cooler discharge passage, and means for turning the valve and for turning the deflector plate as desired, substantially as described.

39. A fluid control device including a casing, a series of passages extending longitudinally of said casing and having their end portions turned inwardly towards the longitudinal axis of the casing and terminating within a cylindrical surface, a cylindrical valve located adjacent to and co-operating with said inner ends, there being suitable ports within said valve permitting flow of fluid from the passages selectively as the valve is turned, a cooler unit adjacent to said end of the casing, an arcuate inlet passage in the cooler unit subtending an arc embracing all of those passages from which it is intended to deliver fluid to the cooler, a deflector plate interposed between said arcuate inlet passage and the central portion of the casing, deflectors on said plate in position to receive fluid delivered from the casing passages through the valve ports and deliver such fluid to the arcuate inlet cooler passage when the deflector plate and the valve are in registry, an arcuate discharge passage in the cooler partially embraced by the arcuate inlet passage, a cooler discharge connection reaching between the ends of the arcuate cooler inlet connection from the arcuate discharge passage, and means for turning the valve and for turning the deflector plate as desired, substantially as described.

40. A fluid control device including a casing having a series of passages extending longitudinally thereof, and having their end portions turned inwardly towards the longitudinal axis of the casing and terminating within a cylindrical surface, a cylindrical valve located adjacent to and co-operating with said inner ends, there being suitable ports within the valve permitting flow of fluid from the passages selectively as the valve is turned, a cooler unit adjacent to said end of the casing, an arcuate inlet passage in the cooler unit subtending an arc embracing all of those casing passages from which it is intended to deliver fluid to the cooler, a deflector plate interposed between said arcuate inlet passage and the central portion of the casing, deflectors on said plate in position to receive fluid delivered from the casing passages through the valve ports and deliver such fluid to the arcuate inlet cooler passage when the deflector plate and the valve are in registry, a cooler discharge connection reaching between the ends of the arcuate cooler inlet connection to the central portion of the casing, and means for turning the valve and for turning the deflector plate as desired, substantially as described.

41. A fluid control device including a casing, a series of passages extending longitudinally of said casing and having their end portions turned inwardly towards the longitudinal axis of the casing and terminating within a cylindrical surface, a cylindrical valve located adjacent to and co-operating with said inner ends, there being suitable ports within the valve permitting flow of fluid from the passages selectively, as the valve is turned, a cooler unit adjacent to said end of the casing, an arcuate inlet passage in the cooler unit subtending an arc embracing all of those passages from which it is intended to deliver fluid to the cooler, means for delivering fluid from the valve ports to said arcuate inlet passage, a cooler discharge connection reaching between the ends of the arcuate cooler inlet connection to the central portion of the casing, and means for turning the valve as desired, substantially as described.

42. A fluid control device including a casing having a series of passages extending longitudinally thereof, the end portions of said passages being turned inwardly towards the longitudinal axis of the casing and terminating within a cylindrical surface, a cylindrical valve located adjacent to and co-operating with said inner ends, there being suitable ports within the valve permitting flow of fluid from the passages selectively as the valve is turned, a cooler unit adjacent to said end of the casing, an arcuate inlet passage in the cooler unit, means for delivering fluid from the valve ports to said inlet passage, a cooler discharge connection extending past said arcuate inlet passage to the central portion of the casing, and means for turning the valve as desired, substantially as described.

43. A fluid control device including a casing having a series of longitudinally extending passages, the end portions of said passages being turned inwardly towards the longitudinal axis of the casing and terminating within a cylindrical surface, a cylindrical valve located adjacent to and co-operating with said inner ends, there being suitable ports within the valve permitting flow of fluid from the passages selectively as the valve is turned, a cooler unit adjacent to said end of the casing, an arcuate inlet passage in the cooler unit receiving fluid delivered by the valve, a cooler discharge connection reaching past the arcuate inlet passage to the central portion of the casing, and means for turning the valve as desired, substantially as described.

44. A fluid control device including a casing, a series of passages extending longitudinally of said casing, the end portions of said passages being grouped together, a rotatable valve adjacent to said end portions, there being suitable ports within the valve permitting flow of fluid from the passages selectively as the valve is turned, a cooler unit adjacent to said end of the casing, an arcuate inlet passage in the cooler unit subtending an arc embracing all of those casing passages from which it is intended to deliver fluid to the cooler, deflector means for delivering fluid from the valve ports to the arcuate inlet passage or for permitting said fluid to return directly to the central portion of the casing as desired, a cooler discharge connection reaching past the arcuate inlet passage to the central portion of the casing, and means for turning the valve and for turning the deflector means as desired, substantially as described.

45. A fluid control device including a casing, a series of passages extending longitudinally of said casing, the end portions of said passages being grouped together, a rotatable valve adjacent to said end portions, there being suitable ports within the valve for permitting flow of fluid from the passages selectively as the valve is turned, a cooler unit adjacent to said end of the casing, an inlet passage in the cooling unit, deflector means for delivering the fluid from the valve ports to the arcuate inlet passage or for permitting said fluid to return directly to the central portion of the casing as desired, a cooler discharge connection reaching past the inlet passage to the central portion of the casing, and means for turning the valve and for turning the deflector means as desired, substantially as described.

46. A fluid control device including a casing, a series of passages extending longitudinally of said casing, the end portions of said passages being grouped together, a valve adjacent to said end portions, there being suitable ports within the valve permitting flow of fluid through the pasasges selectively as the valve is turned, a cooler unit adjacent to said end of the casing, means for delivering fluid from the valve ports to the inlet side of the cooler unit, a discharge connection from the cooler to the central portion of the casing, and means for moving the valve as desired, substantially as described.

47. A fluid control device including a casing, a series of passages extending longitudinally of the casing, the end portions of the passages being turned inwardly towards the longitudinal axis of the casing and terminating within a circular cylindrical surface, a circular cylindrical valve located adjacent to and co-operating with said inner ends, there being suitable ports within the valve permitting flow of fluid from the passages seletively as the valve is turned, the passages being grouped in sets around said axis of the casing, and the discharge ends of the passages of each set being substantially equi-angularly located around said axis of the casing and being of substantially equal size whereby the pressure of fluid from said passages against the valve is balanced, and means for turning the valve as desired, substantially as described.

48. A fluid control device including a casing, a series of passages extending longitudinally of the casing, the end portions of the passages being turned inwardly towards the longitudinal axis of the casing and terminating within a circular cylindrical surface, a circular cylindrical valve located adjacent to and co-operating with said inner ends, there being suitable ports within the valve permitting flow of fluid from the passages selectively as the valve is turned, the passages being grouped in sets around said axis of the casing, and the discharge ends of the passages of each set being so located and of such size with respect to each other that the pressure of fluid from the passages against the valve is balanced, and means for turning the valve as desired, substantially as described.

49. A fluid control device including a casing, a series of annular passages within said casing, a group of passages extending longitudinally of the casing from each of said annular passages, the end portions of the passages of each group being turned inwardly towards the longitudinal axis of the casing and terminating within a circular cylindrical surface, a circular cylindrical valve located adjacent to and co-operating with said inner ends, there being suitable ports within the valve permitting flow of fluid from the passages of the different groups selectively as the valve is turned, the discharge ends of the passages of each group being substantially equi-angularly located around said axis of the casing and being of substantially equal size, whereby the pressure of fluid from said passages against the valve is balanced, and means for turning the valve as desired, substantially as described.

50. A fluid control device including a casing, a series of annular passages within said casing, a group of passages extending longitudinally of the casing from each of said annular passages, the end portions of the passages of each group being turned inwardly towards the longitudinal axis of the casing and terminating within a circular cylindrical surface, a circular cylindrical valve located adjacent to and co-operating with said inner ends, there being suitable ports within the valve permitting flow of fluid from the passages of the different groups selectively as the valve is turned, the discharge ends of the passages of each group being so located around the arc of a circle, and being of such size relatively, that the pressure of fluid from the passages of each group against the valve is balanced, and means for turning the valve as desired, substantially as described.

51. A fluid control device including a casing, a series of annular passages extending around said casing in transverse planes, and a series of longitudinally extending passages in the casing communicating with the annular passages in groups and having discharge ends lying within a circular cylindrical surface adjacent to one end of the casing, the longitudinal passages of the group which communicate with the annular passages closest to said end of the casing being of substantially full radial dimension as compared to the annular passages and being of reduced angular dimension, and maintaining substantially constant angular dimension to their discharge ends, and the longitudinal passages which communicate with the other annular passages being of reduced radial dimension as compared to the annular passages and of increased angular dimension at their beginning ends as compared to their discharge ends, and increasing in radial dimension and decreasing in angular dimension towards their discharge ends, whereby the cross sectional area of the longitudinal passages remains substantially constant throughout their length, and whereby there are established at the discharge end of the casing a series of blank spaces unoccupied by longitudinal passages, the angular dimensions of said unoccupied spaces and of the discharge ends of all of the longitudinal passages being substantially the same, and the longitudinal passages which communicate with each annular passage being substantially uniformly spaced around the circle, a circular cylindrical valve located adjacent to and co-operating with the discharge ends of the longitudinal passages, and means for turning said valve as desired, substantially as described.

52. A fluid control device including a casing, a series of annular passages extending around said casing in transverse planes, and a series of longitudinally extending passages in the casing communicating with the annular passages in groups and having discharge ends lying within a circular cylindrical surface adjacent to one end of the casing, the longitudinal passages of the group which communicate with the annular passage closest to said end of the casing being of substantially full radial dimension as compared to the annular passages and being of reduced angular dimension, and maintaining substantially constant angular dimension to their discharge ends, and the longitudinal passages which communicate with the other annular passages being of reduced radial dimension as compared to the annular passages and of increased angular dimension at their beginning ends as compared to their discharge ends, and increasing in radial dimension and decreasing in angular dimension towards their discharge ends, whereby there are established at the discharge end of the casing a series of blank spaces unoccupied by longitudinal passages, the angular dimensions of said unoccupied spaces and of the discharge ends of all of the longitudinal passages being substantially the same, and the longitudinal passages which communicate with each annular passage being substantially uniformly spaced around the circle, a circular cylindrical valve located adjacent to and co-operating with the discharge ends of the longitudinal passages, and means for turning said valve as desired, substantially as described.

53. A fluid control device including a casing, a series of annular passages extending around said casing in transverse planes, and a series of longitudinally extending passages in the casing communicating with the annular passages in groups and having discharge ends lying within a circular cylindrical surface adjacent to one end of the casing, the longitudinal passages of each group communicating with a common annular passage and being isolated from all of the other annular passages, the cross sectional area of the longitudinal passages being substantially constant throughout their length to their discharge ends, and the longitudinal passages of each group being located at substantially uniform angular positions around the circle, and the longitudinal passages of the different groups coming in uniform succession with respect to each other, and there being blank spaces between the discharge ends of certain of the longitudinal passages, a circular cylindrical valve located adjacent to and co-operating with the discharge ends of the longitudinal passages, and means for turning said valve as desired, substantially as described.

54. A fluid control device including a casing, a series of annular passages extending around said casing in transverse planes, and a series of longitudinally extending passages in the casing communicating with the annular passages in groups and having discharge ends lying within a circular cylindrical surface adjacent to one end of the casing, the longitudinal passages of each group communicating with a common annular passage and being isolated from all of the other annular passages, and the longitudinal passages of each group being located at substantially uniform angular positions around the circle, and there being blank spaces between the discharge ends of certain of the longitudinal passages, a circular cylindrical valve located adjacent to and co-operating with the discharge ends of the longitudinal passages, and means for turning said valve as desired, substantially as described.

55. A fluid control device including a casing, a series of annular passages extending around said casing in transverse planes, and a series of longitudinally extending passages in the casing communicating with the annular passages in groups and having discharge ends lying within a circular cylindrical surface adjacent to one end of the casing, the longitudinal passages of each group communicating with a common annular passage and being isolated from all of the other annular passages, and the longitudinal passages of each group being located at substantially uniform angular positions around the circle, and there being blank spaces between the discharge ends of certain of the longitudinal passages, a circular cylindrical valve located adjacent to and co-operating with the discharge ends of the longitudinal passages, and means for turning said valve as desired, substantially as described.

56. A fluid control device comprising in combination a drive shaft, a driven shaft in alignment therewith, a centrifugal pump splined to the drive shaft and capable of longitudinal movement thereon while drivingly connected thereto, and having an intake opening only on the side of said pump facing in the direction of the driven shaft to receive fluid from said direction, and the intake ends of the vanes of said pump facing in the direction of pump rotation and being of characteristics to give a balanced operation whereby the pump will remain in fixed longitudinal position on the drive shaft at various loads and speeds, a turbine element concentrically located with respect to the shafts and provided with radially extending passages to receive fluid delivered by the pump when the pump is moved into proper longitudinal position on the drive shaft, a casing surrounding the turbine and pump, the driven shaft projecting from one end of said casing and being provided with a longitudinal slot in its projecting portion, a control rod extending longitudinally through the aligned shafts and connected to the pump at its inner end, a transverse block within the slot aforesaid journaled to the outer end of said rod and projecting beyond the surface of the driven shaft, a slotted collar on the driven shaft engaging the projecting portion of said block, a radial control pin connected to said collar, suitable rotary valve mechanism within the casing to control the flow of fluid coming from the turbine, a sleeve connected to said valve and reaching to the outside of the casing around the driven shaft, a slot in said sleeve receiving the radial pin aforesaid, whereby the shape of said slot in conjunction with angular movements of said pin will control the turning of the valve, a control lever surrounding the sleeve and having a pivoted connection with said pin on one side and being bifurcated opposite to said pivotal connection, and a curved pivot rod for said bifurcated portion, substantially as described.

57. A fluid control device comprising in combination a drive shaft, a driven shaft in alignment therewith, a centrifugal pump splined to the drive shaft and capable of longitudinal movement thereon while drivingly connected thereto, a turbine element concentrically located with respect to the shafts and provided with radially extending passages to receive fluid delivered by the pump when the pump is moved into proper longitudinal position on the drive shaft, a casing surrounding the turbine and pump, the driven shaft projecting from one end of said casing and being provided with a longitudinal slot in its projecting portion, a control rod extendng longitudinally through the aligned shafts and connected to the pump at its inner end, a transverse block within the slot aforesaid journaled to the outer end of said rod and projecting beyond the surface of the driven shaft, a slotted collar on the driven shaft engaging the projecting portion of said block, a radial control pin connected to said collar, suitable rotary valve mechanism within the casing to control the flow of fluid coming from the turbine, a sleeve connected to said valve and reaching to the outside of the casing around the driven shaft, a slot in said sleeve receiving the radial pin aforesaid, whereby the shape of said slot in conjunction with angular movements of said pin will control the turning of the valve, a control lever surrounding the sleeve and having a pivoted connection with said pin on one side and being bifurcated opposite to said pivotal connection, and a curved pivot rod for said bifurcated portion, substantially as described.

58. A fluid control device comprising in combination a drive shaft, a driven shaft in alignment therewith, a centrifugal pump splined to the drive shaft and capable of longitudinal movement thereon while drivingly connected thereto, a turbine element concentrically located with respect to the shafts and provided with radially extending passages to receive fluid delivered by the pump when the pump is moved into proper longitudinal position on the drive shaft, a casing surrounding the turbine and pump, the driven shaft projecting from one end of said casing and being provided with a longitudinal slot in its projecting portion, a control rod extending longitudinally through the aligned shafts and connected to the pump at its inner end, a transverse block within the slot aforesaid journaled to the outer end of said rod and projecting beyond the surface of the driven shaft, a slotted collar on the driven shaft engaging the projecting portion of said block, a radial control pin connected to said collar, suitable rotary valve mechanism within the casing to control the flow of fluid coming from the turbine, a sleeve connected to said valve and reaching to the outside of the casing around the driven shaft, a slot in said sleeve receiving the radial pin aforesaid, whereby the shape of said slot in conjunction with angular movements of said pin will control the turning of the valve, and a control lever having a pivoted connection with said pin and capable of movement longitudinally with respect to the device and also with respect to the shaft, substantially as described.

59. A fluid control device comprising in combination a drive shaft, a driven shaft in alignment therewith, a centrifugal pump splined to the drive shaft and capable of longitudinal movement thereon while drivingly connected thereto, a turbine element concentrically located with respect to the shafts and provided with radially extending passages to receive fluid delivered by the pump when the pump is moved into proper longitudinal position on the drive shaft, a casing surrounding the turbine and pump, the driven shaft projecting from one end of said casing and being provided with a longitudinal slot in its projecting portion, a control rod extending longitudinally through the aligned shafts and connected to the pump at its inner end, a transverse block within the slot aforesaid journaled to the outer end of said rod and projecting beyond the surface of the driven shaft, a slotted collar on the driven shaft engaging the projecting portion of said block, a radial control pin connected to said collar, suitable rotary valve mechanism within the casing to control the flow of fluid coming from the turbine, a sleeve connected to said valve and reaching to the outside of the casing around the driven shaft, a slot in said sleeve receiving the radial pin aforesaid, whereby the shape of said slot in conjunction with angular movements of said pin will control the turning of the valve, and a control lever capable of movement longitudinally of the device and having a suitable connection with said pin, substantially as described.

60. A fluid control device comprising in combination a drive shaft, a driven shaft in alignment therewith, a centrifugal pump splined to the drive shaft and capable of longitudinal movement thereon while drivingly connected thereto, a turbine element concentrically located with respect to the shafts and provided with radially extending passages to receive fluid delivered by the pump when the pump is moved into proper longitudinal position on the drive shaft, a casing surrounding the turbine and pump, the driven shaft projecting from one end of said casing and being provided with a longitudinal slot in its projecting portion, control rod extending longitudinally through the aligned shafts and connected to the pump at its inner end, a transverse block within the slot aforesaid journaled to the outer end of said rod and projecting beyond the surface of the driven shaft, a slotted collar on the driven shaft engaging the projecting portion of said block, a radial control pin connected to said collar, suitable rotary valve mechanism within the casing to control the flow of fluid coming from the turbine, a sleeve connected to said valve and reaching to the outside of the casing around the driven shaft, a slot in said sleeve receiving the radial pin aforesaid, whereby the shape of said slot in conjunction with angular movements of said pin will control the turning of the valve, a control lever pivotally connected to said pin, and a pivotal connection for said lever at a point opposite to the pin pivot, substantially as described.

61. A fluid control device comprising in combination a drive shaft, a driven shaft in alignment therewith, a centrifugal pump splined to the drive shaft and capable of longitudinal movement thereon while drivingly connected thereto, a turbine element concentrically located with respect to the shafts and provided with radially extending passages to receive fluid delivered by the pump when the pump is moved into proper longitudinal position on the drive shaft, a casing surrounding the turbine and pump, the driven shaft projecting from one end of said casing and being provided with a longitudinal slot in its projecting portion, a control rod extending longitudinally through the aligned shafts and connected to the pump at its inner end, a transverse block within the slot aforesaid journaled to the outer end of said rod and projecting beyond the surface of the driven shaft, a slotted collar on the driven shaft engaging the projecting portion of said block, a radial control pin connected to said collar, suitable rotary valve mechanism within the casing to control the flow of fluid coming from the turbine, a sleeve connected to said valve and reaching to the outside of the casing around the driven shaft, a slot in said sleeve receiving the radial pin aforesaid, whereby the shape of said slot in conjunction with angular movements of said pin will control the turning of the valve, a control lever pivotally connected to said pin on one side of the driven shaft, and a sliding support for said lever at the opposite side of said shaft, whereby the leverage of said lever changes as it is shifted longitudinally of the device, substantially as described.

62. A fluid control device comprising in combination a drive shaft, a driven shaft in alignment therewith, a centrifugal pump splined to the drive shaft and capable of longitudinal movement thereon while drivingly connected thereto, a turbine element concentrically located with respect to the shafts and provided with radially extending passages to receive fluid delivered by the pump when the pump is moved into proper longitudinal position on the drive shaft, a casing surrounding the turbine and pump, the driven shaft projecting from one end of said casing and being provided with a longitudinal slot in its projecting portion, a control rod extending longitudinally through the aligned shafts and connected to the pump at its inner end, a transverse block within the slot aforesaid journaled to the outer end of said rod and projecting beyond the surface of the driven shaft, a slotted collar on the driven shaft engaging the projecting portion of said block, a radial control pin connected to said collar, suitable rotary valve mechanism within the casing to control the flow of fluid coming from the turbine, a sleeve connected to said valve and reaching to the outside of the casing around the driven shaft, a slot in said sleeve receiving the radial pin aforesaid, whereby the shape of said slot in conjunction with angular movements of said pin will control the turning of the valve, and means under the control of the operator for shifting said pin longitudinally and angularly, substantially as described.

63. A fluid control device comprising in combination a drive shaft, a driven shaft in alignment therewith, a centrifugal pump splined to the drive shaft and capable of longitudinal movement thereon while drivingly connected thereto, a turbine element concentrically located with respect to the shafts and provided with radially extending passages to receive fluid delivered by the pump when the pump is moved into proper longitudinal position on the drive shaft, a casing surrounding the turbine and pump, the driven shaft projecting from one end of said casing and being provided with a longitudinal slot in its projecting portion, a control rod extending longitudinally through the aligned shafts and connected to the pump at its inner end, a transverse block within the slot aforesaid journaled to the outer end of said rod and projecting beyond the surface of the driven shaft, a slotted collar on the driven shaft engaging the projecting portion of said block, a radial control pin connected to said collar, suitable rotary valve mechanism within the casing to control the flow of fluid coming from the turbine, a sleeve connected to said valve and reaching to the outside of the casing around the driven shaft, a slot in said sleeve receiving the radial pin aforesaid, whereby the shape of said slot in conjunction with angular movements of said pin will control the turning of the valve, and means under the control of the operator for shifting the position of said pin, substantially as described.

64. A fluid control device comprising in combination a drive shaft, a driven shaft, a centrifugal pump splined to the drive shaft and capable of longitudinal movement thereon while drivingly connected thereto and having an intake opening only on the side of said pump facing in the direction of the driven shaft to receive fluid from said direction, and the intake ends of the vanes of said pump facing in the direction of pump rotation and being of characteristics pump to give a balanced operation whereby the pump will remain in fixed longitudinal position on the drive shaft at various speeds and loads, a turbine element drivingly connected to the driven shaft and adapted to interchange fluid with the pump, a pivoted control lever mounted in position for manipulation by the operator, and an operative connection from the lever to the pump serving to shift the pump on the drive shaft when the lever is manipulated, whereby the pump and lever will remain in a given position without the application of restraining forces, and at various loads and speeds, substantially as described.

65. A fluid control device comprising in combination a drive shaft, a driven shaft, a centrifugal pump slidably and drivingly mounted on the drive shaft and capable of longitudinal movement thereon while drivingly connected thereto, the intake side of said pump facing only in the direction of the driven shaft to receive fluid only from said direction, and the intake ends of the vanes of said pump facing in the direction of pump rotation and being of characteristics to give a balanced operation whereby the pump will remain in fixed longitudinal position on the drive shaft at various loads and speeds, a turbine drivingly connected to the driven shaft, there being a plurality of sets of vanes in said turbine, the pump being adapted to deliver fluid to selected sets according to the position of the pump on the drive shaft, and means under the control of the operator for moving the pump longitudinally of the drive shaft as desired, whereby the pump will remain in any desired position on the drive shaft at various loads and speeds without the application of special restraining forces, substantally as described.

66. A fluid control device comprising in combination a drive shaft, a driven shaft, a centrifugal pump slidingly and drivingly mounted on the drive shaft, a turbine drivingly connected to the driven shaft and adapted to interchange fluid with the pump, means for locking the drive and driven shafts directly together when the pump is moved to its position closest to the driven shaft, and means for shifting the pump on the drive shaft including a lever, an operative connection from said lever to the pump working at all times at a fixed distance from the axis of the driven shaft, and a pivotal support for another portion of the lever operable at a variable distance from said connection, said variable distance being a minimum when the pump is substantially at the direct drive position, substantially as described.

67. A fluid control device comprising in combination a drive shaft, a driven shaft, a centrifugal pump slidingly and drivingly connected to the drive shaft, a turbine in conjunction with the driven shaft and adapted to interchange fluid with the pump, means for connecting the drive and driven shafts directly together when the pump stands at the position closest to the driven shaft, and means for shifting the pump longitudinally of the drive shaft including a lever, an operable connection from said lever to the pump working at a fixed distance from the axis of the driven shaft, and a pivotal support for another portion of the lever working at a variable distance from the said connection, said distance being a minimum when the pump stands substantially at the direct drive position, substantially as described.

68. A fluid control device comprising in combination a drive shaft, a driven shaft, a centrifugal pump slidingly and drivingly connected to the drive shaft, a turbine in conjunction with the driven shaft and adapted to interchange fluid with the pump, a clutch normally connecting the turbine to the driven shaft, a clutch operable for connecting the drive and driven shafts directly together, means for disengaging the first mentioned clutch and for engaging the second mentioned clutch when the pump stands at its position closest to the driven shaft, and means for shifting the pump longitudinally of the drive shaft including a lever, an operative connection from said lever to the pump working at a fixed distance from the axis of the driven shaft, and a pivotal support for another portion of said lever operable at a variable distance from said connection, said distance being a minimum when the pump stands substantially at the direct drive position, whereby the effectiveness of the lever is a maximum when the second mentioned clutch device is in operation, substantially as described.

69. A fluid control device comprising in combination a drive shaft, a driven shaft, a pump slidingly and drivingly connected to the drive shaft, a turbine in conjunction with the driven shaft, and adapted to interchange fluid with the pump, a clutch device normally connecting said turbine to the driven shaft, another clutch adapted to connect the drive shaft directly to the driven shaft when the pump stands at its position closest to the driven shaft and normally disengaged at other times, means for disengaging the first clutch when the second clutch is engaged, and means under the control of the operator for shifting the pump longitudinally of the shaft, said means having an increased effectiveness when the pump stands substantially at the direct drive position as compared to its effectiveness at other times, substantially as described.

70. A fluid control device comprising in combination a drive shaft, a driven shaft, pumping means in conjunction with the drive shaft slidingly and drivingly connected thereto, a turbine in conjunction with the driven shaft, a clutch device adapted to connect the drive shaft and the driven shaft directly together when the pumping means stands at its position closest to the driven shaft, and means for shifting the pumping means longitudinally of the drive shaft, said shifting means being more effective when the pumping means stands adjacent to the direct drive position than at other times, substantially as described.

71. A transmission device comprising in combination a drive shaft, a driven shaft, suitable transmission means in conjunction with the two shafts for driving between them, a clutch device for connecting the two shafts directly together when the transmission means approaches the direct drive position, and means for shifting the transmission means, said shifting means being more effective when the transmission means stands adjacent to the direct drive position than at other times, substantially as described.

72. A transmission device including a drive shaft, a driven shaft, transmission means between said shafts, a clutch adapted to effect direct engagement between said shafts when the transmission means approaches the direct drive position, and means for shifting the transmission means, said means being more effective when the transmission means stands adjacent to the direct position than at other times, substantially as described.

73. A transmission device comprising in combination a drive shaft, a driven shaft, transmission mechanism including two parts, a clutch normally connecting one part of said transmission mechanism to the driven shaft, a clutch for connecting the drive shaft directly to the driven shaft, and means for shifting the other part of the transmission device into different positions with respect to the drive shaft, and for engaging the second mentioned clutch device when said transmission device stands closest to the driven shaft, said shifting means being more effective at such times than at other times, substantially as described.

74. A fluid control device comprising in combination a drive shaft, a driven shaft, pumping means in conjunction with the drive shaft, a turbine in conjunction with the driven shaft, a clutch normally connecting the turbine to the driven shaft, a spring normally operating said clutch, a clutch between the drive shaft and the driven shaft, and means for operating the second mentioned clutch and disengaging the first mentioned clutch when the direct drive position is approached, said operating means being more effective adjacent to the direct drive position than at other times, substantially as described.

75. A fluid control device comprising in combination a drive shaft, a driven shaft, a centrifugal pump slidingly and drivingly connected to the drive shaft, a turbine in conjunction with the driven shaft, a cylindrical chamber surrounding the end portion of the drive shaft and adapted to receive the pump in sealing fashion at the direct drive position, a clutch device interposed between the turbine and the driven shaft and surrounding said chamber, another clutch device interposed between the drive shaft and the driven shaft and adjacent to the first mentioned clutch device, means for disengaging the first mentioned clutch device and for engaging the second mentioned clutch device when the pump is within said chamber, and means for shifting the pump longitudinally of the drive shaft, said means being more effective when the pump is within said chamber than at other times, substantially as described.

76. A fluid control device comprising in combination a drive shaft, a driven shaft, a pump slidingly and drivingly connected to the drive shaft, a transmission element in conjunction with the driven shaft, a cylindrical chamber surrounding the end portion of the drive shaft and adapted to receive the pump in sealing fashion at the direct drive position, a clutch device interposed between the transmission element and the driven shaft and surrounding said chamber, another clutch device interposed between the drive shaft and the driven shaft, and adjacent to the first mentioned clutch device, means for disengaging the first mentioned clutch device and engaging the second mentioned clutch device when the pump is within said chamber, and means for shifting the pump longitudinally of the drive shaft, substantially as described.

77. A fluid control device comprising in combination a drive shaft, a driven shaft, a pump slidingly and drivingly connected to the drive shaft, a transmission device in conjunction with the driven shaft, a cylindrical chamber surrounding the end portion of the drive shaft and adapted to receive the pump in sealing fashion at the direct drive position, a clutch device interposed between the transmission device and the driven shaft and surrounding said chamber, another clutch device interposed between the drive shaft and the driven shaft and adjacent to the first mentioned clutch device, the first mentioned clutch device being of greater capacity than the second mentioned clutch device, and means for disengaging the first mentioned clutch device and for engaging the second mentioned clutch device when the pump is within the chamber, substantially as described.

78. A fluid control device comprising in combination a drive shaft, a driven shaft, a centrifugal pump splined to the drive shaft, a turbine element surrounding the drive shaft and the pump, a driving connection between the turbine and the driven shaft, a radially extending member supporting each end of the turbine element, a bearing between each radially extending member and the shaft which it surrounds, a control rod extending axially through both shafts and having its inner end connected to the pump, and an operative connection to the other end of said control rod, substantially as described.

79. A fluid control device comprising in combination a drive shaft, a driven shaft in alignment therewith, a pump splined to the drive shaft, a fluid transmission element surrounding the pump and the drive shaft, a driving connection between the last named element and the driven shaft, a radially extending member supporting one end of the transmission element with respect to the drive shaft, another radially extending member supporting the other end of the transmission element with respect to the driven shaft, bearings between the radially extending members and their respective shafts, a control rod extending axially through both shafts and having its inner end connected to the pump, and means for operating said control rod from the outside of the device, substantially as described.

80. A fluid control device comprising in combination a drive shaft, a driven shaft in alignment therewith, a pump splined to the drive shaft, a turbine surrounding the pump and the drive shaft, a driving connection between the turbine and the driven shaft, a radially extending member for supporting one end of the turbine with respect to the drive shaft, another radially extending member for supporting the other end of the turbine with respect to the driven shaft, bearings between said radially extending members and their respective shafts, a casing surrounding the turbine and radially extending members, and a closure for one end of said casing comprising a cooler unit having a pair of fluid circulating pipes at its sides, substantially as described.

81. A fluid control device including a casing for fluid, suitable fluid pumping and transmission elements within said casing, and a closure for one end of the casing comprising a cooler unit having a pair of vertically extending cooling pipes at its sides through which fluid may be circulated for cooling purposes, substantially as described.

82. The combination with the engine, cooling fan, and chassis of a motor vehicle having a propeller shaft, of a fluid transmission device interposed between the engine and the propeller shaft of said vehicle, and including a casing adapted for attachment to the rear end of the engine casing, fluid pumping and transmission devices within said transmission casing, and a cooler unit closing the rear end of said transmission casing and provided with substantially vertical fluid cooling pipes at its sides located in position to receive the air currents from the fan passing along the sides of the engine and downwardly beneath the chassis, and through which pipes fluid may be circulated for cooling purposes, substantially as described.

83. The combination with the engine, cooling fan, and chassis of a motor vehicle, having a propeller shaft, of a fluid transmission device interposed between the engine and the propeller shaft of said vehicle and including a casing adapted for attachment to the rear end of the engine casing, fluid pumping and transmission devices within said transmission casing, and a pair of substantially vertical fluid cooling pipes at the sides of the casing located in position to receive the air currents from the fan passing along the sides of the engine and downwardly beneath the chassis, and through which pipes fluid may be circulated for cooling purposes, substantially as described.

84. The combination with the engine, cooling fan and chassis of a motor vehicle having a propeller shaft, of a fluid transmission device interposed between the engine and the propeller shaft of said vehicle, a casing for said transmission device, fluid pumping and transmission devices within said casing, and a cooler unit closing the rear end of said transmission casing and provided with substantially vertical fluid cooling pipes at its sides located in position to receive the air currents from the fan passing along the sides of the engine and downwardly beneath the chassis, and through which pipes fluid may be circulated for cooling purposes, substantially as described.

85. The combination with the engine and the chassis of a motor vehicle, of a turbine element, means for at times driving the wheels of the vehicle from the engine by use of said turbine element, means for at other times driving the wheels of the vehicle independently of said turbine element and simultaneously disengaging the turbine element, means for at other times driving the turbine element by the vehicle wheels to thereby place fluid under pressure, means for storing fluid under pressure so created, and means for braking the vehicle by the use of fluid under pressure so created, substantially as described.

86. The combination with the engine and the chassis of a motor vehicle, of a turbine element, means for at times driving the wheels of the vehicle from the engine by the use of said turbine element, means for at other times driving the vehicle wheels by the engine independently of said turbine element, means for at other times driving said turbine element by the wheels of the vehicle to thereby place fluid under pressure, means for storing said fluid under pressure so created, and means for braking the wheels by the use of fluid so stored under pressure, substantially as described.

87. The combination with the chassis of a motor vehicle, of a turbine element, means for at times allowing the vehicle to travel independently of rotation of said turbine element, means for at other times causing the turbine element to rotate with travel of the vehicle to thereby place fluid under pressure, and means for braking the vehicle by the use of fluid so placed under pressure, substantially as described.

88. The combination with the engine and the chassis of a motor vehicle, of a fluid transmission device interposed between the engine and the driving wheels of the vehicle and including pumping means shiftable longitudinally with respect to the vehicle and also including a valve shiftable laterally with respect to the vehicle, a control lever located convenient to the driver's seat of the vehicle and shiftable longitudinally and laterally of the vehicle, and operative connections from said control lever to said pumping means and to said valve, whereby back and forth movements of the lever serve to shift the pumping means into different operative positions and lateral movements of the lever serve to operate the valve effectively to control the transmission, substantially as described.

89. The combination with the engine and the chassis of a motor vehicle, of a fluid transmission device interposed between the engine and the driving wheels of the vehicle, and including pumping means shiftable longitudinally with respect to the vehicle from a neutral to a direct drive position and also including a valve shiftable laterally with respect to the vehicle, a control lever located convenient to the driver's seat of the vehicle and shiftable longitudinally and laterally of the vehicle, operative connections from said control lever to said pumping means whereby back and forth movements of the lever cause back and forth movements of the pumping means, and operative connections from the lever to the valve whereby lateral movements of the lever under one condition serve to operate the valve, substantially as described.

90. The combination with the engine and the chassis of a motor vehicle, of a fluid transmission device interposed between the engine and the driving wheels of the vehicle, and including pumping means shiftable longitudinally with respect to the vehicle and also including a valve shiftable laterally with respect to the vehicle, a control lever located convenient to the driver's seat of the vehicle and shiftable longitudinally and laterally of the vehicle around the sides of a triangle having its base extending across the vehicle, one base corner of said triangle being a neutral position, another base corner of the triangle being a coasting position and the apex corner of the triangle being a direct drive position, operative connections between the lever and the pumping means serving to shift the pumping means into different positions as the lever is moved on the two sides of the triangle, and operative connections from the lever to the valve serving to shift the valve when the lever is moved on the side of the triangle between the neutral and direct drive positions and when the lever is moved on the base of the triangle, but ineffective to move the valve when the lever is moved on the side of the triangle between the direct drive and coasting positions, substantially as described.

91. The combination with the engine and the chassis of a motor vehicle, of a fluid transmission device interposed between the engine and the driving wheels of the vehicle and including pumping means shiftable longitudinally with respect to the vehicle and also including a valve shiftable laterally with respect to the vehicle, a control lever located convenient to the driver's seat of the vehicle and shiftable longitudinally and laterally of the vehicle about a triangle having its base extending across the vehicle and its sides longitudinally of the vehicle, operative connections from the lever to the pumping means serving to shift the pumping means when the lever is moved on either side of the triangle but ineffective to shift the pumping means when the lever is shifted on the base of the triangle, and operative connections from the lever to the valve operable to shift the valve when the lever is shifted on one side of the triangle and the base of the triangle but ineffective to shift the valve when the lever is shifted on the other side of the triangle, substantially as described.

92. The combination with the engine and the chassis of a motor vehicle; of a fluid transmission device interposed between the engine and the driving wheels of the vehicle and including pumping means shiftable longitudinally with respect to the vehicle, a valve shiftable laterally with respect to the vehicle, cooling means, and deflecting means shiftable laterally with respect to the vehicle to control the flow of fluid through the cooling means, a control lever located convenient to the driver's seat of the vehicle and shiftable longitudinally and laterally of the vehicle about a triangle having its base extending across the vehicle and its sides extending longitudinally of the vehicle, operative connections from the lever to the pumping means effective to shift the pumping means longitudinally of the vehicle when the lever is moved on either side of the triangle but ineffective to shift the pumping means when the lever is moved on the base of the triangle, operative connections from the lever to the valve operable effectively to shift the valve when the lever is moved on one side of the triangle or on the base of the triangle but ineffective to shift the valve when the lever is moved on the other side of the triangle, and operative connections from the lever to the deflecting means normally operable to shift the deflector in harmony with the valve when the lever is moved on the base of the triangle and to shift the deflector independently of the valve when the lever is moved on that side of the triangle where the valve is not moved, and normally ineffective to shift the deflector when the lever is moved on that side of the triangle on which the valve is moved, substantially as described.

93. The combination with the engine and the chassis of a motor vehicle, of a fluid transmission device interposed between the engine and the driving wheels of the vehicle and including pumping means shiftable longitudinally with respect to the vehicle, a valve shiftable laterally with respect to the vehicle, cooling means, and deflecting means shiftable laterally with respect to the vehicle to control the flow of fluid through the cooling means, a control lever located convenient to the driver's seat of the vehicle and shiftable longitudinally and laterally of the vehicle about a triangle having its base extending across the vehicle and its sides extending longitudinally of the vehicle, operative connections from the lever to the pumping means effective to control the pumping means by the longitudinal movements of the lever on a side of the triangle, operative connections from the lever to the valve, and operative connections from the lever to the deflector operative to control the same effectively to operate the valve and deflector together by lateral movements of the lever on the base of the triangle, substantially as described.

94. The combination with the engine and the chassis of a motor vehicle, of a fluid transmission device interposed between the engine and the driving wheels of the vehicle and including pumping means shiftable in one direction with respect to the vehicle, a valve for controlling the flow of fluid, cooling means, and deflecting means for controlling the flow of fluid through the cooling means, a control lever in the vehicle and shiftable about a triangle, operative connections from the control lever to the pumping means effective to control the pumping means by movements of the lever on the sides of the triangle, and operative connections from the lever to the valve and to the deflector operative to control the valve and the deflector in harmony by movements of the lever on the base of the triangle, substantially as described.

95. The combination with the engine and the chassis of a motor vehicle, of a fluid transmission device interposed between the engine and the driving wheels of the vehicle and including pumping means shiftable with respect to the vehicle, a valve shiftable with respect to the vehicle, cooling means, and deflector means shiftable with respect to the valve, a control lever in the vehicle shiftable about a triangle, and operative connections from the control lever to the pumping means effective to control the pumping means when the lever is shifted on selected sides of the triangle, and operative connections from the control lever to the valve and to the deflector operative to shift the valve and the deflector either in harmony when the control lever is moved on one side of the triangle or independently at the will of the operator, substantially as described.

96. The combination with the engine and the chassis of a motor vehicle, of a fluid transmission device interposed between the engine and the wheels of the motor vehicle, pumping means in said transmission device, a valve in the transmission device for the pumping means, cooling means, a deflector for the cooling means, a control lever shiftable about a triangle with respect to the vehicle, and operative connections from the control lever to the pumping means, the valve, and the deflector, operative to control these parts at the will of the operator in selected combinations by movements of the control lever on the three sides of the triangle, substantially as described.

97. The combination with the engine and the chassis of a motor vehicle, of a fluid transmission device interposed between the engine and the driving wheels of the vehicle including pumping means, a valve, a cooler, and a deflector communicating with the cooler and shiftable into registry with the valve, a control lever mounted in the vehicle, and operative connections from the control lever to the pumping means, the valve, and the deflector, operative to control the pumping means and the valve in harmony or singly, at the will of the operator and the valve and deflector either in harmony or singly, substantially as described.

98. The combination with the engine and the chassis of a motor vehicle, of a fluid transmission device interposed between the engine and the driving wheels of the vehicle and including pumping means, a valve, a control lever mounted in the vehicle and shiftable about a triangle, operative connections from the control lever to the pumping means effective to shift the pumping means by lever movements on two sides of the triangle and operative connections from the control lever to the valve, effective to shift the valve by lever movements on only one of said sides of the triangle, whereby the lever is effective to control the pumping means and the valve in harmony or the pumping means independently, or the valve independently, substantially as described.

THOS. A. BANNING, Jr.

CERTIFICATE OF CORRECTION.

Patent No. 1,657,603.                      Granted January 31, 1928, to

THOMAS A. BANNING, JR.

It is hereby certified that error appears in the printed specification of the above numbered patent requiring correction as follows: Page 18, lines 65 and 66, strike out the words "The second forward drive turbine section is best adopted for the foregoing functions."; and that the said Letters Patent should be read with this correction therein that the same may conform to the record of the case in the Patent Office.

Signed and sealed this 6th day of March, A. D. 1928.

Seal.                               M. J. Moore,
                                    Acting Commissioner of Patents.